under

US012470489B2

(12) United States Patent
Peri

(10) Patent No.: US 12,470,489 B2
(45) Date of Patent: Nov. 11, 2025

(54) METHODS AND APPARATUS FOR PERFORMANCE SCALING WITH PARALLEL PROCESSING OF SLIDING WINDOW MANAGEMENT ON MULTI-CORE ARCHITECTURE

(71) Applicant: Intel Corporation, Santa Clara, CA (US)

(72) Inventor: Surekha Peri, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 398 days.

(21) Appl. No.: 18/003,267

(22) PCT Filed: Jul. 20, 2021

(86) PCT No.: PCT/US2021/042346
§ 371 (c)(1),
(2) Date: Dec. 23, 2022

(87) PCT Pub. No.: WO2022/020336
PCT Pub. Date: Jan. 27, 2022

(65) Prior Publication Data
US 2023/0300075 A1    Sep. 21, 2023

Related U.S. Application Data

(60) Provisional application No. 63/054,106, filed on Jul. 20, 2020.

(51) Int. Cl.
*H04L 47/22* (2022.01)
*H04L 47/50* (2022.01)

(52) U.S. Cl.
CPC ............ *H04L 47/225* (2013.01); *H04L 47/50* (2013.01)

(58) Field of Classification Search
CPC .............................. H04L 47/225; H04L 47/50
See application file for complete search history.

(56) References Cited

U.S. PATENT DOCUMENTS

| | | | |
|---|---|---|---|
| 2007/0177696 A1* | 8/2007 | Chen ................. | H03M 13/3723 375/242 |
| 2008/0273634 A1* | 11/2008 | Patel .................... | H04L 5/0007 375/343 |

(Continued)

FOREIGN PATENT DOCUMENTS

WO    WO-02089331 A2 *  11/2002  ............. H04L 1/005

OTHER PUBLICATIONS

International Searching Authority, "International Search Report," mailed in connection with International Patent Application No. PCT/US2021/042346, on Oct. 29, 2021, 3 pages.

(Continued)

*Primary Examiner* — Sujoy K Kundu
*Assistant Examiner* — Weibin Huang
(74) *Attorney, Agent, or Firm* — Hanley, Flight & Zimmerman, LLC

(57) ABSTRACT

Methods, apparatus, and articles of manufacture have been disclosed for performance scaling with parallel processing of sliding window management on multi-core architecture. An example apparatus includes at least one memory, instructions in the apparatus, and processor circuitry to at least one of execute or instantiate the instructions to partition a packet flow into two or more sub flows based on a packet flow distribution configuration, the two or more sub flows associated respectively with two or more sliding windows that are able to slide in parallel, provide the two or more sub flows to a buffer to schedule distribution of the two or more sub flows, dequeue the two or more sub flows from the (Continued)

buffer to one or more hardware cores, and transmit the two or more sub flows to a destination device.

21 Claims, 20 Drawing Sheets

(56) References Cited

U.S. PATENT DOCUMENTS

2013/0265876 A1* 10/2013 Song ................... H04L 47/27
370/235
2019/0394142 A1* 12/2019 Zhang .................. H04L 47/70

OTHER PUBLICATIONS

International Searching Authority, "Written Opinion," mailed in connection with International Patent Application No. PCT/US2021/042346, on Oct. 29, 2021, 4 pages.

The International Bureau of WIPO, "International Preliminary Report on Patentability," issued in connection with International Application PCT/US2021/042346, dated Jan. 24, 2023, 5 pages.

* cited by examiner

METHODS AND APPARATUS FOR PERFORMANCE SCALING WITH PARALLEL PROCESSING OF SLIDING WINDOW MANAGEMENT ON MULTI-CORE ARCHITECTURE

RELATED APPLICATION

This patent arises from a national stage application of International Patent Application PCT/US2021/042346 which was filed on Jul. 20, 2021, which claims the benefit of U.S. Provisional Patent Application No. 63/054,106, which was filed on Jul. 20, 2020. International Patent Application PCT/US2021/042346 and U.S. Provisional Patent Application No. 63/054,106 are hereby incorporated herein by reference in their entireties. Priority to International Patent Application PCT/US2021/042346 and U.S. Provisional Patent Application No. 63/054,106 is hereby claimed.

FIELD OF THE DISCLOSURE

This disclosure relates generally to multi-core computing environments and, more particularly, to methods and apparatus for performance scaling with parallel processing of sliding window management on multi-core architecture.

BACKGROUND

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation. However, such processing can consume a disproportionate amount of bandwidth of processing resources closer to the end user or computing device thereby increasing latency, congestion, and power consumption of the network.

DETAILED DESCRIPTION

Figure 1:
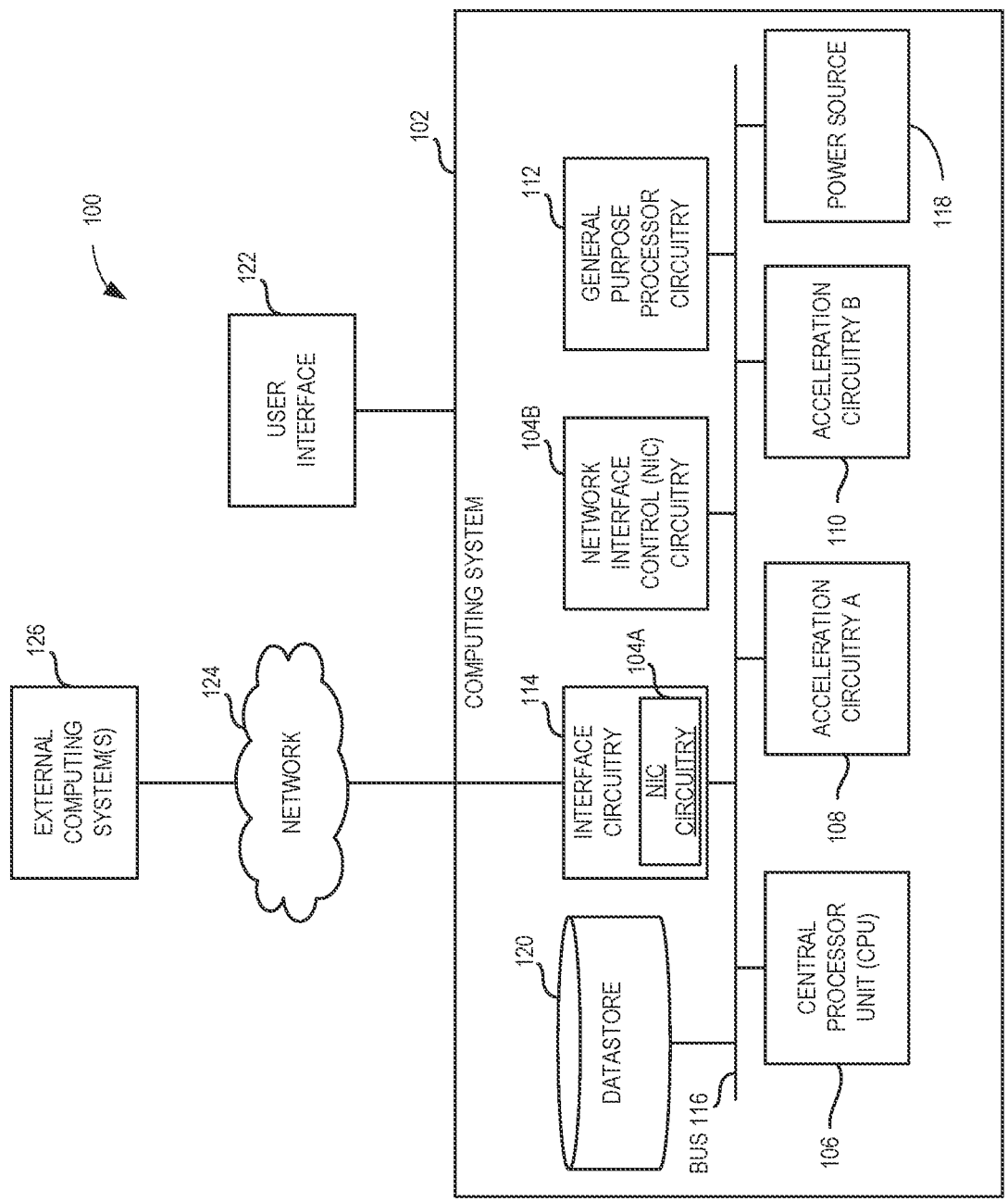
FIG. 1 is a schematic illustration of an example multi-core computing environment including example network interface control (NIC) circuitry to effectuate performance scaling with parallel processing of sliding window management.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc., are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, Infrastructure Processing Units (IPUs), or microcontrollers and integrated circuits such as Application Specific Integrated Circuits (ASICs). In some examples, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processor circuitry is/are best suited to execute the computing task(s).

Multi-access edge computing (MEC) is a network architecture concept that enables cloud computing capabilities and an infrastructure technology service environment at the edge of a network, such as a cellular network. Using MEC, data center cloud services and applications can be processed closer to an end user or computing device to improve network operation.

While MEC is an important part of the evolution of edge computing, cloud and communication service providers are addressing the need to transform networks of the cloud and communication service providers in preparation for fifth generation, sixth generation, etc., cellular network technology (i.e., 5G, 6G, etc.). To meet the demands of next generation networks supporting 5G, 6G, etc., cloud service providers can replace fixed function proprietary hardware with more agile and flexible approaches that rely on the ability to maximize the usage of multi-core edge and data center servers. Next generation server edge and data center networking can include an ability to virtualize and deploy networking functions throughout a data center and up to and including the edge. High packet throughput amplifies the need for better end-to-end latency, Quality of Service (QOS), and traffic management. Such needs in turn drive requirements for efficient data movement and data sharing between various stages of a data plane pipeline across a network.

Some network deployments, such as 5G, 6G, etc., network deployments, are carrying ever increasing workloads and are reaching scalability limits for stateful single flow workloads. Such 5G, 6G, etc., network deployments may employ high-throughput Internet Protocol security (IPsec) tunnels to facilitate delivery of elephant flows between two network nodes. An elephant flow refers to a packet flow (e.g., a flow of one or more data packets, network packets, etc.) with high-throughput requirements. In some prior solutions for non-parallel packet processing techniques, the size of an elephant flow that is supported on a given platform is limited to single threaded capacity. For example, an elephant flow can refer to a flow of data (e.g., a flow of data packets or other quanta of communication) that exceeds the processing capabilities of a single processing thread executed by a multi-threaded processing device. In some such examples, the elephant flow can refer to a data flow, a packet flow, etc., that exceeds a capability of the single processing thread to process the flow at a desired throughput. For example, to implement sequence number generation and other IPsec processing tasks in multi-threaded hardware, prior solutions may implement the sequence number generation and the other IPsec processing tasks using a single processing thread, which can be throttled responsive to an elephant flow and, thus, reduce an efficiency of the multi-threaded hardware. Advantageously, in examples disclosed herein, efficiency of the multi-threaded hardware can be improved by parallelizing the workflow previously executed by the single processing thread. In some such 5G, 6G, etc., network deployments, high-single security association (SA) performance with anti-replay window (ARW) protection is required. In some such 5G, 6G, etc., network deployments, a similar increase on Packet Data Convergence Protocol (PDCP) requirements is demanded with the inclusion of dual and multi connectivity.

Some multi-core or multi-threaded computing or processor platforms provide scaling for systems having a large number of flows by distributing the flows to different processing elements. For example, a multi-core or multi-threaded computing environment may include a plurality of IPUs, XPUs, DSPs, in-line network interface control (NIC) circuitry, CPUs, GPUs, FPGAs, etc., and/or any combination thereof. Some such multi-core or multi-threaded computing or processor platforms face challenges with stateful elephant flow processing because such processing does not sufficiently scale with an increasing number of hardware resources, such as an increasing number of hardware cores (e.g., processor circuitry cores).

Some communication protocols attempt to process elephant flows. Some such communication protocols may be limited by single thread performance, have a parallel implementation with synchronization primitives that may lock up a data pipeline, isolate the sequence number generation into a dedicated data pipeline stage, etc., and/or a combination thereof. Some such communication protocols may not scale with increasing the number of threads, hardware resources, etc., and/or may add latency to the data pipeline responsive to excessive pipeline stages (e.g., a dedicated pipeline stage for sequence number generation).

Some receivers (e.g., data receivers, transceivers, etc.) use communication protocols to employ sliding windows with sequence numbers to allow for some amount of network re-ordering, while protecting a system from stale packets, replay attacks, network intrusions, etc. Some such communication protocols may be limited by single thread performance of a processor platform and/or by challenges in scaling with an increasing number of cores because of expensive (e.g., computationally expensive, consumes a relatively large quantity of hardware resources, etc.) synchronization techniques. Some such processor platforms may have divergent performance for single and multiple flows. Some communication protocols splice a data pipeline into multiple, smaller functional sub-blocks, so that each of the sub-blocks may fit within a single threaded performance of the processor platform. Some such communication protocols may be limited because they utilize synchronization or locking primitives that do not scale with an increasing number of cores. Some such communication protocols may be limited because the increased number of data pipeline stages adds latency to the data pipeline and/or increases the overhead and overall processing requirements of the processor platform.

Examples disclosed herein include lockless parallelization of sequence number (SN) generation for use by a sliding window protocol. In some disclosed examples, a transmitter (e.g., a data transmitter, a data transceiver, etc.) can parallelize management of an entire sliding window or portion(s) thereof. In some such disclosed examples, the transmitter can parallelize SN generation for use by sliding window protocols with IPsec SN or extended SN generation without the use of synchronization primitives. For example, the transmitter can partition an incoming packet flow into two or more atomic sub flows of finer granularities. In some such examples, the transmitter can determine a configuration or set of characteristics of the sub flows to generate an orthogonal SN space of the sub flows. In some such examples, the transmitter can generate contiguous sequence numbers to execute the different sub flows in parallel. Advantageously, in some such disclosed examples, the transmitter can effectuate efficient parallelization of elephant flows and improve the scaling of executing the elephant flows with an increasing number of cores.

In some disclosed examples, a receiver (e.g., a data receiver, a data transceiver, etc.) can organize a received data flow into a sliding window and partition the sliding window into lockless sliding windows (e.g., lockless parallel sliding windows). In some such disclosed examples, the receiver can bound the parallel sliding windows to be within a boundary of the original sliding window. In some such disclosed examples, the receiver parallelizes the management of the sliding windows without synchronization primitives so that one(s) of the sliding windows are independently operable. While IPsec ARW is used as an example in some disclosed examples, the systems, methods, apparatus, and articles of manufacture as disclosed herein may utilize any other sliding window protocols with sequence numbers or other identifiers.

In some disclosed examples, the transmitter and/or receiver may be implemented by an IPU, which may be used by hardware and/or software providers (e.g., cloud service providers (CSPs)) for performance, management, security, and coordination functions in addition to infrastructure offload and communications in a MEC environment. For example, an IPU may be multi-core processor circuitry that may be integrated with smart network interface control (NIC) circuitry and storage or memory (e.g., on a same die, system on chip (SoC), or connected dies) that are located at on-premises systems, base stations, gateways, neighborhood central offices, and so forth. In some disclosed examples, an IPU may perform an application composed of microservices, where each microservice runs in its own process and communicates using protocols (e.g., an HTTP resource application programming interface (API), a message service or remote procedure call (RPC) (e.g., a gRPC), etc.). Advantageously, the example transmitter and receiver may be independently deployable. For example, the transmitter and/or the receiver may each implement the examples disclosed herein. In some such examples, the transmitter and/or the receiver may each be adapted, configured, and/or structured to implement the examples disclosed herein to achieve different degrees of efficiency and/or improvement.

FIG. 1 is a schematic illustration of an example multi-core computing environment 100 including an example computing system 102 including example network interface control (NIC) circuitry 104A-B to process data flows (e.g., packet flows), such as high-throughput data flows, elephant flows, etc. The computing system 102 includes an example central processor unit (CPU) 106, first example acceleration circuitry (labeled ACCELERATION CIRCUITRY A) 108, second example acceleration circuitry (labeled ACCELERATION CIRCUITRY B) 110, example general purpose processor circuitry 112, example interface circuitry 114, an example bus 116, an example power source 118, and an example datastore 120. Further depicted in the example of FIG. 1 is an example user interface 122, an example network 124, and example external computing system(s) 126.

In the illustrated example of FIG. 1, at least one of the CPU 106, the first acceleration circuitry 108, the second acceleration circuitry 110, the general purpose processor circuitry 112, or the interface circuitry 114 is/are multi-core circuitry (e.g., multi-core processor circuitry). For example, at least one of the CPU 106, the first acceleration circuitry 108, the second acceleration circuitry 110, the general purpose processor circuitry 112, or the interface circuitry 114 may include two or more cores (e.g., compute cores, processor cores, core circuitry, etc.). In some examples, a core is hardware (e.g., a hardware or logical processor). For example, the CPU 106 can include and/or otherwise be implemented by two or more logical CPU cores that can physically execute multiple instructions at the same time. In some examples, the interface circuitry 114 can be implemented by two or more logical interface cores that can physically execute multiple instructions at the same time. For example, the interface circuitry 114 can effectuate multithreading by executing instructions on two or more logical interface cores.

In some examples, the computing system 102 is a system-on-a-chip (SoC) representative of one or more integrated circuits (ICs) (e.g., compact ICs) that incorporate components of a computer or other electronic system in a compact format. For example, the computing system 102 can be implemented with a combination of one or more programmable processors, hardware logic, and/or hardware peripherals and/or interfaces. Additionally or alternatively, the computing system 102 of FIG. 1 may include memory, input/output (I/O) port(s), and/or secondary storage. For example, the computing system 102 may include the NIC circuitry 104A-B, the CPU 106, the first acceleration circuitry 108, the second acceleration circuitry 110, the general purpose processor circuitry 112, the interface circuitry 114, the bus 116, the power source 118, the datastore 120, the memory, the I/O port(s), and/or the secondary storage all on the same substrate. In some examples, the computing system 102 may include digital, analog, mixed-signal, radio frequency (RF), or other signal processing functions.

In the illustrated example of FIG. 1, the first acceleration circuitry 108 is a graphics processor unit (GPU). For example, the first acceleration circuitry 108 may be a GPU that generates computer graphics, executes general-purpose computing, etc. The second acceleration circuitry 110 of the example of FIG. 1 is an artificial intelligence (AI) accelerator (e.g., a neural network (NN) accelerator). For example, the second acceleration circuitry 110 may be a vision processor unit to effectuate machine or computer vision computing tasks, a physical neural network to train and/or execute a neural network (e.g., a convolution neural network (CNN), a deep neural network (DNN), an artificial neural network (ANN), a recurrent neural network (RNN), etc.), etc. The general purpose processor circuitry 112 of the example of FIG. 1 is processor circuitry, such as a CPU or a GPU. Alternatively, one or more of the first acceleration circuitry 108, the second acceleration circuitry 110, and/or the general purpose processor circuitry 112 may be a different type of hardware such as a digital signal processor (DSP), an application specific integrated circuit (ASIC), a programmable logic device (PLD), and/or a field programmable logic device (FPLD) (e.g., a field-programmable gate array (FPGA)).

In the illustrated example of FIG. 1, the interface circuitry 114 may implement one or more interfaces. In this example, the interface circuitry 114 includes and/or otherwise implements the first NIC circuitry 104A. For example, the interface circuitry 114 can be implemented by a communication device (e.g., a NIC, a smart NIC, etc.) such as a transmitter, a receiver, a transceiver, a modem, a residential gateway, a wireless access point, and/or a network interface to facilitate exchange of data with external machines (e.g., computing devices of any kind) via the network 124. In some examples, the communication is effectuated by an Ethernet connection, a digital subscriber line (DSL) connection, an optical connection, a telephone line connection, a coaxial cable system, a satellite system, a line-of-site wireless system, a cellular telephone system, etc. For example, the interface circuitry 114 can be implemented by any type of interface standard, such as a cellular network interface, a wireless fidelity (Wi-Fi) interface, an Ethernet interface, a universal serial bus (USB), a Bluetooth interface, a near field communication (NFC) interface, a Peripheral Component Interconnect (PCI) interface, and/or a Peripheral Component Interconnect express (PCIe) interface.

In some examples, the NIC circuitry 104A-B may implement a network processor and/or a packet processor. In some examples, the NIC circuitry 104A-B distributes a data flow of interest to a receiving device, such as a destination endpoint or intermediate receiving device, such as a network node, etc., or any other physical or logical destination entity. For example, the NIC 140A-B can divide, partition, and/or otherwise split a data flow into multiple sub flows. In some such examples, the NIC circuitry 104A-B can schedule and distribute the multiple sub flows atomically. In some such examples, the NIC circuitry 104A-B can distribute and/or otherwise transmit the multiple sub flows to the external computing system(s) 126 by the network 124.

In some examples, the NIC circuitry 104A-B receives a data flow of interest from a source device, such as an origination endpoint or intermediate receiving device, such as a network node, etc., or any other physical or logical origination entity. For example, the NIC circuitry 104A-B can divide, partition, and/or otherwise split an incoming data flow associated with a primary window into multiple parallel windows. In some such examples, the NIC circuitry 104A-B derives and/or otherwise determines the parallel windows from sequence numbers (SNs) included in and/or otherwise associated with respective ones of data packets of the incoming data flow. In some such examples, the NIC circuitry 104A-B updates the parallel windows based on the incoming SN and a current state of the parallel window(s). For example, the NIC circuitry 104A-B can receive a data flow from the external computing system(s) 126 by the network 124 and process the data flow based on the examples described herein.

The computing system 102 includes the power source 118 to deliver power to resource(s) of the computing system 102. In the example of FIG. 1, the power source 118 is a battery. For example, the power source 118 is a limited energy device, such as a lithium-ion battery or any other chargeable battery or power source. In some such examples, the power source 118 is chargeable using a power adapter or converter (e.g., an alternating current (AC) to direct current (DC) power converter), grid power or a wall outlet (e.g., a 110 Volts (V) AC wall outlet, a 220 V AC wall outlet, etc.), etc.

The computing system 102 of the example of FIG. 1 includes the datastore 120 to record data. The datastore 120 of this example may be implemented by a volatile memory (e.g., Synchronous Dynamic Random Access Memory (SDRAM), Dynamic Random Access Memory (DRAM), RAMBUS Dynamic Random Access Memory (RDRAM), etc.) and/or a non-volatile memory (e.g., flash memory). The datastore 120 may additionally or alternatively be implemented by one or more double data rate (DDR) memories, such as DDR, DDR2, DDR3, DDR4, mobile DDR (mDDR), etc. The datastore 120 may additionally or alternatively be implemented by one or more mass storage devices such as hard disk drive(s) (HDD(s)), compact disk (CD) drive(s), digital versatile disk (DVD) drive(s), solid-state disk (SSD) drive(s), etc. While in the illustrated example the datastore 120 is illustrated as a single datastore, the datastore 120 may be implemented by any number and/or type(s) of datastores. Furthermore, the data stored in the datastore 120 may be in any data format such as, for example, binary data, comma delimited data, tab delimited data, structured query language (SQL) structures, etc.

In the illustrated example of FIG. 1, the computing system 102 is in communication and/or otherwise communicatively coupled with the user interface 122. For example, the user interface 122 is a graphical user interface (GUI), an application display, etc., presented to a user on a display device in circuit with and/or otherwise in communication with the computing system 102. In some such examples, a user controls the computing system 102, configures one(s) of the hardware, firmware, and/or software resources of the computing system 102, etc., by the user interface 122. Alternatively, the computing system 102 may include the user interface 122.

In the illustrated example of FIG. 1, the NIC circuitry 104A-B, the CPU 106, the first acceleration circuitry 108, the second acceleration circuitry 110, the general purpose processor circuitry 112, the interface circuitry 114, the power source 118, and the datastore 120 are in communication with the bus 116. For example, the bus 116 may be implemented by at least one of an Inter-Integrated Circuit (I2C) bus, a Serial Peripheral Interface (SPI) bus, or a Peripheral Component Interconnect (PCI) bus.

The network 124 of the example of FIG. 1 is the Internet. However, the network 124 of this example may be implemented using any suitable wired and/or wireless network(s) including, for example, one or more data buses, one or more Local Area Networks (LANs), one or more wireless LANs, one or more cellular networks, one or more private networks, one or more public networks, one or more terrestrial networks, one or more non-terrestrial networks, etc. The network 124 enables the computing system to be in communication with the external computing system(s) 126. For example, the external computing system(s) 126 correspond(s) to, is/are representative of, and/or otherwise include(s)

one or more computing devices, computer servers, data facilities, cloud services, edge servers, edge gateways, edge switches, edge devices, Internet-of-Things (IoT) devices, etc.

In the illustrated example of FIG. 1, the computing system 102 includes first NIC circuitry 104A (e.g., a first instance of the NIC circuitry 104A-B) and second NIC circuitry 104B (e.g., a second instance of the NIC circuitry 104A-B) (collectively referred to herein as the NIC circuitry 104A-B unless specified otherwise). In the example of FIG. 1, the first NIC circuitry 104A is implemented by the interface circuitry 114 (e.g., implemented by hardware, software, and/or firmware, implemented by processor circuitry, etc.) and the second NIC circuitry 104B is external to the interface circuitry 114. For example, the second NIC circuitry 104B may be implemented by hardware, software, and/or firmware, processor circuitry, etc. In some such examples, the second NIC circuitry 104B may be implemented by one or more analog or digital circuit(s), logic circuits, programmable processor(s), programmable controller(s), GPU(s), DSP(s), ASIC(s), PLD(s), and/or FPLD(s)). Additionally or alternatively, the first NIC circuitry 104A, the second NIC circuitry 104B, and/or portion(s) thereof, may be virtualized, such as by being implemented using one or more virtual machines, virtual machine managers, hypervisors, etc. Additionally or alternatively, the first NIC circuitry 104A and/or the second NIC circuitry 104B may be implemented by different hardware, software, and/or firmware of the computing system 102, such as the CPU 106, the first acceleration circuitry 108, the second acceleration circuitry 110, etc. Alternatively, the computing system 102 may not include the first NIC circuitry 104A or the second NIC circuitry 104B.

Figure 2:
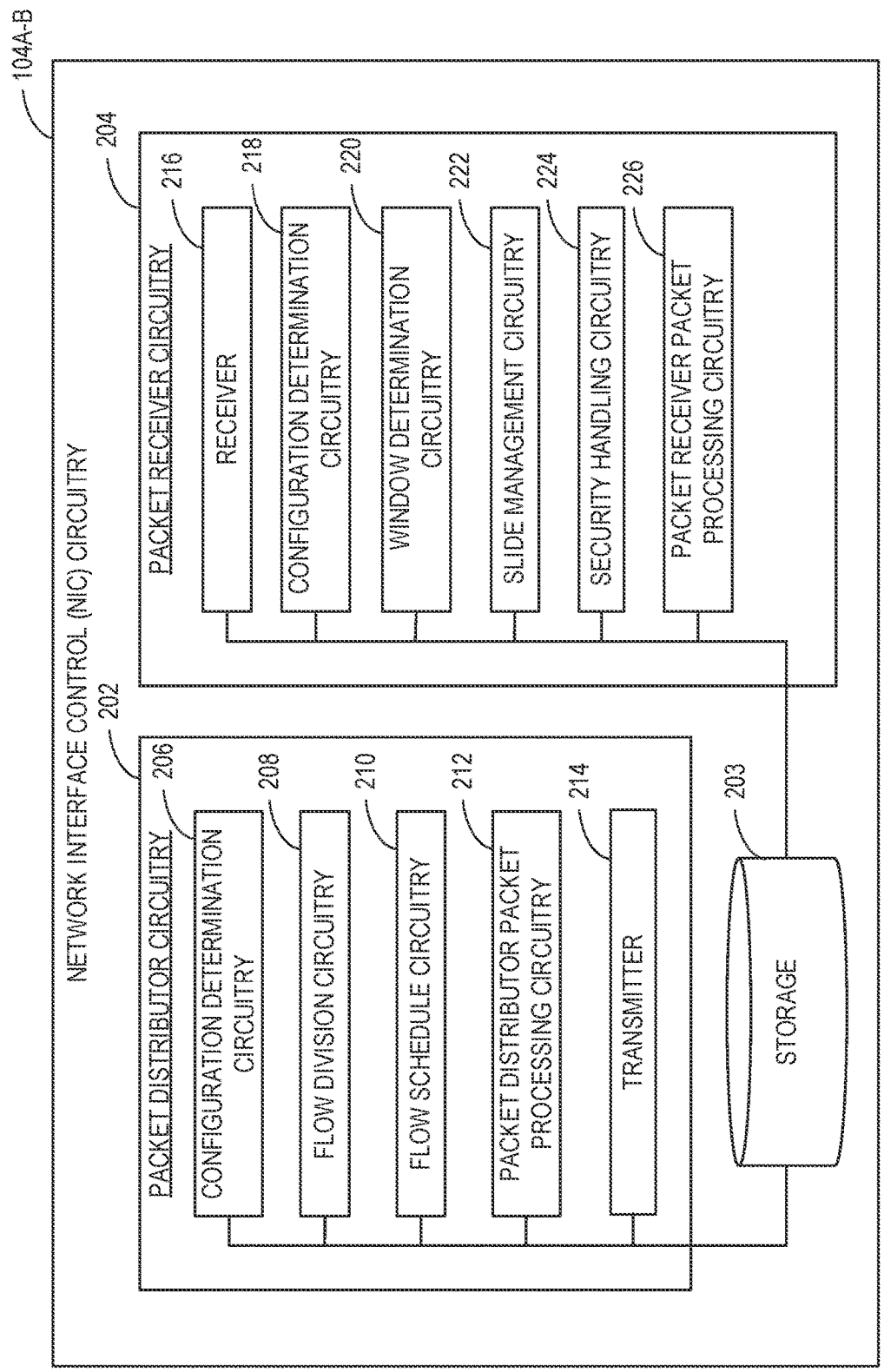
FIG. 2 is a block diagram of an example implementation of the NIC circuitry of FIG. 1.

FIG. 2 depicts a block diagram of an example implementation of the NIC circuitry 104A-B of FIG. 1. For example, the NIC circuitry 104A-B of FIG. 2 may implement the first NIC circuitry 104A of FIG. 1 and/or the second NIC circuitry 104B of FIG. 1. In FIG. 2, the NIC circuitry 104A-B includes example packet distributor circuitry 202, example storage 203, and example packet receiver circuitry 204. In FIG. 2, the packet distributor circuitry 202 includes first example configuration determination circuitry 206, example flow division circuitry 208, example flow schedule circuitry 210, example packet distributor packet processing circuitry 212, and an example transmitter 214. In FIG. 2, the packet receiver circuitry 204 includes an example receiver 216, second example configuration determination circuitry 218, example window determination circuitry 220, example slide management circuitry 222, example security handling circuitry 224, and example packet receiver packet processing circuitry 226.

In the illustrated example of FIG. 2, the NIC circuitry 104A-B includes the packet distributor circuitry 202 to partition a data flow of interest having a sub-atomic requirement into multiple sub flows, scheduling the sub flows for distribution, and/or transmitting the sub flows to a receiving device. In the illustrated example of FIG. 2, the packet distributor circuitry 202 includes the first configuration determination circuitry 206 to determine a configuration, a requirement, a setting, etc., associated with partitioning the data flow. In some examples, the configuration, requirement, setting, etc., may be implemented by data, information, etc., in any form that may be ingested, processed, interpreted, and/or otherwise manipulated by processor circuitry to produce a result. The produced result may itself be data, a machine readable instruction and/or operation that may be executed by the processor circuitry, etc., and/or a combination thereof. In some examples, the configuration, require-ment, setting, etc., may be stored in the storage 203 and thereby may be accessed and/or otherwise retrieved from the storage 203.

In some examples, the first configuration determination circuitry 206 can determine whether the data flow is to be subdivided into two or more sub flows based on the configuration. In some such examples, the first configuration determination circuitry 206 can determine a format of a sub flow identifier based on the configuration. For example, the first configuration determination circuitry 206 can determine the format to be a bit stream, a bit concatenation, a hash (e.g., a hash generated by executing a computer hash algorithm) of a concatenation of at least one of a flow identifier or a parallel window identifier, etc., based on at least one of a flow identifier of the data flow or a quantity of the sub flows.

In the illustrated example of FIG. 2, the packet distributor circuitry 202 includes the flow division circuitry 208 to divide the data flow into two or more sub flows. For example, the flow division circuitry 208 may divide the data flow into the two or more sub flows as described below in connection with FIGS. 3A, 3B, and/or 3C. In some examples, the flow division circuitry 208 generates the sub flows using a round-robin distribution schema or technique. For example, the flow division circuitry 208 can convert and/or otherwise transform a data flow into two or more sub flows based on the example of Equation (1) below:

$$\text{sub flow} = N * \text{flow} + (\text{last sub flow} + 1) \% N, \quad \text{Equation (1)}$$

In some examples, the flow division circuitry 208 may determine the packet flow distribution configuration based on the example of Equation (1) above. In the example of Equation (1) above, flow is an identifier (e.g., a flow identifier) of the data flow (e.g., flows in a set of flows may be identified with different unique indices beginning with 0 and incremented up to F−1, where F is the number of flows in the set of flows). In the example of Equation (1) above, N is a quantity of the sub flows for each flow. In the example of Equation (1) above, last sub flow is a previous sub flow identifier. In the example of Equation (1) above, sub flow is a current sub flow identifier. Advantageously, the flow division circuitry 208 may determine sub flow identifiers for respective ones of sub flows of a packet flow by execution (e.g., iteratively executing) the example of Equation (1) above. Advantageously, the flow division circuitry 208 may partition the packet flow based on the sub flow identifiers. In some examples, the flow division circuitry 208 maintains independent sequence number (SN) generation for each sub flow. For example, the flow division circuitry 208 can generate, for a given sub flow, the SN and increment the SN in increments of N as described in the example of Equation (2) below:

$$\text{Next } SN = \text{last } SN + N, \quad \text{Equation (2)}$$

Advantageously, the flow division circuitry 208 can execute a round-robin distribution schema or technique to effectuate SN generation for data packets in their arrival sequence without any holes while effectuating parallel outbound processing.

In some examples, the packet distributor circuitry 202 includes means for partitioning a packet flow into two or more sub flows based on a packet flow distribution configuration. For example, the means for partitioning may be implemented by the flow division circuitry 208. In some examples, the means for partitioning is to partition the packet flow based on a round robin distribution or a random distribution. In some examples in which the packet flow is a second packet flow to be processed after a first packet flow, the means for partitioning is to determine a quantity of the two or more sub flows, determine a first flow identifier of the first packet flow, determine a second flow identifier of the second packet flow, determine a third flow identifier of a first one of the two or more sub flows based on a first sum of (1) a multiplication of the quantity of the two or more sub flows and the first flow identifier and (2) a modulus of the quantity of the two or more sub flows and a second sum of the second flow identifier and a constant value, and partition the second packet flow based on the third flow identifier. In some examples, the means for partitioning is included in an accelerated networking device (e.g., a device that may be implemented by accelerated networking circuitry), which may be implemented by an IPU, as described herein.

Figure 12:
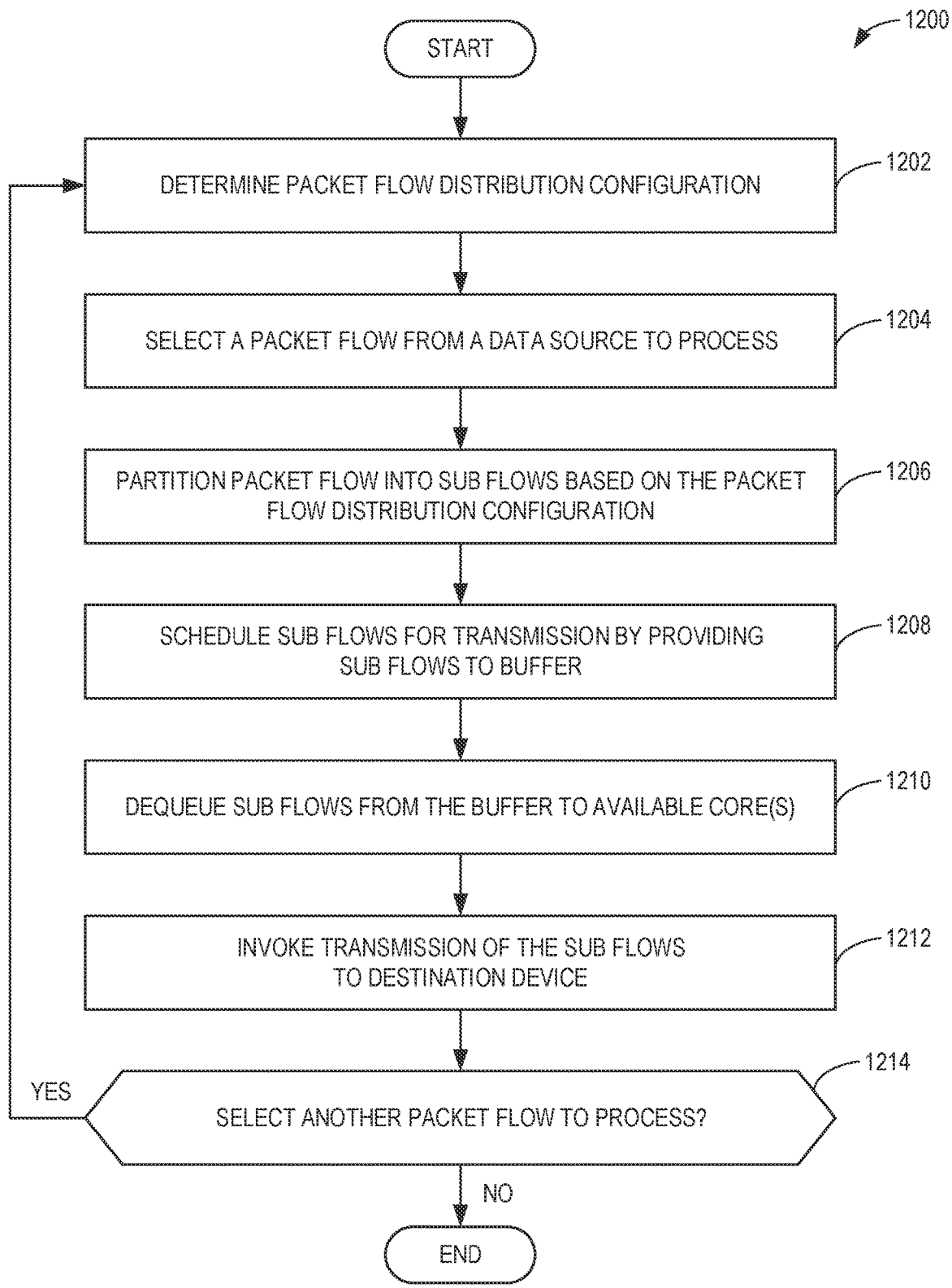
FIG. 12 is a flowchart representative of example machine readable instructions and/or operations that may be executed and/or instantiated to implement the example NIC circuitry of FIGS. 1, 2, and/or 8 and/or the IPUs of FIGS. 6 and/or 7 to invoke transmission of sub flows to a destination logic entity.
Figure 14:
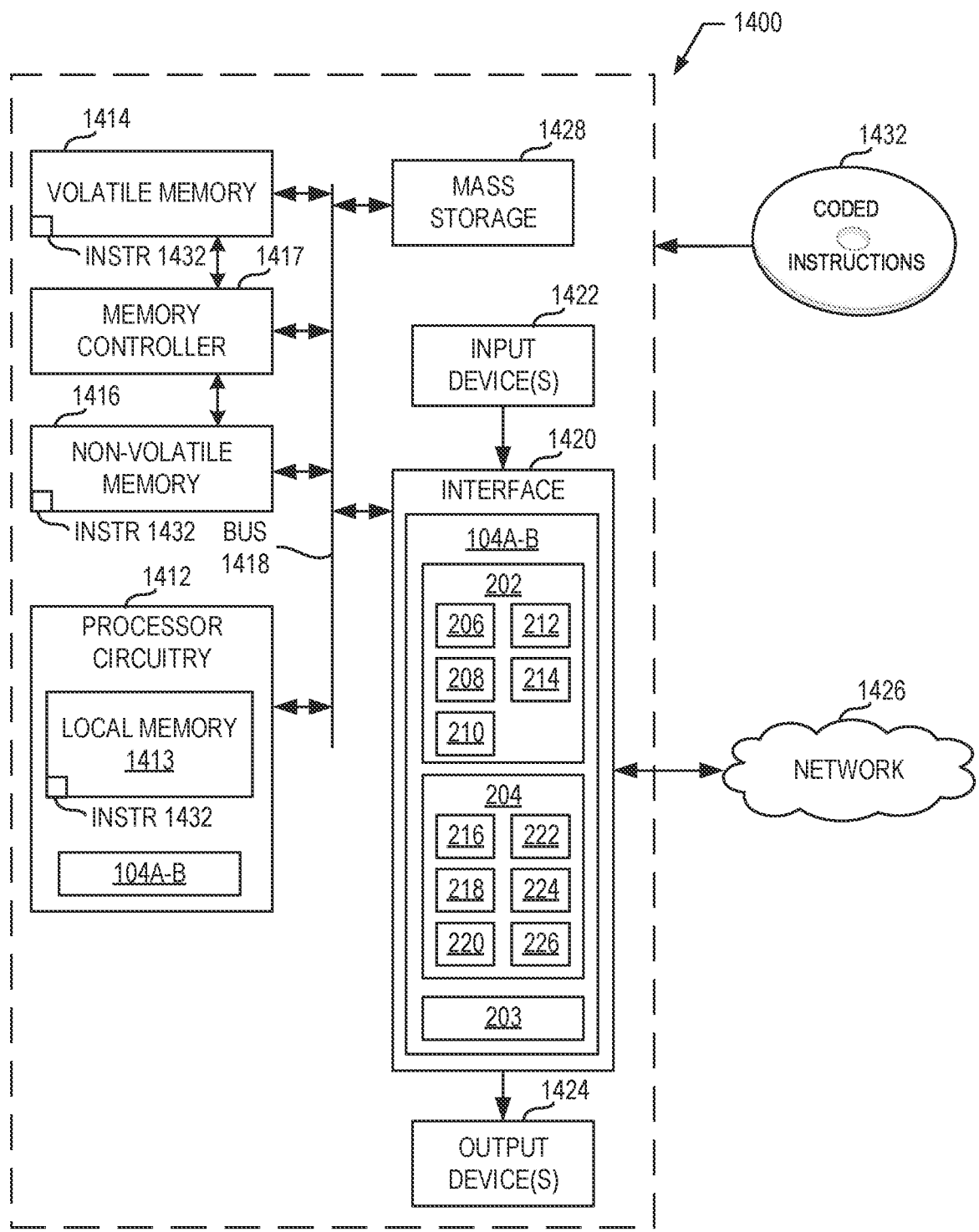
FIG. 14 is a block diagram of a first example processor platform structured to execute the example machine readable instructions of FIGS. 12 and/or 13 to implement the example NIC circuitry of FIGS. 1, 2, and/or 8, the IPUs of FIGS. 6 and/or 7, and/or multi-core processor circuitry as disclosed herein.
Figure 15:
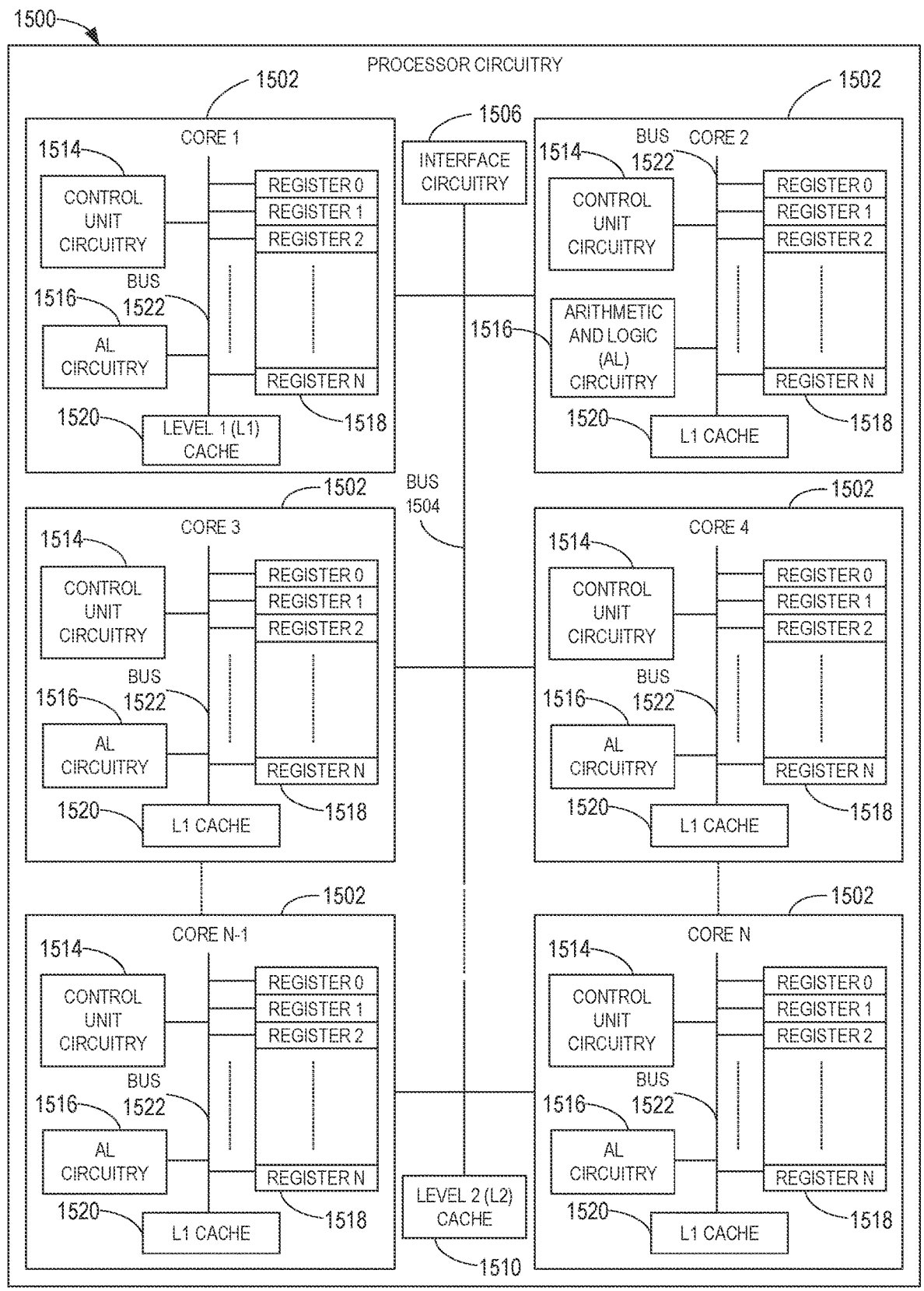
FIG. 15 is a block diagram of an example implementation of the processor circuitry of FIG. 14.
Figure 16:
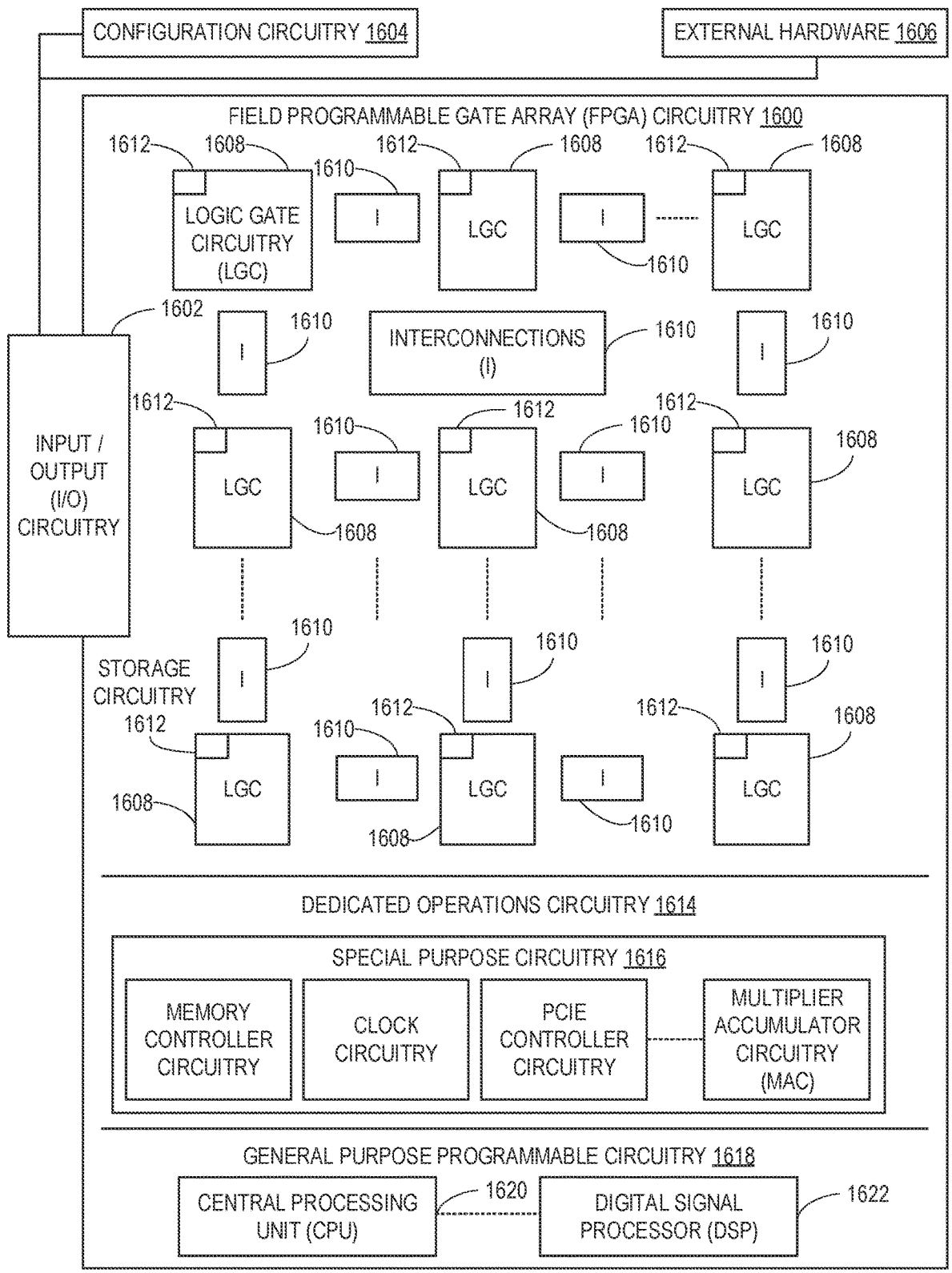
FIG. 16 is a block diagram of another example implementation of the processor circuitry of FIG. 14.

In some examples, the flow division circuitry 208 may be implemented by machine executable instructions such as that implemented by at least blocks 1204, 1206, and 1214 of FIG. 12 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the flow division circuitry 208 is implemented by other hardware logic circuitry, hardware implemented state machines, and/or any other combination of hardware, software, and/or firmware. For example, the flow division circuitry 208 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In the illustrated example of FIG. 2, the packet distributor circuitry 202 includes the flow schedule circuitry 210 to schedule data packets of a data flow for distribution. In some examples, the flow schedule circuitry 210 implements enqueue logic to enqueue the sub flows into a buffer (e.g., an enqueue buffer, a sub flow buffer, etc.) from which available cores (e.g., hardware cores, processor circuitry cores, etc.) can retrieve the sub flows for distribution. In some examples, the flow schedule circuitry 210 effectuates parallel processing on recipient cores by generating and maintaining sub flow states. For example, the flow schedule circuitry 210 can generate a sub flow state and assign the sub flow state to an available recipient core.

In some examples, the packet distributor circuitry 202 includes means for providing two or more sub flows to a buffer to schedule distribution of the two or more sub flows, the two or more sub flows associated respectively with two or more parallel sliding windows that are able to slide in parallel. For example, the means for providing may be implemented by the flow schedule circuitry 210. In some examples, the means for providing is to dequeue the two or more sub flows from the buffer to one or more hardware cores. In some examples in which the two or more parallel sliding windows include a first parallel sliding window and a second parallel sliding window, the means for providing is to determine a first slide rate associated with the first parallel sliding window, and determine a second slide rate associated with the second parallel sliding window.

In some examples in which the one or more hardware cores include a first hardware core and a second hardware core, the means for providing is to identify the first hardware core as available based on a first utilization of the first hardware core, identify the second hardware core as unavailable based on a second utilization of the second hardware core, the second utilization greater than the first utilization, and dequeue the two or more sub flows from the buffer to the first hardware core in response to the identification of the first hardware core as available. In some examples, the means for providing is to dequeue the two or more sub flows from the buffer to an assigned sequence number space of the first hardware core, and cause the first hardware core to provide the two or more sub flows to a transmit sequence number space of the means for transmitting, the means for transmitting to transmit the two or more sub flows from the transmit sequence number space to the destination device. In some examples, the means for providing is included in an accelerated networking device, which may be implemented by an IPU, as described herein.

In some examples, the flow schedule circuitry 210 may be implemented by machine executable instructions such as that implemented by at least blocks 1208 and 1210 of FIG. 12 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the flow schedule circuitry 210 is implemented by other hardware logic circuitry, hardware implemented state machines, and/or any other combination of hardware, software, and/or firmware. For example, the flow schedule circuitry 210 may be implemented by at least one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware, but other structures are likewise appropriate.

In the illustrated example of FIG. 2, the packet distributor circuitry 202 includes the packet distributor packet processing circuitry 212 to process a packet, a sub flow, etc., of interest. In some examples, the packet distributor packet processing circuitry 212 executes one or more packet processing techniques. For example, the packet distributor packet processing circuitry 212 can implement one or more IPsec functions and/or operations, such as executing one or more cryptographic functions and/or operations, execute network-level peer authentication, data-origin authentication, data integrity checks, encryption and/or decryption tasks, replay protection, etc., and/or a combination thereof. In some such examples, the packet distributor packet processing circuitry 212 can adjust, modify, and/or generate a header, a payload, etc., of a data packet of interest.

In the illustrated example of FIG. 2, the packet distributor circuitry 202 includes the transmitter 214 to transmit the sub flows to a receiving device. For example, the transmitter 214 can transmit the sub flows to a destination endpoint or intermediate receiving device, such as a network node, etc., or any other physical or logical destination entity. In some such examples, the transmitter 214 can transmit the sub flows to the external computing system(s) 126 of FIG. 1 by the network 124 of FIG. 1. In some examples, the transmitter 214 can transmit the sub flows on a first-in first-out basis (FIFO), a last-in first-out (LIFO) basis, etc. In some examples, the transmitter 214 transmits the sub flows responsive to all of the sub flows being scheduled for distribution.

In some examples, the packet distributor circuitry 202 includes means for transmitting two or more sub flows to a destination device. For example, the means for transmitting may be implemented by the transmitter 214. In some examples, at least one of the means for transmitting or the destination device is included in an accelerated networking device, which may be implemented by an IPU, as described herein. For example, the means for transmitting may be included in a first accelerated networking device and/or the destination device may be included in and/or otherwise implement a second accelerated networking device. In some examples, the transmitter 214 may be implemented by machine executable instructions such as that implemented by at least block 1212 of FIG. 12 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the transmitter 214 is implemented by other hardware logic circuitry, hardware implemented state machines, and/or any other combination of hardware, software, and/or firmware. For example, the transmitter 214 may be implemented by at least a transmitter, a transceiver, a modem, a residential gateway, a wireless access point, a network interface, one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the NIC circuitry 104A-B includes the packet receiver circuitry 204 to generate a primary sliding window based on an incoming data flow and partition the primary sliding window into multiple parallel windows that are independently operable without any synchronization primitives. For example, a synchronization primitive can be a condition variable, an exclusive lock, an event, a mutex, a semaphore, a shared lock, etc., used to implement synchronization (e.g., data synchronization).

In the illustrated example of FIG. 2, the packet receiver circuitry 204 includes the receiver 216 to receive a data flow from a transmitting device. For example, the receiver 216 can receive the data flow from an origination endpoint or intermediate transmitting device, such as a network node, etc., or any other physical or logical destination entity. In some such examples, the receiver 216 can receive the data flow from the external computing system(s) 126 of FIG. 1 by the network 124 of FIG. 1.

In the illustrated example of FIG. 2, the packet receiver circuitry 204 includes the second configuration determination circuitry 218 to determine a configuration, a requirement, a setting, etc., associated with transforming the incoming data flow into a primary window and transforming the primary window into two or more parallel windows. For example, the second configuration determination circuitry 218 can determine whether the data flow is to be subdivided into two or more parallel windows. In some examples, the second configuration determination circuitry 218 configures and/or otherwise defines the two or more parallel windows with orthogonal properties. In some examples, the second configuration determination circuitry 218 constrains the parallel windows by ensuring that the individual parallel windows do not differ by more than N, which is the number of the parallel windows. In some such examples, the second configuration determination circuitry 218 ensures that the individual parallel windows do not drift off from the intended combined window.

In some examples, the packet distributor circuitry 202 and/or the packet receiver circuitry 204 includes means for determining a packet flow distribution configuration is indicative of a round robin distribution or a random distribution. For example, the means for determining may be implemented by the first configuration determination circuitry 206 and/or the second configuration determination circuitry 218. In some examples, the first configuration determination circuitry 206 and/or the second configuration determination circuitry 218 may be implemented by machine executable instructions such as that implemented by at least blocks 1202 of FIG. 12 and/or block 1302 of FIG. 13 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the first configuration determination circuitry 206 and/or the second configuration determination circuitry 218 is/are implemented by other hardware logic circuitry, hardware implemented state machines, and/or any other combination of hardware, software, and/or firmware. For example, the first configuration determination circuitry 206 and/or the second configuration determination circuitry 218 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the packet receiver circuitry 204 includes the window determination circuitry 220 determines which of the parallel windows to assign a data packet from a primary window. In some examples, the window determination circuitry 220 partitions the primary window into N parallel windows based on the example of Equation (3) below:

$$\text{parallel window} = \text{incoming } SN \ \% \ N, \qquad \text{Equation (3)}$$

In the example of Equation (3) above, incoming SN is an SN of a data packet to process from a primary window, N is the number of parallel windows, parallel window is the parallel window to assign the data packet to process, and % refers to the modulo operation.

In some examples, the window determination circuitry 220 determines the parallel windows to be and/or otherwise based on per sub flow and to be independent of a core, such as a core of the interface circuitry 114. Advantageously, the example window determination circuitry 220 can allow for more than one sub flow to be affined to a given core to prevent throttling of multi-flow performance with enqueue time packet distributors or quanta-based packet distributors.

In some examples, the packet receiver circuitry 204 includes means for updating two or more sliding windows with data included in two or more sub flows. In some examples, the two or more sliding windows may implement two or more parallel sliding windows. For example, the means for updating may be implemented by the window determination circuitry 220. In some examples, the window determination circuitry 220 may be implemented by machine executable instructions such as that implemented by at least blocks 1306, 1308, 1312 of FIG. 13 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the window determination circuitry 220 is implemented by other hardware logic circuitry, hardware implemented state machines, and/or any other combination of hardware, software, and/or firmware. For example, the window determination circuitry 220 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate. In some examples, the means for updating includes means for modifying a primary window into the two or more sliding windows based on a modulus of a sequence number of the packet flow and a quantity of the two more sliding windows.

In the illustrated example of FIG. 2, the packet receiver circuitry 204 includes the slide management circuitry 222 to effectuate window management of the individual parallel windows. In some examples, the slide management circuitry 222 implements an algorithm, such as an IPsec Anti-Replay Algorithm without Bit Shifting as defined in *IPsec Anti-Replay Algorithm without Bit Shifting, RFC* 6479, *Internet Engineering Task Force (IETF)*, or an Anti-Replay Window Algorithm as defined in *Security Architecture for the Internet Protocol, RFC* 2401, *Internet Engineering Task Force (IETF)*, or any other algorithm to manage the sliding of the individual parallel windows. For example, the slide management circuitry 222 can slide and/or otherwise cause the parallel windows to move responsive to a window threshold being satisfied. In some examples, the slide management circuitry 222 can adjust the parallel windows to slide in parallel. For example, the parallel windows may include a first parallel window and a second parallel window. In some such examples, the slide management circuitry 222 may slide the first parallel window and the second parallel window at the same rate to cause the first parallel window and the second parallel window to slide in parallel. In some examples, the slide management circuitry 222 may slide the first parallel window and the second parallel window at the same time to cause the first parallel window and the second parallel window to slide in parallel. As used herein "threshold" is defined to be data such as a numerical value represented in any form, that may be used by processor circuitry as a reference for a comparison operation. In some examples, the slide management circuitry 222 bounds the slide of the parallel windows to the primary window. For example, the slide management circuitry 222 can cause the read-only states of the parallel windows to be shared.

In some examples, the packet receiver circuitry 204 includes means for sliding two or more parallel windows in response to a window threshold being satisfied. For example, the means for sliding may be implemented by the slide management circuitry 222. In some examples, the slide management circuitry 222 may be implemented by machine executable instructions such as that implemented by at least blocks 1314 and 1316 of FIG. 13 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the slide management circuitry 222 is implemented by other hardware logic circuitry, hardware implemented state machines, and/or any other combination of hardware, software, and/or firmware. For example, the slide management circuitry 222 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the packet receiver circuitry 204 includes the security handling circuitry 224 to analyze at least one of the incoming data flow, the primary window (e.g., data included in the primary window, missing data in the primary window that is expected to be in the primary window, etc.), one(s) of the parallel windows (e.g., data included in one or more parallel windows, missing data in one or more parallel windows that is expected to be in the one or more parallel windows, etc.), etc. In some examples, the security handling circuitry 224 can determine that a network (e.g., the network 124 of FIG. 1) is impaired, an attack is being made on the network (e.g., a network attack, a network intrusion, etc.) or the computing system 102 is experiencing an attack (e.g., a replay attack) from a malicious actor, etc. In some such examples, the security handling circuitry 224 can identify the impairment and/or the attack based on one or more parallel windows sliding and/or otherwise moving at faster rates (e.g., slide rates, rates of sliding, etc.) than other parallel windows. By way of example where N=3, consider a packet sequence of an arriving data flow where only every third data packet reaches the receiver 216 and the other data packets are either dropped or unduly delayed in the network. In some such examples, one parallel window may slide faster than the others and cause reduced efficiency. Advantageously, by identifying the impairment and/or the attack, the security handling circuitry 224 can execute security enforcement actions, mitigation measures, etc., to improve efficiency, remove the impairment, and/or cease the attack.

In some examples, the packet receiver circuitry 204 includes means for identifying a network attack. In some such examples, two or more sliding windows include a first sliding window and a second sliding window, and the means for identifying is to identify the network attack in response to a determination that a first slide rate associated with the first sliding window is greater than a second slide rate associated with the second sliding window. For example, the means for identifying may be implemented by security handling circuitry 224. In some examples, the security handling circuitry 224 may be implemented by machine executable instructions such as that implemented by at least block 1310 of FIG. 13 executed by processor circuitry, which may be implemented by the example processor circuitry 1412 of FIGS. 14 and/or 17, the example processor circuitry 1500 of FIG. 15, and/or the FPGA circuitry 1600 of FIG. 16. In other examples, the security handling circuitry 224 is implemented by other hardware logic circuitry, hardware implemented state machines, and/or any other combination of hardware, software, and/or firmware. For example, the security handling circuitry 224 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In the illustrated example of FIG. 2, the packet receiver circuitry 204 includes the packet receiver packet processing circuitry 226 to process a packet, a sub flow, etc., of interest. In some examples, the packet receiver packet processing circuitry 226 executes one or more packet processing techniques. For example, the packet receiver packet processing circuitry 226 can implement one or more IPsec functions and/or operations, such as executing one or more cryptographic functions and/or operations, execute network-level peer authentication, data-origin authentication, data integrity checks, encryption and/or decryption tasks, replay protection, etc., and/or a combination thereof. In some such examples, the packet receiver packet processing circuitry 226 can adjust, modify, and/or generate a header, a payload, etc., of a data packet of interest.

In the illustrated example of FIG. 2, the NIC circuitry 104A-B includes the storage 203 to record data (e.g., one or more sub flows, one or more sub flow identifiers, one or more buffers, one or more flow identifiers, one or more desired degrees of parallelization configuration, one or more SNs of incoming data packet(s), one or more parallel window identifiers, one or more sub flow identifiers, one or more configurations, one or more settings, one or more requirements, etc.). In this example, the packet distributor circuitry 202, or portion(s) thereof, and/or the packet receiver circuitry 204, or portion(s) thereof, can access the storage 203 (e.g., query the storage 203 to determine whether data of interest is stored in the storage 203, retrieve data from the storage 203, store data in the storage 203, etc.). The storage 203 of this example may be implemented by a volatile memory (e.g., SDRAM, DRAM, RDRAM, etc.) and/or a non-volatile memory (e.g., flash memory). The storage 203 may additionally or alternatively be implemented by one or more DDR memories, such as DDR, DDR2, DDR3, DDR4, mDDR, etc. The storage 203 may additionally or alternatively be implemented by one or more mass storage devices such as HDD(s), CD drive(s), DVD drive(s), SSD drive(s), etc. While in the illustrated example the storage 203 is illustrated as a single storage, the storage 203 may be implemented by any number and/or type(s) of storages. Furthermore, the data stored in the storage 203 may be in any data format such as, for example, binary data, comma delimited data, tab delimited data, SQL structures, etc.

While an example manner of implementing the NIC circuitry 104A-B of FIG. 1 is illustrated in FIG. 2, one or more of the elements, processes, and/or devices illustrated in FIG. 2 may be combined, divided, re-arranged, omitted, eliminated, and/or implemented in any other way. Further, the example storage 203, and/or the first example configuration determination circuitry 206, the example flow division circuitry 208, the example flow schedule circuitry 210, the example packet distributor packet processing circuitry 212, the example transmitter 214, and/or, more generally, the example packet distributor circuitry 202, and/or the example receiver 216, the second example configuration determination circuitry 218, the example window determination circuitry 220, the example slide management circuitry 222, the example security handling circuitry 224, the example packet receiver packet processing circuitry 226, and/or, more generally, the example packet receiver circuitry 204, and/or, more generally, the example NIC 104A-B of FIG. 1, may be implemented by hardware, software, firmware and/or any combination of hardware, software and/or firmware. Thus, for example, any of the example storage 203, and/or the first example configuration determination circuitry 206, the example flow division circuitry 208, the example flow schedule circuitry 210, the example packet distributor packet processing circuitry 212, the example transmitter 214, and/or, more generally, the example packet distributor circuitry 202, and/or the example receiver 216, the second example configuration determination circuitry 218, the example window determination circuitry 220, the example slide management circuitry 222, the example security handling circuitry 224, the example packet receiver packet processing circuitry 226, and/or, more generally, the example packet receiver circuitry 204, and/or, more generally, the example NIC circuitry 104A-B, could be implemented by one or more analog or digital circuit(s), logic circuits, programmable processor(s), programmable controller(s), GPU(s), DSP(s), ASIC(s), PLD(s), and/or FPLD(s). When reading any of the apparatus or system claims of this patent to cover a purely software and/or firmware implementation, at least one of the example storage 203, and/or the first example configuration determination circuitry 206, the example flow division circuitry 208, the example flow schedule circuitry 210, the example packet distributor packet processing circuitry 212, the example transmitter 214, and/or, more generally, the example packet distributor circuitry 202, and/or the example receiver 216, the second example configuration determination circuitry 218, the example window determination circuitry 220, the example slide management circuitry 222, the example security handling circuitry 224, the example packet receiver packet processing circuitry 226, and/or, more generally, the example packet receiver circuitry 204, is/are hereby expressly defined to include a non-transitory computer readable storage device or storage disk such as a memory, a DVD, a CD, a Blu-ray disk, etc., including the software and/or firmware. Further still, the example NIC circuitry 104A-B of FIG. 1 may include one or more elements, processes, and/or devices in addition to, or instead of, those illustrated in FIG. 2, and/or may include more than one of any or all of the illustrated elements, processes and devices.

Figure 3A:
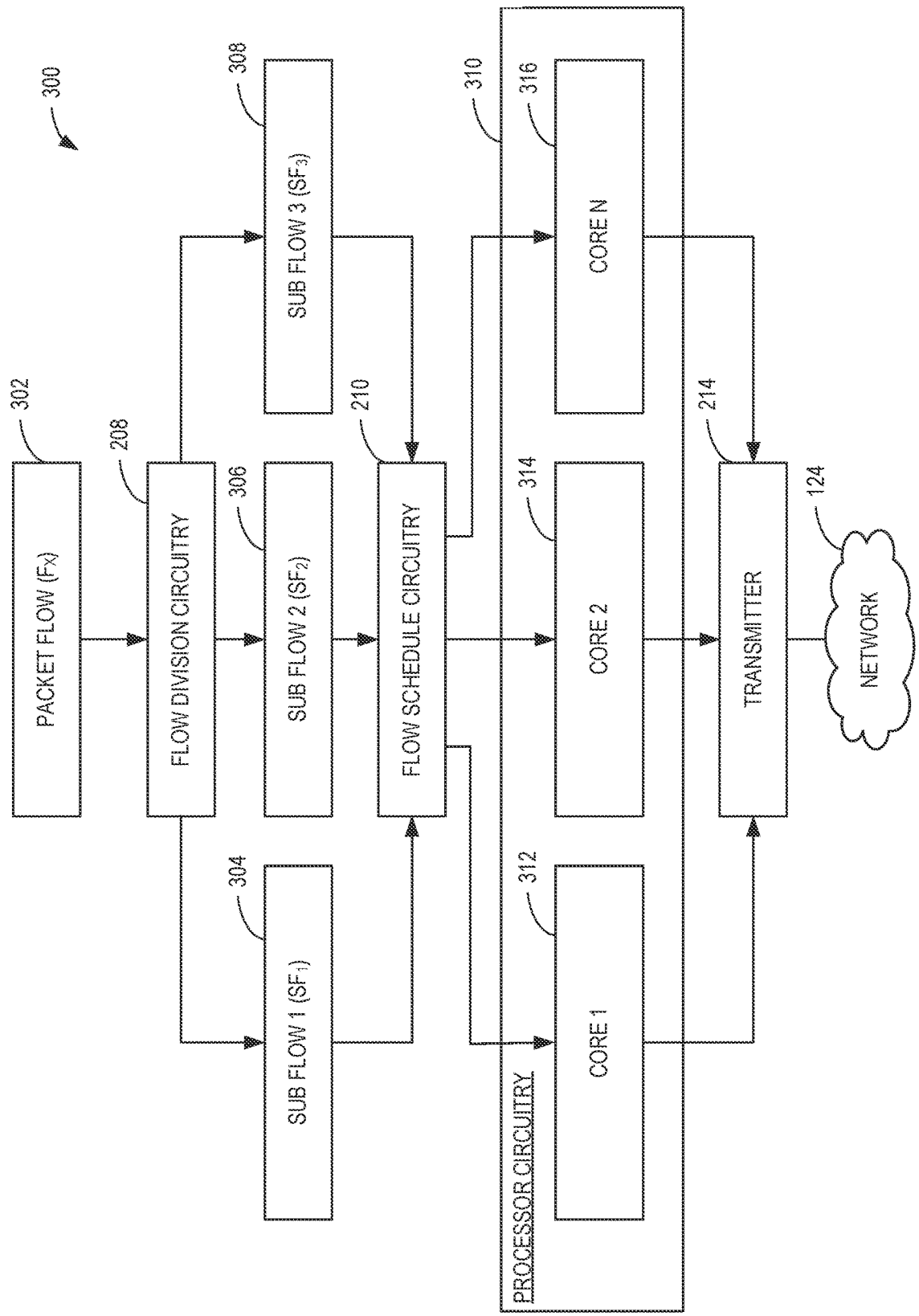
FIG. 3A is a block diagram of a first example workflow to partition an example packet flow into example sub flows.

FIG. 3A depicts a block diagram of a first example workflow 300 that may be implemented and/or otherwise executed to partition an example packet flow 302 into example sub flows 304, 306, 308. The packet flow 302 has a flow identifier (e.g., a packet flow identifier) of $F_X$. In example operation, the flow division circuitry 208 of FIG. 2 receives the packet flow 302 from a data source. For example, the packet flow 302 can be obtained from hardware, software, and/or firmware of the computing system 102 of FIG. 1, such as the CPU 106, the first acceleration circuitry 108, etc., of FIG. 1, and/or a combination thereof.

In example operation, the flow division circuitry 208 partitions and/or otherwise divides the packet flow 302 into the sub flows 304, 306, 308, which include a first example sub flow 304 ($SF_1$), a second example sub flow 306 ($SF_2$), and a third example sub flow 308 ($SF_3$). For example, the flow division circuitry 208 can divide the packet flow 302 based on a configuration associated with partitioning the packet flow 302, where the configuration can include the number of sub flows to be three sub flows (e.g., N=3). Alternatively, the configuration may indicate a different number of sub flows than depicted in the example of FIG. 3A. In example operation, the flow division circuitry 208 divides the packet flow 302 into the sub flows 304, 306, 308 based on a round-robin schema, technique, distribution, etc. Alternatively, the flow division circuitry 208 may divide the packet flow 302 using any other type of distribution (e.g., a random distribution).

In the illustrated example of FIG. 3A, responsive to the generation of the sub flows 304, 306, 308, the flow schedule circuitry 210 of FIG. 2 receives the sub flows 304, 306, 308. In example operation, the flow schedule circuitry 210 schedules one(s) of the sub flows 304, 306, 308 for distribution by example processor circuitry 310. The processor circuitry 310 of FIG. 3A is a microcontroller that includes a first example core (CORE 1) 312, a second example core (CORE 2) 314, and a third example core (CORE N) 316. For example, the processor circuitry 310 can be an example implementation of processor circuitry included in the interface circuitry 114 of FIG. 1. Alternatively, the processor circuitry 310 may include fewer or more cores than depicted in the example of FIG. 3A. In this example, the first core 312, the second core 314, and/or the third core 316, and/or, more generally, the processor circuitry 310, may implement the packet distributor packet processing circuitry 212 of FIG. 2.

In example operation, available one(s) of the cores 312, 314, 316 dequeue one(s) of the sub flows 304, 306, 308 scheduled by the flow schedule circuitry 210 for distribution to a destination device. In example operation, responsive to the dequeuing, one(s) of the cores 312, 314, 316 deliver the dequeued sub flows 304, 306, 308 to the transmitter 214 of FIG. 2 for transmission to a destination by the network 124 of FIG. 1.

Figure 3B:
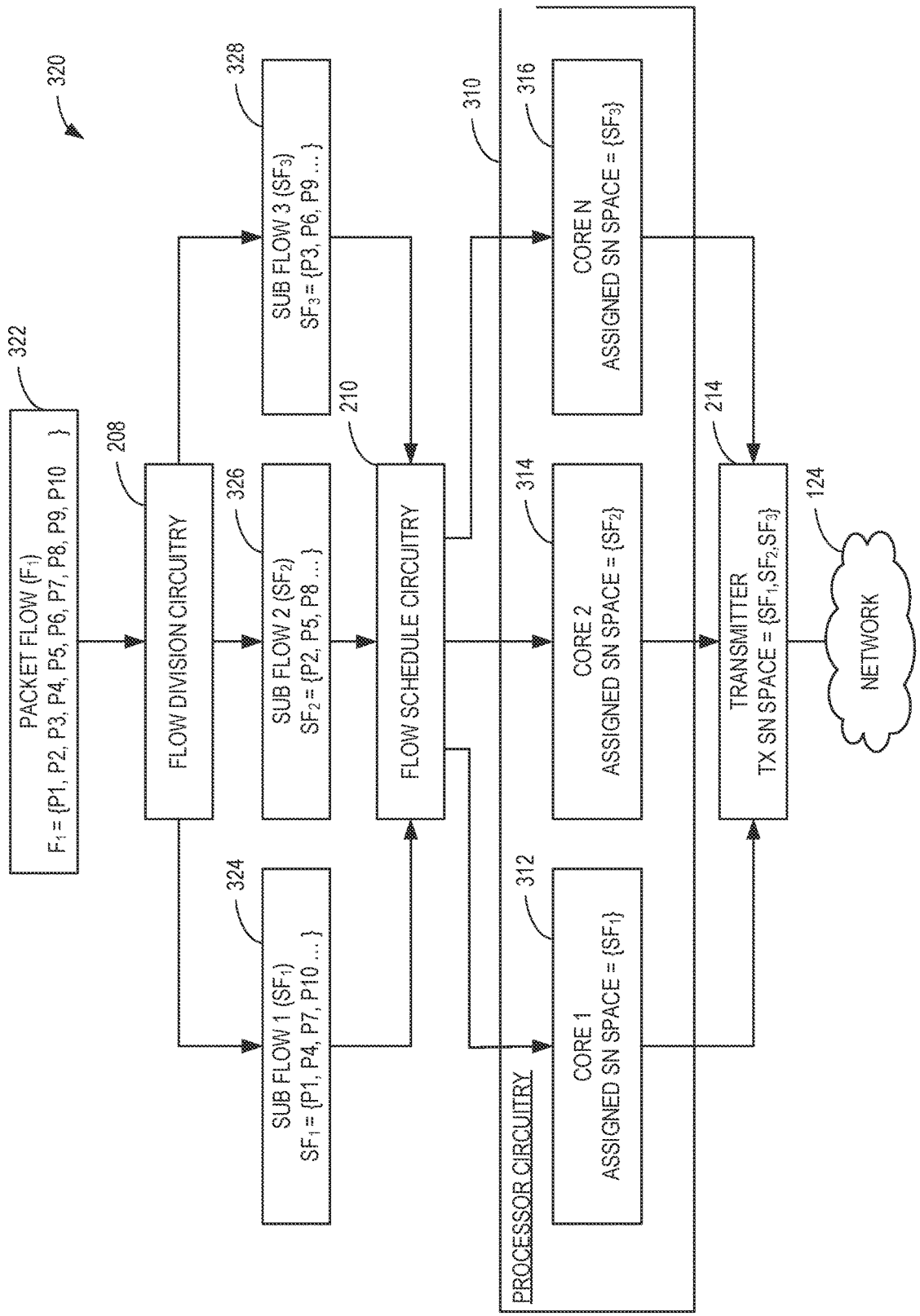
FIG. 3B is a block diagram of a second example workflow to partition an example packet flow into example sub flows.

FIG. 3B depicts a block diagram of a second example workflow 320 that may be implemented and/or otherwise executed to partition an example packet flow 322 into example sub flows 324, 326, 328. The packet flow 322 has a flow identifier (e.g., a packet flow identifier) of $F_1$. In example operation, the flow division circuitry 208 of FIG. 2 receives the packet flow 322 from a data source. For example, the packet flow 322 can be obtained from hardware, software, and/or firmware of the computing system 102, such as the CPU 106, the first acceleration circuitry 108, etc., of FIG. 1, and/or a combination thereof. In the example of FIG. 3B, the packet flow 322 has at least ten data packets (e.g., P1, P2, P3, P4, P5, P6, P7, P8, P9, P10, etc.).

In example operation, the flow division circuitry 208 partitions and/or otherwise divides the packet flow 322 into the sub flows 324, 326, 328, which include a first example sub flow 324 ($SF_1$), a second example sub flow 326 ($SF_2$), and a third example sub flow 328 ($SF_3$). For example, the flow division circuitry 208 can divide the packet flow 322 based on a configuration associated with partitioning the packet flow 322, where the configuration can include the number of sub flows to be three sub flows (e.g., N=3). Alternatively, the configuration may indicate a different number of sub flows than depicted in the example of FIG. 3B. In example operation, the flow division circuitry 208 divides the packet flow 322 into the sub flows 324, 326, 328 based on a round-robin distribution. Alternatively, the flow division circuitry 208 may divide the packet flow 322 using any other type of distribution (e.g., a random distribution).

In the illustrated example of FIG. 3B, the flow division circuitry 208 assigns at least P1, P4, P7, and P10 to the first sub flow 324, at least P2, P5, and P8 to the second sub flow 326, and at least P3, P6, and P9 to the third sub flow 328 based on the round-robin distribution. In the illustrated example of FIG. 3B, responsive to the generation of the sub flows 324, 326, 328, the flow schedule circuitry 210 of FIG. 2 receives the sub flows 324, 326, 328. In example operation, the flow schedule circuitry 210 schedules one(s) of the sub flows 324, 326, 328 for distribution by the example processor circuitry 310 of FIG. 3A.

In the illustrated example of FIG. 3B, the flow schedule circuitry 210 schedules and/or otherwise implements enqueuing logic (e.g., enqueuing hardware logic, enqueuing firmware logic, enqueuing software logic, etc., and/or a combination thereof) to schedule one(s) of the sub flows 324, 326, 328 to one(s) of the cores 312, 314, 316 of FIG. 3A. In the example of FIG. 3B, the flow schedule circuitry 210 schedules the first sub flow 324 to a first assigned SN space of the first core 312, the second sub flow 326 to a second assigned SN space of the second core 314, and the third sub flow 328 to a third assigned SN space of the third core 316. For example, the flow schedule circuitry 210 can determine the assigned SN space of the first core 312 to be {1, 1+3, 1+6, 1+9, . . . } by executing (e.g., iteratively executing) operation(s) based on the example of Equation (2) as described above. In some such examples, the flow schedule circuitry 210 can determine the assigned SN space of the second core 314 to be {2, 2+3, 2+6, 2+9, . . . } by executing (e.g., iteratively executing) operation(s) based on the example of Equation (2) as described above. In some such examples, the flow schedule circuitry 210 can determine the assigned SN space of the third core 316 to be {3, 3+3, 3+6, 3+9, . . . } by executing (e.g., iteratively executing) operation(s) based on the example of Equation (2) as described above.

In some examples, the flow schedule circuitry 210 implements a buffer (e.g., a sub flow buffer) that stores one(s) of the sub flows 324, 326, 328 that is/are ready for distribution. In some such examples, available one(s) of the cores 312, 314, 316 can dequeue one(s) of the sub flows 324, 326, 328 that is/are stored in the buffer. Advantageously, one(s) of the sub flows 324, 326, 328 are not assigned to any particular one(s) of the cores 312, 314, 316 and, thus, available one(s) of the cores 312, 314, 316 can process the one(s) of the sub flows 324, 326, 328 as they are ready for distribution to a destination device.

In example operation, available one(s) of the cores 312, 314, 316 dequeue one(s) of the sub flows 324, 326, 328 scheduled by the flow schedule circuitry 210 for distribution to a destination device. In example operation, in response to the dequeuing, one(s) of the cores 312, 314, 316 deliver the dequeued sub flows 324, 326, 328 to the transmitter 214 of FIG. 2 for transmission to one or more destination devices by the network 124 of FIG. 1. For example, the cores 312, 314, 316 can deliver the sub flows 324, 326, 328 from the respective assigned SN spaces to a transmit (TX) SN space of the transmitter 214 to invoke and/or otherwise direct or cause the transmitter 214 to transmit the sub flows 324, 326, 328 to the one or more destination devices by the network 124.

Figure 3C:
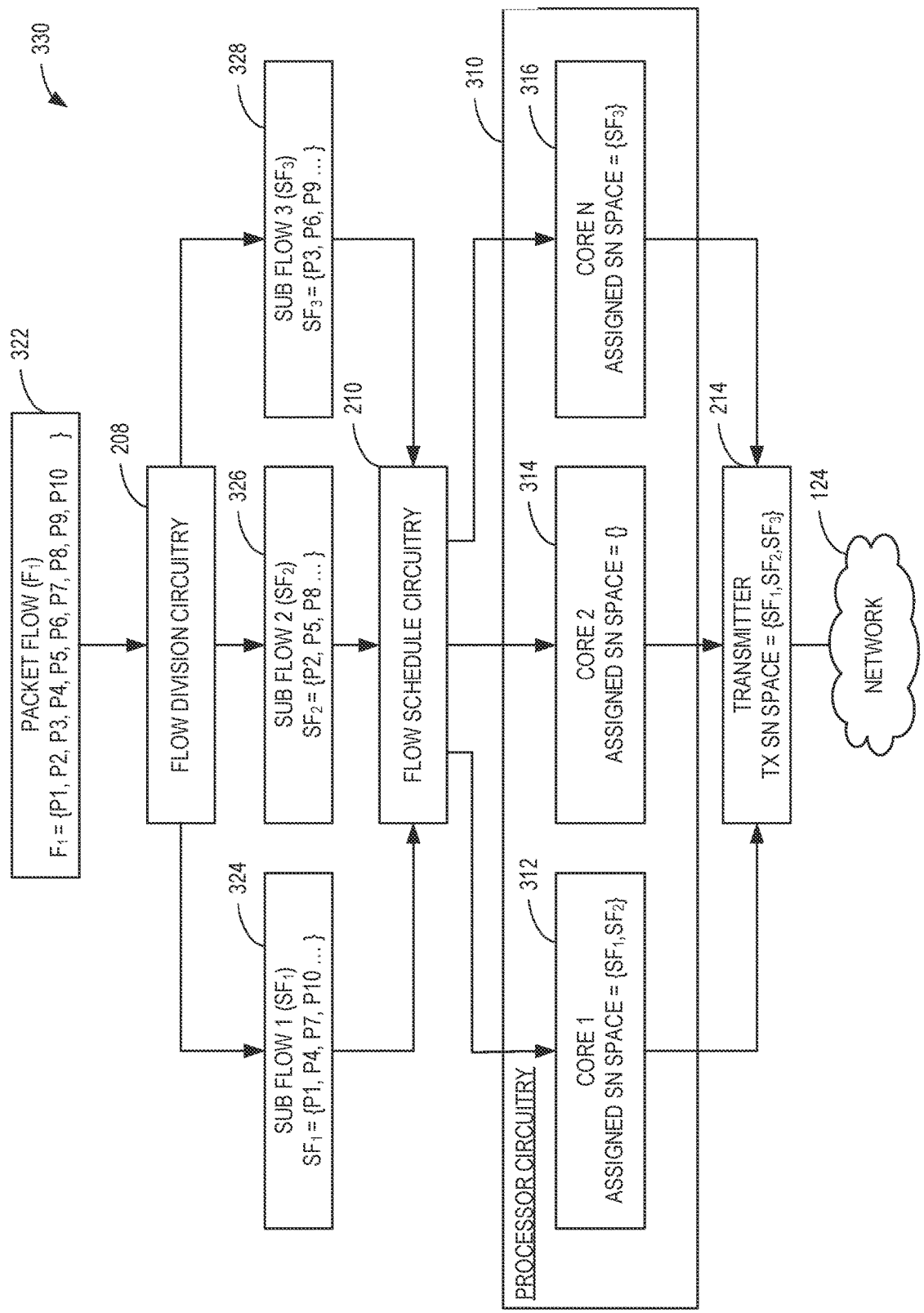
FIG. 3C is a block diagram of a third example workflow to partition an example packet flow into example sub flows.

FIG. 3C depicts a block diagram of a third example workflow 330 that may be implemented to partition the packet flow 322 of FIG. 3B into the sub flows 324, 326, 328 of FIG. 3B. In the illustrated example of FIG. 3C, responsive to the generation of the sub flows 324, 326, 328, the flow schedule circuitry 210 of FIG. 2 receives the sub flows 324, 326, 328. In example operation, the flow schedule circuitry 210 schedules one(s) of the sub flows 324, 326, 328 for distribution by the example processor circuitry 310 of FIGS. 3A and/or 3B.

In the illustrated example of FIG. 3C, the flow schedule circuitry 210 schedules and/or otherwise implements enqueuing logic (e.g., enqueuing hardware logic, enqueuing firmware logic, enqueuing software logic, etc., and/or a combination thereof) to schedule one(s) of the sub flows 324, 326, 328 to one(s) of the cores 312, 314, 316 of FIGS. 3A and/or 3B. In the example of FIG. 3C, the flow schedule circuitry 210 schedules the first sub flow 324 and the second sub flow 326 to the first assigned SN space of the first core 312, and the third sub flow 328 to the third assigned SN space of the third core 316. In the example of FIG. 3C, the flow schedule circuitry 210 identifies the first core 312 and the third core 316 as available based on a utilization of the first core 312 and the third core 316. For example, the flow schedule circuitry 210 may identify the first core 312 as available based on the first core 312 having a first utilization (e.g., 5% utilization, 10% utilization, 25% utilization, etc.) less than a utilization threshold (e.g., a utilization threshold of 70%, 80%, 95%, etc.). In some such examples, the flow schedule circuitry 210 may identify the third core 316 as available based on the third core 316 having a second utilization (e.g., 5% utilization, 10% utilization, 25% utilization, etc.) less than a utilization threshold (e.g., a utilization threshold of 70%, 80%, 95%, etc.). In some such examples, the flow schedule circuitry 210 may determine the first utilization and/or the second utilization by polling the first core 312 and/or the third core 316 for data (e.g., resource, utilization, and/or telemetry data including the first utilization and/or the third utilization), one or more registers of the first core 312 and/or the third core 316 for data (e.g., resource, utilization, and/or telemetry data including the first utilization and/or the third utilization), etc.

In the example of FIG. 3C, the second core 314 is not available to process one(s) of the sub flows 324, 326, 328. For example, the second core 314 may be executing computing tasks to cause the second core 314 to be substantially utilized, fully utilized, etc., (e.g., 80% utilized, 90% utilized, 100% utilized, etc.) and thereby be unavailable to process one(s) of the sub flows 324, 326, 328. For example, the flow schedule circuitry 210 may identify the second core 314 as unavailable based on the second core 314 having a third utilization (e.g., 75% utilization, 85% utilization, 98% utilization, etc.) greater than a utilization threshold (e.g., a utilization threshold of 70%, 80%, 95%, etc.) and the flow schedule circuitry 210 may thereby determine that the third utilization satisfies the utilization threshold in this example. Advantageously, the sub flows 324, 326, 328 are not assigned to any particular one of the cores 312, 314, 316 and, thus, available one(s) of the cores 312, 314, 316, such as the first core 312 and the third core 316, can process the sub flows 324, 326, 328 as they are ready for distribution to a destination device.

In example operation, available one(s) of the cores 312, 314, 316 dequeue one(s) of the sub flows 324, 326, 328 scheduled by the flow schedule circuitry 210 for distribution to a destination device. For example, the first core 312 can be available at a first time while the second core 314 and the third core 316 are unavailable at the first time. In some such examples, the first core 312 can process the first sub flow 324 at the first time and the second sub flow 326 at a second time, which may be after the first time. In some such examples, the second core 314 can be unavailable and the third core 316 can become available after the first time (e.g., at the second time). At the second time, the third core 316 can dequeue the third sub flow 328 for processing (e.g., to implement and/or execute one or more IPsec functions and/or operations on the third sub flow 328).

In example operation, responsive to the dequeuing, the first core 312 and the third core 316 deliver the dequeued sub flows 324, 326, 328 to the transmitter 214 of FIG. 2 for transmission to a destination device by the network 124 of FIG. 1. For example, the first core 312 and the third core 316 can deliver the sub flows 324, 326, 328 from the respective assigned SN spaces to a transmit (TX) SN space of the transmitter 214 to invoke the transmitter 214 to transmit the sub flows 324, 326, 328 to the destination device by the network 124. In some such examples, the transmitter 214 can transmit the sub flows 324, 326, 328 after all of the sub flows 324, 326, 328 have been processed. In other examples, the transmitter 214 can transmit one(s) of the sub flows 324, 326, 328 as they are processed and/or otherwise become available for distribution.

Figure 4:
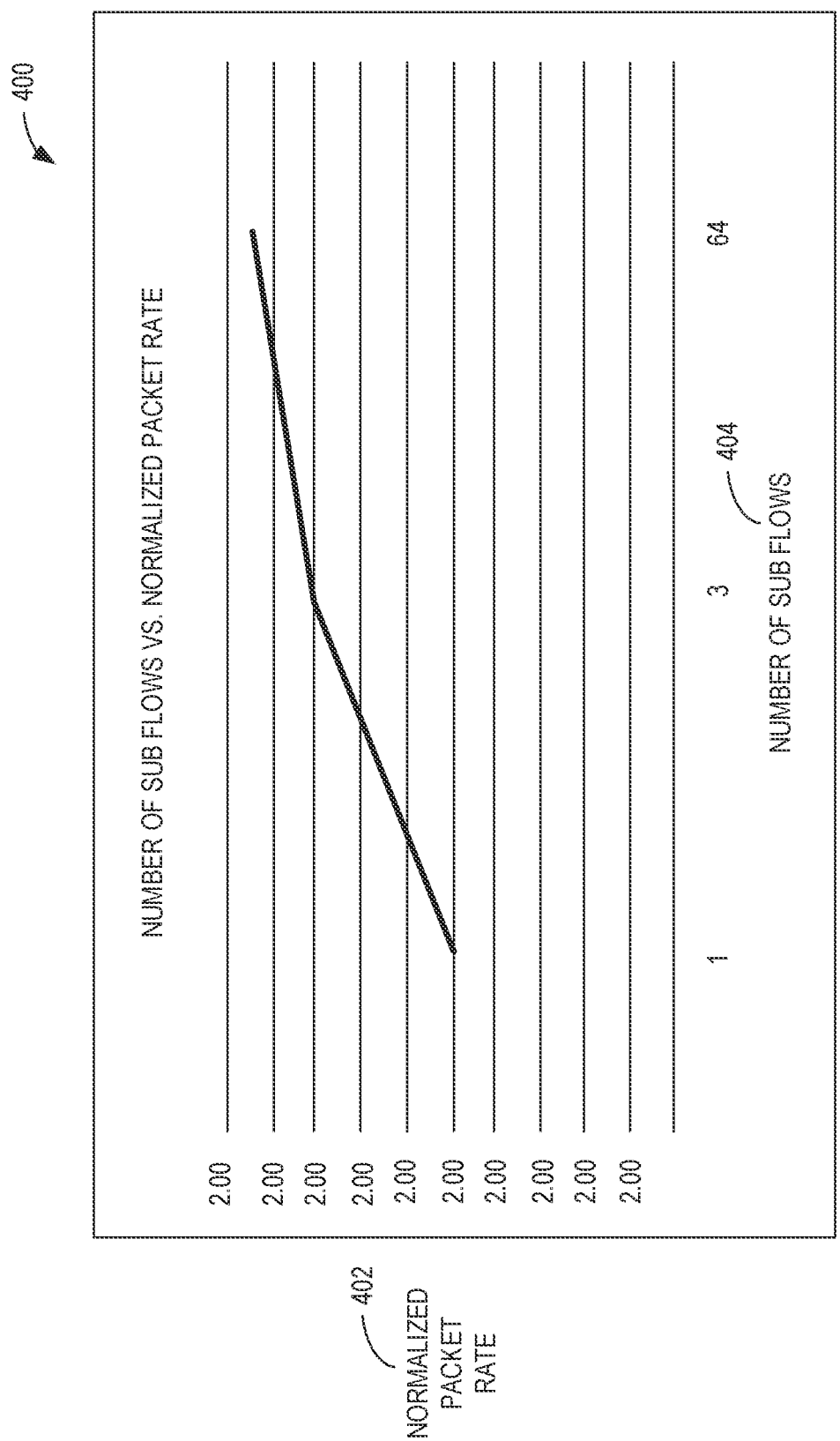
FIG. 4 is a graph of example normalized packet rates with respect to example numbers of sub flows.

FIG. 4 depicts a graph 400 of example normalized packet rates 402 with respect to an example number of sub flows 404. The graph 400 of the example of FIG. 4 depicts multi-flow scaling in a multi-threaded system for 1, 3, and 64 sub flows. For example, the graph 400 depicts the multi-flow scaling in a first example where N=1, N=3, and N=64. Advantageously, the flow division circuitry 208 of FIG. 2, and/or, more generally, the packet distributor circuitry 202 of FIG. 2, can improve data throughput of the interface circuitry 114 of FIG. 1, and/or, more generally, the computing system 102 of FIG. 1, by dividing, fragmenting, and/or otherwise splitting up a packet flow (e.g., the packet flow 302 of FIG. 3A and/or the packet flow 322 of FIGS. 3B and/or 3C) to increase the number of sub flows.

Figure 5A:
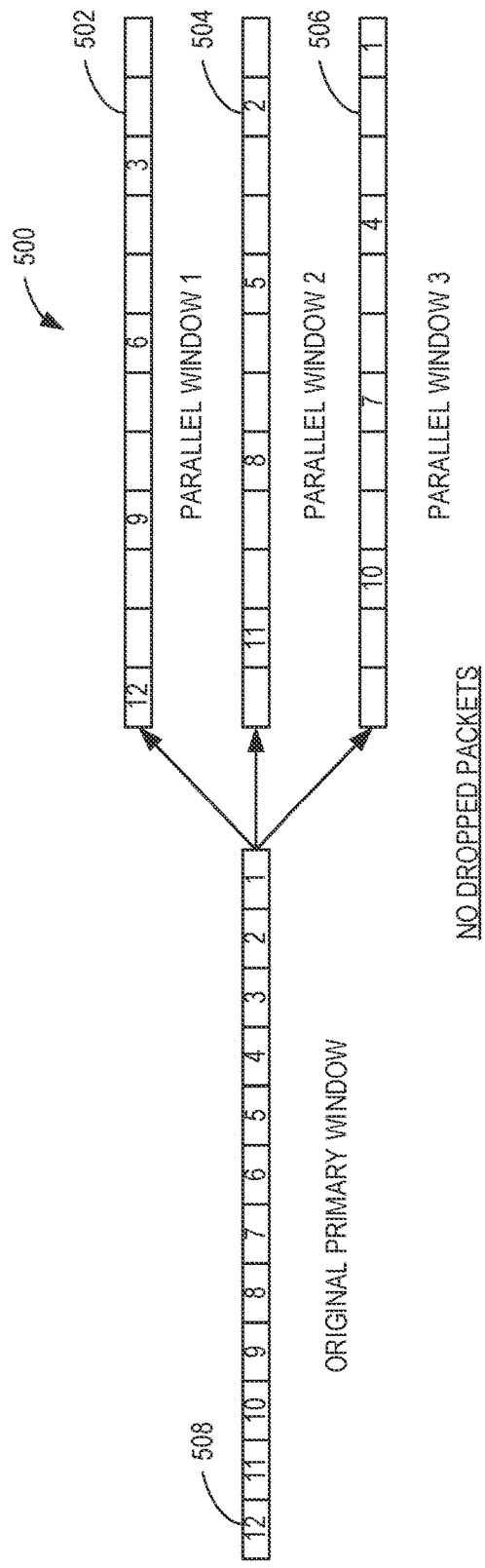
FIG. 5A is a block diagram of a first example workflow to effectuate sliding window management on example parallel windows.

FIG. 5A is a block diagram of a first example workflow 500 that may be executed and/or implemented to effectuate sliding window management on example parallel windows 502, 504, 506. The parallel windows 502, 504, 506 are configured to receive data (e.g., data packets) from a first example primary window (e.g., a first original primary window) 508. In this example, the parallel windows 502, 504, 506 are sub windows. For example, the parallel windows 502, 504, 506 can be sub windows of the first primary window 508. The parallel windows 502, 504, 506 include a first example parallel window (PARALLEL WINDOW 1) 502, a second example parallel window (PARALLEL WINDOW 2) 504, and a third example parallel window (PARALLEL WINDOW 3) 506. Advantageously, the example window determination circuitry 220 of FIG. 2 can partition the first primary window 508 into the multiple parallel windows 502, 504, 506 that are independently operable without any synchronization primitives. In the example of FIG. 5A, the window determination circuitry 220 configures and/or otherwise generates each of the parallel windows 502, 504, 506 to have the same size (e.g., a data size, a window size, a bit size, etc.) of the original primary window 508. Alternatively, one or more of the first primary window 508, the first parallel window 502, the second parallel window 504, and/or the third parallel window 506 may have a different size than depicted in the example of FIG. 5A.

In the illustrated example of FIG. 5A, the first primary window 508 is a sliding window (e.g., a sliding data window) configured to receive data (e.g., data packets) from a data source. For example, the first primary window 508 can include data packets received from the packet receiver circuitry 204 of FIG. 2. In the example of FIG. 5A, the first primary window 508 includes twelve (12) data packets, where the data packets from left to right represent data packets received from most recently to least recently, respectively. For example, the first data packet (e.g., data packet 1) at the far right of the first primary window 508 is received prior to the other eleven data packets (e.g., data packets 2-12).

In the illustrated example of FIG. 5A, the slide management circuitry 222 of FIG. 2 ensures that the individual parallel windows 502, 504, 506 slide (e.g., slide together, slide in connection with respect to each other, etc.) to emulate the original primary window 508. For example, the slide management circuitry 222 can slide the parallel windows 502, 504, 506 independently of each other by querying states (e.g., read-only states) associated with respective ones of the parallel windows 502, 504, 506 and sliding the parallel windows 502, 504, 506 based on the states. In some such examples, the slide management circuitry 222 can check, validate, query, etc., a first position of the first parallel window 502 with respect to a second position of the second parallel window 504 based on a first state of the first parallel window 502 with respect to a second state of the second parallel window 504. In some such examples, the slide management circuitry 222 can control the amount of sliding of the parallel windows 502, 504, 506 to be bounded to the original primary window 508. In some examples, the first workflow 500 may be representative where no data packets from a data source are dropped. For example, the data source can be the external computing system(s) 126 of FIG. 1, and the data source can transmit the twelve data packets depicted in the first primary window 508. In some such examples, the first workflow 500 can be representative of a relatively well-behaved data traffic pattern with minimal to no network impairments. In some such examples, the slide management circuitry 222 can slide the parallel windows 502, 504, 506 in unison.

In the illustrated example of FIG. 5A, the window determination circuitry 220 effectuates parallelization of the first primary window 508 by defining the parallel windows 502, 504, 506 with orthogonal properties. In this example, the window determination circuitry 220 partitions the first primary window 508 into the parallel windows 502, 504, 506 where a sub flow and a parallel window have a one-to-one association. For example, the first sub flow 304 of FIG. 3A can correspond to and/or otherwise be associated with the third parallel window 506, the second sub flow 306 of FIG. 3A can correspond to and/or otherwise be associated with the second parallel window 504, and the third sub flow 308 of FIG. 3A can correspond to and/or otherwise be associated with the first parallel window 502.

In the illustrated example of FIG. 5A, the window determination circuitry 220 generates and/or otherwise populates the parallel windows 502, 504, 506 to be sparsely occupied replications of the original primary window 508. The window determination circuitry 220 can cause the active bit map on each of the parallel windows 502, 504, 506 to be orthogonal and to be independently manipulated without locking primitives. For example, the window determination circuitry 220 can direct new packets, stale packets, and replay attack packets to the same one of the parallel windows 502, 504, 506 for the duration of the packet flow (e.g., the packet flow 302) associated with the first primary window 508.

In the illustrated example of FIG. 5A, the window determination circuitry 220 derives and/or otherwise identifies the one of the parallel windows 502, 504, 506 to update based on a SN of an incoming data packet from the first primary window 508. In some examples, the window determination circuitry 220 operates on the identified one of the parallel windows 502, 504, 506 based on an identifier (e.g., a parallel window identifier) of the identified one of the parallel windows 502, 504, 506. Advantageously, the window determination circuitry 220 and the slide management circuitry 222 may update and/or otherwise control the parallel windows 502, 504, 506 on a per-sub flow basis and not on a per-core basis. For example, respective ones of the parallel windows 502, 504, 506 can correspond to respective ones of the sub flows 304, 306, 308 of FIG. 3A and may not necessarily correspond to respective ones of the cores 312, 314, 316 of FIG. 3A. Advantageously, the per-sub flow association enables for more than one sub flow to be affined to a given core to reduce a likelihood of throttling multi-flow performance with enqueue time packet distributors or quanta-based packet distributors.

In some examples, the window determination circuitry 220 effectuates a memory reduced solution for parallelization. For example, responsive to determining that memory occupancy is a constraint, consideration, etc., the window determination circuitry 220 can reduce the sparsity of the parallel windows 502, 504, 506 to a contiguous bit map. In some examples, the window determination circuitry 220 generates condensed windows for one(s) of the parallel windows 502, 504, 506. For example, the window determination circuitry 220 can condense one(s) of the parallel windows 502, 504, 506 to have a size of window size/N (e.g., parallel window size=window size/N), where N is the number of the parallel windows 502, 504, 506. In some such examples, the window determination circuitry 220 can determine the bit locations to be bit location per primary window/N (e.g., bit location=bit location per primary window/N).

In some examples, the window determination circuitry 220 effectuates batch processing, cluster processing, etc. For example, some transport networks and protocols may generate back-to-back data packets on the same core to leverage cache locality. In some such examples, the second configuration determination circuitry 218 can determine a modified parallel window definition to effectuate such a parallel algorithm to support batch processing, cluster processing, etc., as described below in the example of Equation (4) below.

$$\text{parallel window}=(\text{incoming } SN/\text{cluster size})\%N, \quad \text{Equation (4)}$$

For example, the window determination circuitry 220 may partition the primary window into N parallel windows based on the example of Equation (4) above. In the example of Equation (4) above, incoming SN is an SN of a data packet to process from a primary window. In the example of Equation (4) above), cluster size is a size of a batch, a cluster, etc., to be processed. In the example of Equation (4) above, N is the number of parallel windows to be generated and/or otherwise outputted and % refers to the modulo operation. In the example of Equation (4) above, parallel window is the parallel window to be assigned the data packet to process.

In some examples, the window determination circuitry 220 configures the parallel windows 502, 504, 506 to maintain a left, a right, and an occupancy map. For example, the window determination circuitry 220 can reconcile the left/right of each of the parallel windows 502, 504, 506 with the other parallel windows 502, 504, 506 to derive the left/right of the first primary window 508. In some such examples, the window determination circuitry 220 can determine that an arriving data packet is to be in the window before the state of the corresponding one of the parallel windows 502, 504, 506 are updated. Advantageously, such a determination may invoke lagging one(s) of the parallel windows 502, 504, 506 with fast-moving one(s) of the parallel windows 502, 504, 506 and enforce that all of the parallel windows 502, 504, 506 fall within the state of the original primary window 508 on a non-parallel implementation. In some such examples, the states are read-only states and do not need locking. Accordingly, the parallel windows 502, 504, 506 may not be sensitive to a race condition.

In some examples, a protocol, such as the IPsec protocol, is implemented in software. In some such examples, there may be a packet receiver stage before protocol processing occurs. In some such examples, processor platforms executing such a protocol may support an in-line IPsec algorithmic offload, where the data packets are already integrity verified. In some such examples, such processor platforms can maintain the left and right side of the first primary window 508 in the packet receiver stage without tracking the occupancy bits. In some such examples, the window determination circuitry 220 effectuates the first primary window 508 to be accessed by the individual parallel windows 502, 504, 506. For example, the slide management circuitry 222 can enforce a coordinated window slide based on the accesses.

Figure 5B:
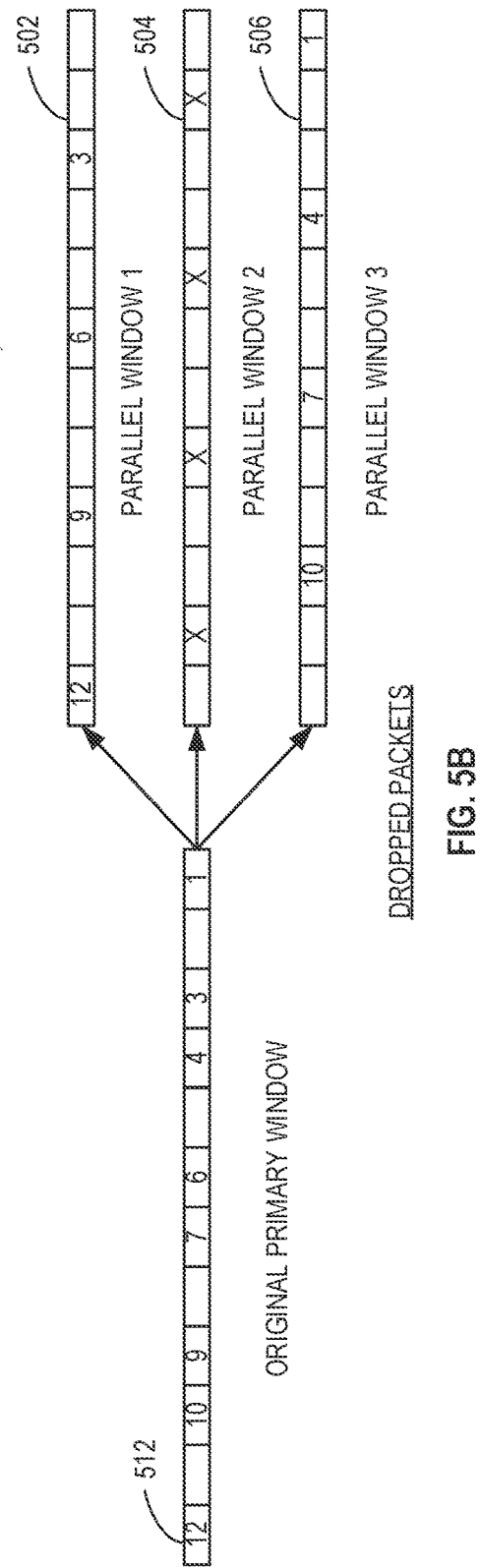
FIG. 5B is a block diagram of a second example workflow to effectuate sliding window management on example parallel windows.

FIG. 5B is a block diagram of a second example workflow 510 that may be executed and/or implemented to effectuate sliding window management on the parallel windows 502, 504, 506 of FIG. 5A. In the example of FIG. 5B, the second workflow 510 processes a second example primary window 512. In the example of FIG. 5B, the second primary window 512 is missing data packets 2, 5, 8, and 11 expected to arrive from a data source at corresponding windows 2, 5, 8, and 11 of the second primary window 512.

The second workflow 510 of the illustrated example of FIG. 5B is representative of an example where one or more data packets from a data source are dropped. For example, the data source can be the external computing system(s) 126 of FIG. 1, and the data source can transmit the twelve data packets depicted in the first primary window 508 of FIG. 5A. For example, the second workflow 510 can be representative of a relatively misbehaving data traffic pattern with increased network impairments. In some examples, the security handling circuitry 224 of FIG. 2 can execute one or more mitigation measures to ensure that the slide management circuitry 222 slides the parallel windows 502, 504, 506 in unison.

Figure 6:
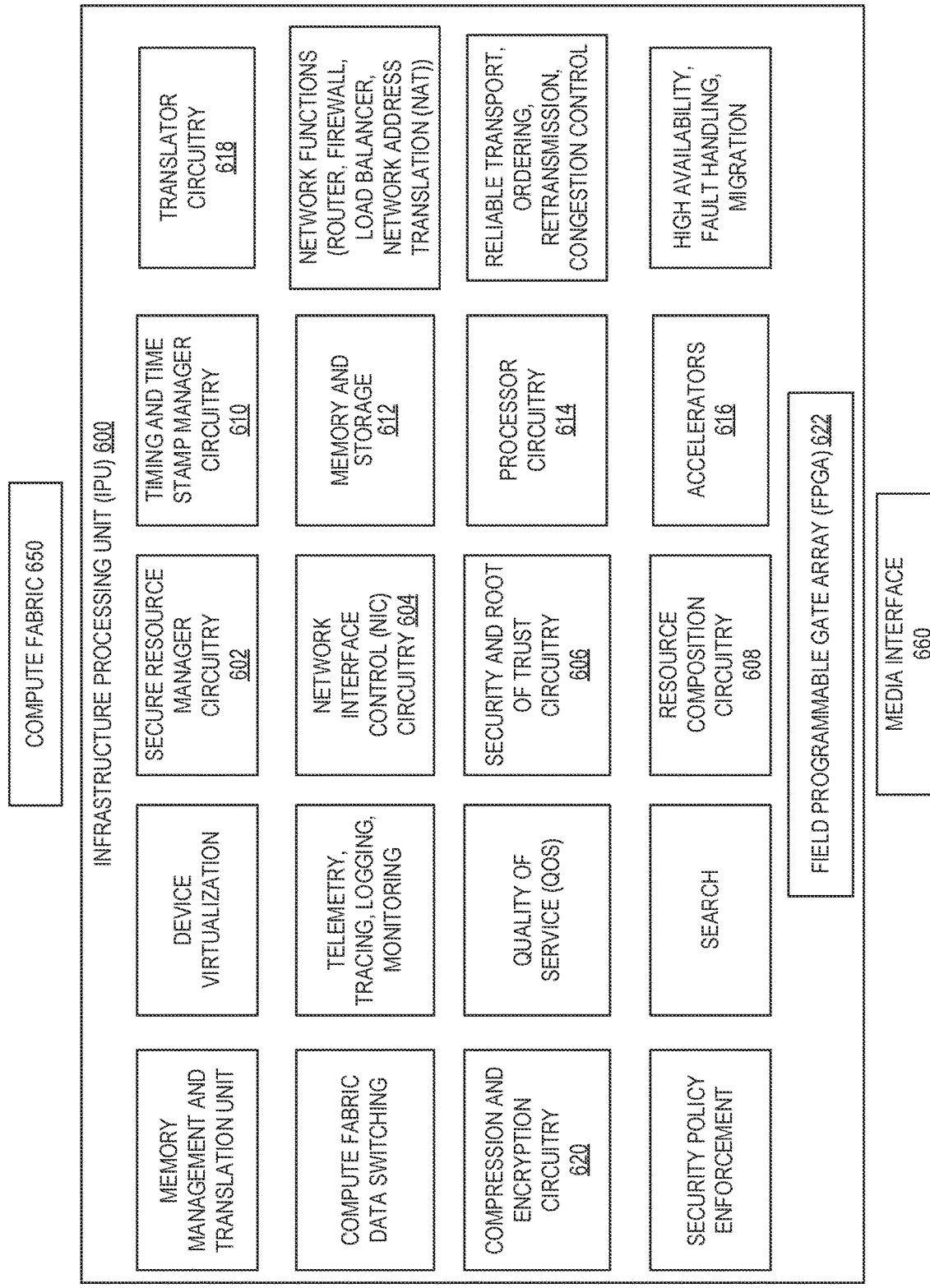
FIG. 6 is a block diagram of an example Infrastructure Processor Unit (IPU) that may implement the example NIC circuitry of FIGS. 1 and/or 2.

FIG. 6 is a block diagram of an example implementation of an IPU 600. In some examples, the IPU 600 may implement the NIC circuitry 104A-B of FIGS. 1 and/or 2, the interface circuitry 114 of FIG. 1, and/or, more generally, the computing system 102 of FIG. 1. In some examples, the IPU 600 can expose XPU, storage (e.g., the datastore 120 of FIG. 1), memory, and CPU (e.g., the CPU 106 of FIG. 1) resources and capabilities as a services that can be accessed by other microservices for function composition. This can improve performance and reduce data movement and latency. The IPU 600 can perform capabilities such as those of a router, load balancer, firewall, TCP/reliable transport, a service mesh (e.g., proxy or API gateway), security, data-transformation, authentication, quality of service (QOS), security, telemetry measurement, event logging, initiating and managing data flows, data placement, or job scheduling of resources on an XPU, storage, memory, or CPU.

In some examples, the IPU 600 can include one or more of the following: Smart Network Interface Control circuitry ("SmartNIC") with one or more programmable or fixed function processors to perform offload of operations that could have been performed by a CPU such as: Virtual Switch Offload, storage offload (e.g., compression, crypto, virtualization); offload of operations from an application; virtualization services whereby instead of CPU being the hub of virtualizing every device, the IPU 600 becomes a "bump in the wire" from the standpoint of virtualizing all capabilities, including CPUs. In some examples, the IPU 600 may be integrated with or physically separate from the CPU and XPU components. In some examples, the IPU 600 provides a bridge between local memory addressing to remote memory across the data center fabric.

In some examples, the IPU 600 can provide security features including: (1) Root of Trust (ROT), attestation services, secure enclaves; storing encryption keys and complete key management duties; protocol encryption endpoints for link interfaces and network interfaces that connect the IPU 600 to other nodes in a distributed system; separate control plane interface that can be measured (via certificate mechanisms); state machine on device interfaces that can be individually configured and isolated from other device interfaces on the device; attestation, authorization, access control, logging, log-filtering, immutable logging (e.g. block chain); security-hub functions for inter-XPU confidentiality and identity and information isolation, brokering data visibility between multiple clients for cooperative processing; secure and encrypted interfaces for external interfaces from the IPU SoC including memory (e.g., volatile and persistent), network and IO fabrics (PCIe, CXL); passive or active enforcement of security policies and services such as access control lists, rate limiting, intrusion detection, distributed denial of service attacks, etc.

In some examples, the IPU 600 can also provide CPU capabilities and performance so that tasks (e.g., data-parallelized tasks) can be offloaded to the IPU 600 as well as: platform and device management; distributed (inter-node and intra-node) telemetry, tracing, logging and monitoring; Quality of Service enforcement; Service Mesh; data processing including serialization, deserialization, transformation such as size and format conversion, range validation, access policy enforcement; distributed (inter-node and intra-node) security; and/or integrated acceleration engines that provide flexible and programmable acceleration engines that offload and improve performance for floating point operations per second (FLOPS)/Tensor operations per second (TOPS) intensive AI and Machine Learning.

In some examples, the IPU 600 may implement a SmartNIC, data processing unit (DPU), and/or, more generally, an accelerated networking device. For example, the IPU 600 may implement an accelerated networking device that may securely accelerate and/or manage infrastructure workloads. In some examples, in response to a service call, the IPU 600 can schedule function execution at local and/or remote resources using one or more service interfaces. In some examples, services are provided at a higher abstraction (APIs, RPCs, services) that enable the IPU 600 to provide a finer granularity of offloads and services (as compared to only packets and 5-tuples). Various examples can enable enhanced telemetry/logging/monitoring, QoS and egress and ingress scheduling, workload placement/acceleration, security/authentication, etc.

In some examples, the IPU 600 can reduce XPU cache and bandwidth contamination besides freeing up use of general purpose computing cores, and can cross integrate use of acceleration devices. For example, the IPU 600 can perform in-stream data filtering at the network and storage edge; direct-to-disk encryption/decryption/transcription and compression or decompression, to/from GPU or to/from network.

In some examples, the IPU 600 can provide for data placement and management so that data is staged and stored in a memory or storage device physically proximate or close to where it will be processed to reduce latency of data access. The IPU 600 can include a stream-based interface so there is no need for the host to packetize data and perform packet-granular flow control and thread scheduling. Data can be consolidated into bulk regions of memory that CPU may access, and where metadata (e.g., information extracted from network packet headers) and disk-based data structures can be directly placed in caches close to CPU for nanosecond granular load/store access. Coordination overhead between devices can be reduced with little or no I/O event synchronization (polling, sleeping, interrupting, etc.).

In some examples, telemetry is provided for resource tracing of resources and latency in an execution path which can be used for monitoring, resource provisioning, and QoS. In some examples, QoS is provided for resource tracing of resources in an execution path. An IPU can use telemetry to perform resource tracking of resources in the path which influence the performance of a microservice deployment, enabling both end-to-end service and component-level traceability and corresponding targeted controls. In some examples, the IPU 600 can manage flow of connectivity, such as security, routing, acceleration, and bridging memory accesses (local or remote) and exposes these as a microservice (e.g., system API). In some examples, the IPU 600 can be an end point for services or a proxy for accessing services.

In some examples, a system API for an application can cause execution of one or more microservices on local or remote devices. This enables an abstraction layer that separates the service function capabilities from the execution complexity, changes in implementation, scale of deployment, and location of deployment. In some examples, the IPU 600 can perform software composition to accelerate connectivity between multiple services.

In some examples, I/O data path operations can be offloaded to the IPU 600 such as encryption, authentication, compression, routing, policy enforcement, Deep Packet/Message Inspection, remote direct memory access (RDMA) acceleration (e.g., RoCE or iWarp, virtualized or not), network protocol (e.g. TCP, UDP, etc.) offload, reliable transport, congestion control, quality of service, sampling, replication/multicast, multi-path, network address translation (NAT), firewall, etc.

In some examples, I/O data path operations can be offloaded to the IPU 600 for unifying memory accesses to local or remote shared memory such as, encryption, access control, address remapping, cache management, reliable access, atomic commands, and persistent memory management.

In some examples, I/O control path operations can be offloaded to the IPU 600 such as connection establishment, identity management, key management, authentication, tunneling setups, intelligent networking (e.g., offloading flow control, reliable transport, congestion control), dynamic resource allocation, or fast failover.

In some examples, Global Hierarchical Software-defined Control Plane management operations can be offloaded to the IPU 600, such as an IPU hosted local hierarchical control plane for one or more nodes, such as multi-host and multi-homing, thereby enabling faster response time and better scalability based on localized node requirements, live migration, resource allocation.

In some examples, the IPU 600 performs agentless microsegmentation (e.g., placing traffic inspection and chokepoints around each workload without having to modify and deploy agents in each workload, for example, to monitor, analyze, and remediate malicious or nefarious traffic).

In some examples, the IPU 600 can unify local and remote storage, and accelerate (local/remote storage) I/Os, by emulating Non-Volatile Memory Express (NVMe) and offloading NVMe over fabrics (NVMe-oF) storage command generation (or Internet Small Computer Systems Interface (iSCSI) storage command generation) for hyperscale high performance storage (e.g., NVMe or iSCSI emulation in the storage path).

In some examples, the IPU 600 manages a high performance virtual storage area network (SAN) for virtualized and bare-metal operation. In some examples, the IPU 600 provides storage traffic termination. In some examples, the IPU 600 manages a composable storage from local or remote storage devices including compression and encryption. In some examples, the IPU 600 performs protection of data-in-use, data-in-flight and data-at-rest (encryption, private/public key acceleration). In some examples, the IPU 600 performs key management and identity management.

In some examples, the IPU 600 performs regular expression (reg-ex) processing (e.g., acceleration) such as high speed deep packet inspection at line rate, structured data object search and metadata processing. For example, the IPU 600 can perform processing of metadata associated with storage such as search of record time stamps and enforcing record access controls. In some examples, the IPU 600 performs remote atomic operations, over connectivity using remote direct memory access (RDMA), but can be user programmable at a high level. Examples include linked list search, searching remote memory/objects for data specific pattern, and searching or modifying sparse memory.

In some examples, the IPU 600 implements a hardware root of trust as an intelligent storage controller and trusted control point for attestation of platform devices or deployed software applications (e.g. containers, functions as a service, enclaves, etc.). In some examples, the IPU 600 acts as a secure, headless (e.g., not requiring instructions or operational control from additional separate CPU) for managing CPU/XPU/storage/memory endpoints. In some examples, the IPU 600 provides logically centralized datacenter-wide policies for endpoint security and isolation.

In some examples, the IPU 600 performs in-network accelerated supercomputing (e.g., OpenSNAPI from UCF Consortium). For example, the IPU 600 can apply Artificial intelligence (AI) powered cyber intelligence and analytics to secure data centers, and enable predictive maintenance for operating expense (OPEX) optimizations (telemetry, monitoring, management, orchestration, cyber-security and anomaly detection, predictive and preventative maintenance).

In some examples, the IPU 600 provides isolated dual control plane interfaces that can be measured and attested to then enforce further isolation across multi-tenant workloads on the IPU 600, e.g., via virtual functions; such that the untrusted control plane interface cannot maliciously (without event/error) change the mode of operation of the IPU services.

The following provides an example operation and use of the IPU 600. (1) an application issues a function call (e.g., API) to a peer to perform a function, service, or microservice (e.g., processor-executed software, hardware, and so forth). (2) The IPU 600 can intercept the function call. In some examples, the IPU 600 can discover one or more services (local or remote) to perform the function call. In some examples, a service can include software and/or hardware. In some examples, the IPU 600 can be communicatively coupled to one or more nodes (e.g., on a same die, via one or more device interfaces or via a network or fabric) and be accessible to receive a function call from any software or device on the one or more nodes. The IPU 600 can perform load balancing of function calls. The IPU 600 can perform attestation and/or creation of trusted resources. In some examples, the XPU is a trusted resource. (3) The IPU 600 can function call to target XPU to perform the service. (4) XPU can perform the service and return a response to the application that issued the function call and the XPU can update its global state. (5) The IPU 600 can intercept the response from the XPU and provide a response to the application of completion of the function.

Potential benefits of use of the IPU 600 can include any of the following: (a) reduced attack surface through physical isolation from untrusted tenant applications; (b) per server scaling for simpler dimensioning and reduced blast radius; (c) clear connectivity abstraction point and use of XPUs and CPUs with vendor independence; (d) multi-tenant and bare metal support; (e) associativity of state for better table scaling and caching; (f) accelerator toolbox for XPU offload of connectivity related services; (g) programmable acceleration (seamless to higher level applications and frameworks, libraries, etc.); (h) large scale heterogeneous intra-node and inter-node distributed computing, directed through secure and scalable policy and resource management templates (declarative management of scale and security); (i) meta-computing that can be used for organizing computing in service of computing; self-observation from a trusted near-party, etc.; (j) new software design patterns that are built upon self-aware computing; (k) removal of unnecessary code paths, e.g., direct virtualization of a device without OS, hypervisor, etc.; (l) in-flow associative blending and splitting, redirection, filtering which further reduce overhead by performing an operation when needed, and doing it quickly and in place, obviating the need to store and then re-extract salient bits; or (m) managed data flows.

Turning back to the illustrated example of FIG. 6, the IPU 600 can include or access at least an example secure resource manager 602, example NIC circuitry 604, example security and root of trust circuitry 606, example resource composition circuitry 608, time stamp manager circuitry 610, example memory and storage 612, processor circuitry 614, accelerators 616, and example translator circuitry 618. In some examples, the NIC circuitry 604 of FIG. 6 may implement the NIC circuitry 104A-B of FIGS. 1 and/or 2, or portion(s) thereof. Other components can be used such as but not limited to other components shown in the example of FIG. 6. In some examples, one or more components of the IPU 600 may be utilized separately or in combination. For example, compression and encryption circuitry 620 can be used as a separate service or chained as part of a data flow with vSwitch and packet encryption.

In some examples, the IPU 600 can include an example field programmable gate array (FPGA) 622 configured to receive commands from an CPU, XPU, or application by an application programming interface (API) and perform commands on behalf of the CPU, including workload management and offload or accelerator operations. The FPGA 622 can be configured to perform any operations of the IPU 600 described herein.

Example compute fabric 650 can provide connectivity to a local host or device (e.g., a server or device (e.g., processor circuitry, an XPU, memory, or storage device)). Connectivity with a local host or device or smartNIC or another IPU can be provided using one or more of PCIe, ARM AXI, Intel® QuickPath Interconnect (QPI), Intel® Ultra Path Interconnect (UPI), Intel® On-Chip System Fabric (IOSF), Omnipath, Ethernet, Compute Express Link (CXL), Hyper-Transport, NVLink, Advanced Microcontroller Bus Architecture (AMBA) interconnect, OpenCAPI, Gen-Z, CCIX, Infinity Fabric (IF), and so forth. Various examples of the host connectivity can provide symmetric memory and caching to enable equal peering between CPU, XPU, and IPU (e.g., via CXL.cache and CXL.mem).

An example media interface 660 can provide connectivity to a remote smartNIC or another IPU or service by a network medium or fabric. This can be provided over any type of network media (e.g., wired or wireless) and using any protocol (e.g., Ethernet, InfiniBand, Fiber channel, ATM, etc.).

In some examples, instead of the server/CPU being the primary component managing the IPU 600, the IPU 600 can be a root of a system (e.g., rack of servers or data center) and can manage compute resources (e.g., CPU, XPU, storage, memory, other IPUs, etc.) in the IPU 600 and outside of the IPU 600. Various operations of an IPU are described below.

In some examples, the IPU 600 can perform orchestration to decide which hardware and/or software is/are to execute a workload based on available resources (e.g., services and devices) and by considering service level agreements and latencies, to determine whether resources (e.g., CPU, XPU, storage, memory, etc.) are to be allocated from the local host or from a remote host or pooled resource. When the IPU 600 is selected to perform a workload, the secure resource manager circuitry 602 can offload work to a CPU, XPU, or other device and the IPU 600 can accelerate connectivity of distributed runtimes, reduce latency, CPU, and increase reliability. For example, the IPU 600 may effectuate performance scaling with parallel processing of sliding window management as described herein.

For example, the secure resource manager circuitry 602 can run a service mesh to decide what resource is to execute the workload, and provide for layer 7 (L7) (application layer) and remote procedure call (RPC) traffic to bypass kernel altogether so that a user space application can communicate directly with the IPU 600 (e.g., the IPU 600 and application can share a memory space). In some examples, a service mesh can be a configurable, low-latency infrastructure layer designed to handle communication among application microservices using APIs (e.g., over remote procedure calls (RPCs)). In some examples, a service mesh can provide fast, reliable, and secure communication among containerized or virtualized application infrastructure services. The service mesh can provide critical capabilities including service discovery, load balancing, encryption, observability, traceability, authentication and authorization, and support for the circuit breaker pattern.

In some examples, infrastructure services can include a composite node created by an IPU at or after a workload from an application is received. In some cases, the composite node includes access to hardware devices, software using APIs, RPCs, gRPCs, or communications protocols with instructions such as, but not limited, to iSCSI, NVMe-OF, or CXL.

In some examples, the IPU 600 can dynamically select itself to run a given workload (e.g., a microservice) within a composable infrastructure including an IPU, XPU, CPU, storage, memory and other devices in a node.

Communications can transit through the media interface 660 of the IPU 600 through a media to a NIC/smartNIC (for cross node communications) or loopback back to a local service on the same host. Communications through the media interface 660 of the IPU 600 to another IPU can then use shared memory support transport between XPUs switched through the local IPUs. Use of IPU-to-IPU communication can reduce latency and jitter through ingress scheduling of messages and work processing based on service level objective (SLO).

For example, for a request to a database application that requires a response, the IPU 600 can prioritize its processing to minimize the stalling of the requesting application. The IPU 600 can schedule the prioritized message request issuing the event to execute a SQL query database and the IPU can construct microservices that issue SQL queries and the queries are sent to the appropriate devices or services.

Figure 7:
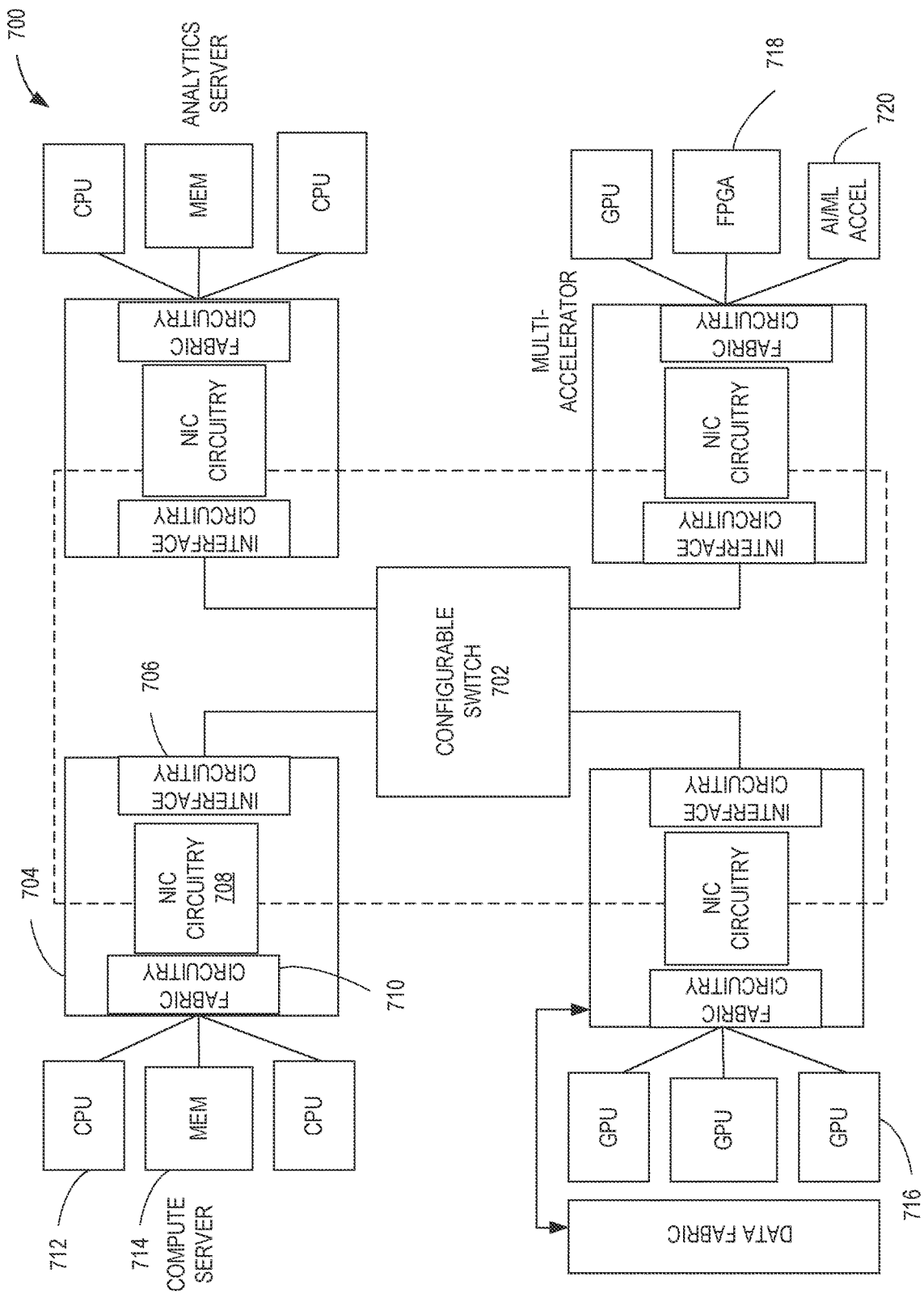
FIG. 7 depicts an example system including example IPUs communicatively coupled by an example configurable switch.

FIG. 7 depicts an example system 700 connected using an example configurable switch 702. The system 700 includes example IPUs 704. In some examples, one(s) of the IPUs 704 may be implemented by the NIC circuitry 104A-B of FIGS. 1 and/or 2, the interface circuitry 114 of FIG. 1, and/or, more generally, the computing system 102 of FIG. 1. In some examples, one(s) of the IPUs 704 may be implemented by the IPU 600 of FIG. 6. The IPUs 704 include example interface circuitry 706, example NIC circuitry 708, and example fabric circuitry 710. In some examples, the interface circuitry 706 may be implemented by the interface circuitry 114 of FIG. 1. In some examples, the NIC circuitry 708 may be implemented by the NIC circuitry 104A-B of FIGS. 1 and/or 2 and/or the NIC circuitry 604 of FIG. 6. In some examples, the fabric circuitry 710 may be implemented by the bus 116 of FIG. 1. In this example, the fabric circuitry 710 is coupled to one or more example CPUs 712, example memory 714, example GPUs 716, example FPGAs 718, and/or example AI/ML accelerators 720.

The IPUs 704 can be communicatively coupled using the configurable switch 702. In some examples, the configurable switch 702 may be implemented by a Barefoot Networks Tofino programmable switch. The Tofino switch can provide additional telemetry information back to the IPUs 704. In some examples, the telemetry information may include information on network/media usage, congestion, packet drops, and latency. In some examples, the telemetry information can be used by the IPUs 704 to adjust sliding window management as described herein, load balancing, service attachment, and requests for additional resources. Advantageously, this ability can also enable network operator(s) to have detailed information on what services and applications are impacted during service failures, such as a link failure.

Configuration of operation of one(s) of the IPUs 704 and/or the configurable switch 702, including its data plane (s), can be programmed using P4, C, Python, Broadcom Network Programming Language (NPL), or x86 compatible executable binaries or other executable binaries. Programming of hash-lookup can occur to program packet forwarding, sliding window management, etc., by a data plane of the configurable switch 702. For example, match-action tables or circuitry can be used whereby a hash of a portion of a packet is used as an index to find an entry. In addition, the configurable switch 702 and/or one(s) of the IPUs 704 can perform packet replication for forwarding of a packet or frame to multiple ports and queuing of packets or frames prior to transfer to an output port.

Figure 8:
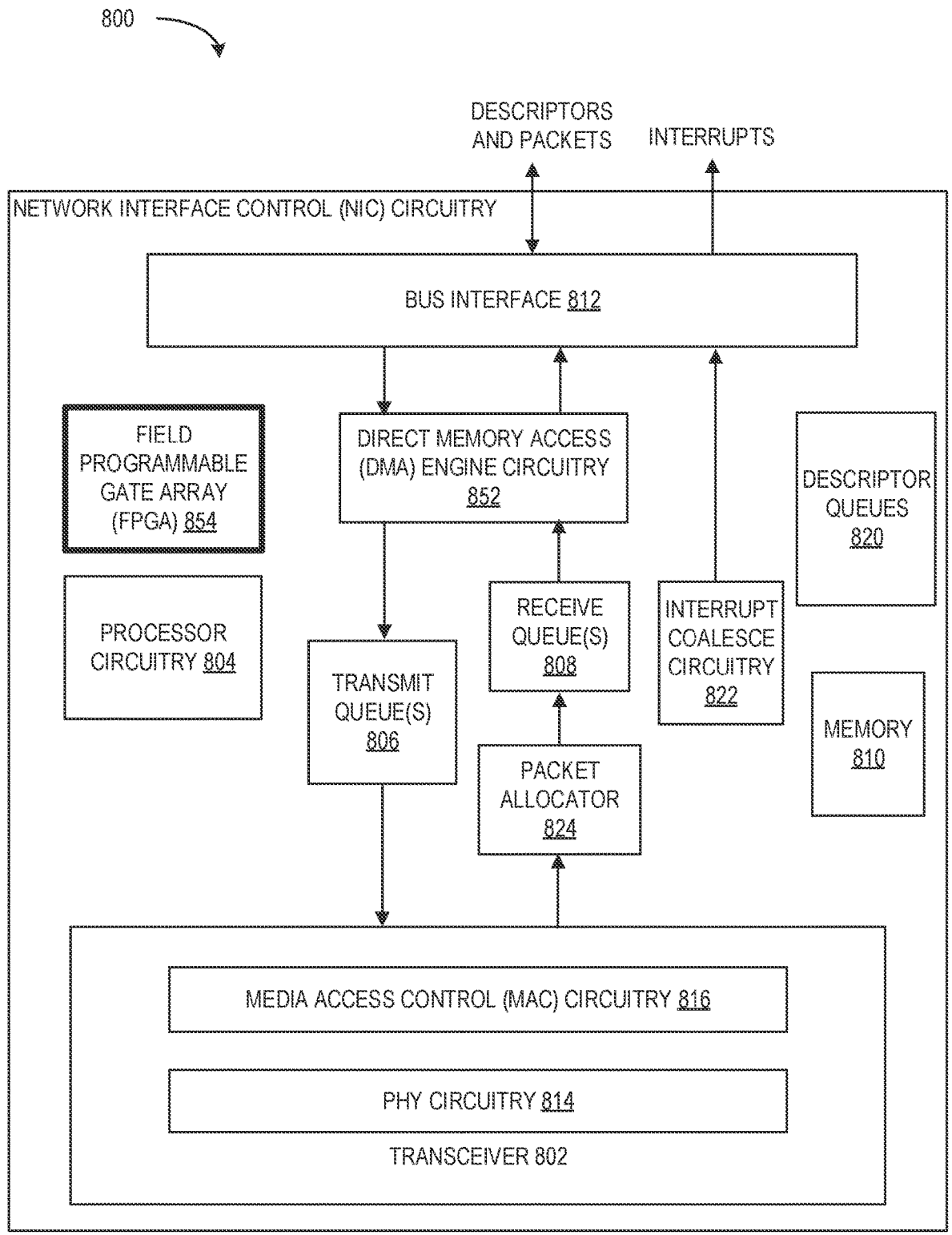
FIG. 8 is a block diagram of another example implementation of the NIC circuitry of FIGS. 1 and/or 2.

FIG. 8 is a schematic illustration of an example implementation of NIC circuitry 800. In some examples, the NIC circuitry 800 may implement the NIC circuitry 104A-B of FIGS. 1 and/or 2, the interface circuitry 114 of FIG. 1, and/or, more generally, the computing system 102 of FIG. 1. In some examples, the NIC circuitry 800 may implement the NIC circuitry 604 of FIG. 6. In some examples, the NIC circuitry 800 may implement the interface circuitry 706, the NIC circuitry 708, the fabric circuitry 710, and/or, more generally, the IPU 704 of FIG. 7.

In some examples, the NIC circuitry 800 can be used in an IPU, a DPU, or as part of a SmartNIC. In some examples, the NIC circuitry 800 can be implemented as a network interface controller, network interface card, a host fabric interface (HFI), or host bus adapter (HBA), and such examples can be interchangeable. The NIC circuitry 800 can be coupled to one or more servers using a bus, PCIe, CXL, or DDR. The NIC circuitry 800 may be embodied as part of a system-on-a-chip (SoC) that includes one or more processors or processor circuitry, or included on a multichip package that also contains one or more processors or processor circuitry.

The NIC circuitry 800 can include an example transceiver 802, example processor circuitry 804, example transmit queue(s) 806, example receive queue(s) 808, example memory 810, an example bus interface 812, and example direct memory access (DMA) engine circuitry 852. The transceiver 802 can be capable of receiving and transmitting packets in conformance with the applicable protocols such as Ethernet as described in IEEE 802.3, although other protocols may be used. The transceiver 802 can receive and transmit packets from and to a network via a network medium (not depicted). The transceiver 802 can include example PHY circuitry 814 and example media access control (MAC) circuitry 816. The PHY circuitry 814 can include encoding and decoding circuitry (not shown) to encode and decode data packets according to applicable physical layer specifications or standards. The MAC circuitry 816 can be configured to perform MAC address filtering on received packets, process MAC headers of received packets by verifying data integrity, remove preambles and padding, and provide packet content for processing by higher layers. The MAC circuitry 816 can be configured to assemble data to be transmitted into packets, which include destination and source addresses along with network control information and error detection hash values.

The processor circuitry 804 can be any a combination of a: processor, core, GPU, FPGA, DSP, ASIC, or other programmable hardware device that allow programming of the NIC circuitry 800. For example, a "smart network interface" or SmartNIC can provide packet processing capabilities in the network interface using the processor circuitry 804. In some examples, the processor circuitry 804 can be implemented as one or more processor components for a SmartNIC.

An example packet allocator 824 can provide distribution of received packets for processing by multiple CPUs or cores using sliding window management as described herein. When the packet allocator 824, and/or, more generally, the NIC circuitry 800, uses sliding window management, the packet allocator 824 can implement the first workflow 300 of FIG. 3A, the second workflow 320 of FIG. 3B, the third workflow 330 of FIG. 3C, the first workflow 500 of FIG. 5A, and/or the second workflow 510 of FIG. 5B to determine which core of processor circuitry is to process a packet, a sub flow, etc.

Example interrupt coalesce circuitry 822 can perform interrupt moderation whereby the interface coalesce circuitry 822 waits for multiple packets to arrive, or for a time-out to expire, before generating an interrupt to host system to process received packet(s). Receive Segment Coalescing (RSC) can be performed by the NIC circuitry 800 whereby portions of incoming packets are combined into segments of a packet. The NIC circuitry 800 can provide this coalesced packet to an application.

The DMA engine circuitry 852 can copy a packet header, packet payload, and/or descriptor directly from host memory to the bus interface 812 or vice versa, instead of copying the packet to an intermediate buffer at the host and then using another copy operation from the intermediate buffer to the destination buffer. In some examples, multiple DMA engines are available for transfer of contents of packets to a destination memory associated with a host device or a destination memory associated with an accelerator device.

The memory 810 can be any type of volatile or non-volatile memory device and can store any queue or instructions used to program the NIC circuitry 800. The transmit queue(s) 806 can include data or references to data for transmission by network interface. The receive queue(s) 808 can include data or references to data that was received by network interface from a network. The descriptor queues 820 can include descriptors that reference data or packets in the transmit queue(s) 806 or the receive queue(s) 808 and corresponding destination memory regions. An example bus interface 812 can provide an interface with host device (not depicted). For example, the bus interface 812 can be compatible with PCI, PCI Express, PCI-x, Serial ATA, and/or USB compatible interface (although other interconnection standards may be used). In some examples, the NIC circuitry 800 can include an example FPGA 854 configured to receive commands from a CPU or XPU and perform commands.

Figure 9:
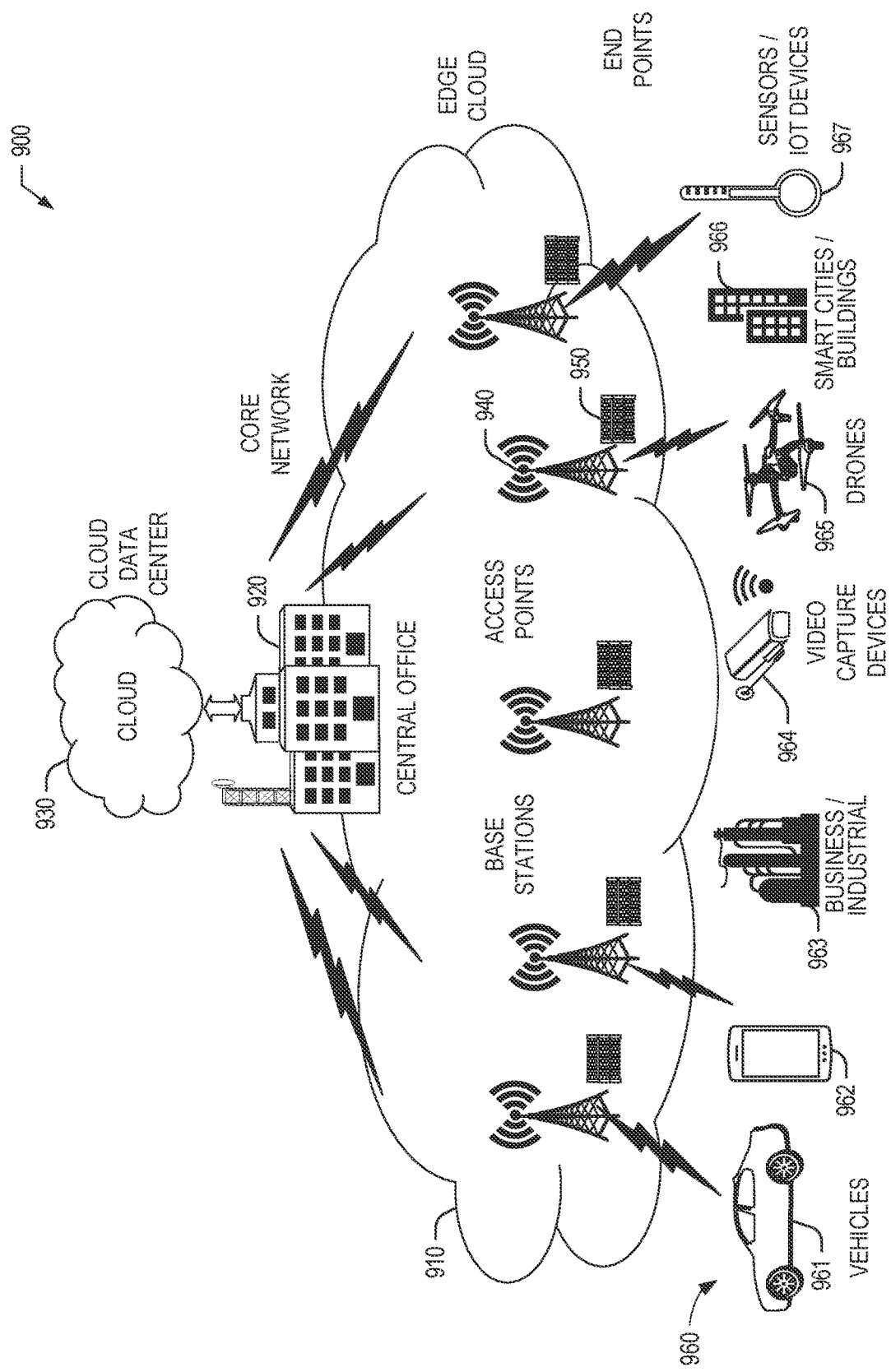
FIG. 9 illustrates an overview of an example edge cloud configuration for edge computing that may implement the examples disclosed herein.

FIG. 9 is a block diagram 900 showing an overview of a configuration for edge computing, which includes a layer of processing referred to in many of the following examples as an "edge cloud". As shown, the edge cloud 910 is co-located at an edge location, such as an access point or base station 940, a local processing hub 950, or a central office 920, and thus may include multiple entities, devices, and equipment instances. The edge cloud 910 is located much closer to the endpoint (consumer and producer) data sources 960 (e.g., autonomous vehicles 961, user equipment 962, business and industrial equipment 963, video capture devices 964, drones 965, smart cities and building devices 966, sensors and Internet-of-Things (IoT) devices 967, etc.) than the cloud data center 930. Compute, memory, and storage resources that are offered at the edges in the edge cloud 910 are critical to providing ultra-low latency response times for services and functions used by the endpoint data sources 960 as well as reducing network backhaul traffic from the edge cloud 910 toward cloud data center 930 thus improving energy consumption and overall network usages among other benefits.

Compute, memory, and storage are scarce resources, and generally decrease depending on the edge location (e.g., fewer processing resources being available at consumer endpoint devices, than at a base station, than at a central office). However, the closer that the edge location is to the endpoint (e.g., user equipment (UE)), the more that space and power is often constrained. Thus, edge computing attempts to reduce the amount of resources needed for network services, through the distribution of more resources which are located closer both geographically and in network access time. In this manner, edge computing attempts to bring the compute resources to the workload data where appropriate, or bring the workload data to the compute resources.

The following describes aspects of an example edge cloud architecture that covers multiple potential deployments and addresses restrictions that some network operators or service providers may have in their own infrastructures. These include, variation of configurations based on the edge location (because edges at a base station level, for instance, may have more constrained performance and capabilities in a multi-tenant scenario); configurations based on the type of compute, memory, storage, fabric, acceleration, or like resources available to edge locations, tiers of locations, or groups of locations; the service, security, and management and orchestration capabilities; and related objectives to achieve usability and performance of end services. These deployments may accomplish processing in network layers that may be considered as "near edge", "close edge", "local edge", "middle edge", or "far edge" layers, depending on latency, distance, and timing characteristics.

Edge computing is a developing paradigm where computing is performed at or closer to the "edge" of a network, typically through the use of a compute platform (e.g., x86 or ARM compute hardware architecture) implemented at base stations, gateways, network routers, or other devices, which are much closer to endpoint devices producing and consuming the data. For example, resources of an edge devices layer of the edge environment may include edge switches (e.g., edge switch servers, edge switch servers including NIC circuitry, etc.), edge gateways (e.g., edge gateway servers, edge gateway servers including NIC circuitry, etc.), etc., which may be equipped with pools of memory and storage resources to perform computation in real-time for low latency use-cases (e.g., autonomous driving or video surveillance) for connected client devices. Or as an example, base stations may be augmented with compute and/or acceleration resources to directly process service workloads for connected user equipment, without further communicating data via backhaul networks. Or as another example, central office network management hardware may be replaced with standardized compute hardware that performs virtualized network functions and offers compute resources for the execution of services and consumer functions for connected devices. Within edge computing networks, there may be scenarios in services that the compute resource will be "moved" to the data, as well as scenarios in which the data will be "moved" to the compute resource. Or as an example, base station compute, acceleration, and network resources can provide services in order to scale to workload demands on an as needed basis by activating dormant capacity (subscription, capacity on demand) in order to manage corner cases, emergencies or to provide longevity for deployed resources over a significantly longer implemented lifecycle.

In contrast to the example network architecture of FIG. 9, traditional endpoint (e.g., UE, vehicle-to-vehicle (V2V), vehicle-to-everything (V2X), etc.) applications are reliant on local device or remote cloud data storage and processing to exchange and coordinate information. A cloud data arrangement allows for long-term data collection and storage, but is not optimal for highly time varying data, such as a collision, a traffic light change, autonomous control of a system (e.g., an air vehicle (e.g., an unmanned aerial vehicle (UAV) or drone), a robot, a vehicle, etc.) etc., and may fail in attempting to meet bandwidth and/or latency challenges.

Depending on the real-time requirements in a communications context, a hierarchical structure of data processing and storage nodes may be defined in an edge computing deployment. For example, such a deployment may include local ultra-low-latency processing, regional storage and processing as well as remote cloud data-center based storage and processing. Key performance indicators (KPIs) may be used to identify where sensor data is best transferred and where it is processed or stored. This typically depends on the ISO layer dependency of the data. For example, lower layer (e.g., PHY, MAC, routing, etc.) data typically changes quickly and is better handled locally in order to meet latency requirements. Higher layer data such as Application Layer data is typically less time critical and may be stored and processed in a remote cloud data-center. At a more generic level, an edge computing system may be described to encompass any number of deployments operating in the edge cloud 910, which provide coordination from client and distributed computing devices.

Figure 10:
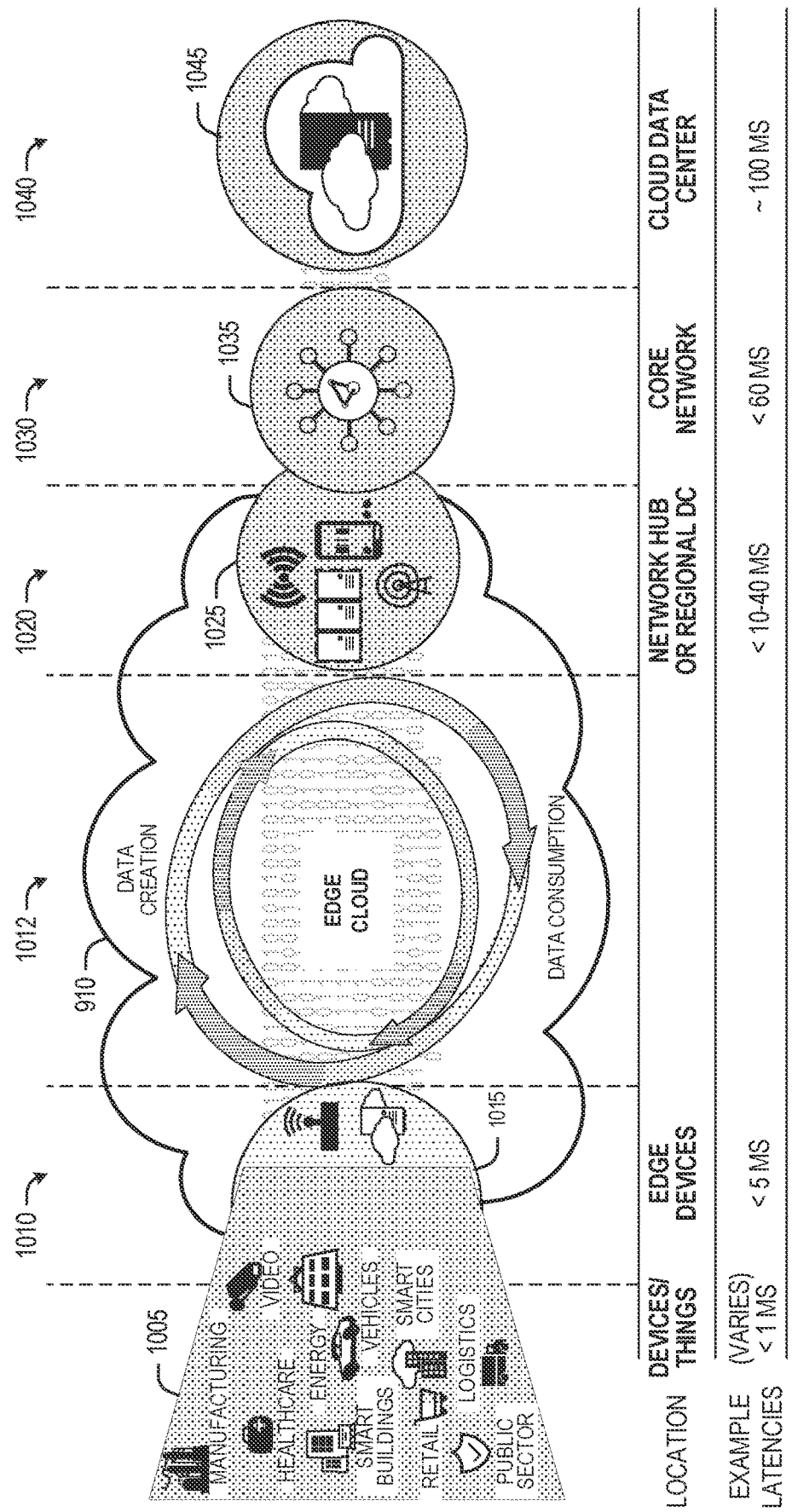
FIG. 10 illustrates operational layers among example endpoints, an example edge cloud, and example cloud computing environments that may implement the examples disclosed herein.

FIG. 10 illustrates operational layers among endpoints, an edge cloud, and cloud computing environments. Specifically, FIG. 10 depicts examples of computational use cases 1005, utilizing the edge cloud 910 of FIG. 9 among multiple illustrative layers of network computing. The layers begin at an endpoint (devices and things) layer 1000, which accesses the edge cloud 910 to conduct data creation, analysis, and data consumption activities. The edge cloud 910 may span multiple network layers, such as an edge devices layer 1010 having gateways, on-premise servers, or network equipment (nodes 1015) located in physically proximate edge systems; a network access layer 1020, encompassing base stations, radio processing units, network hubs, regional data centers (DC), or local network equipment (equipment 1025); and any equipment, devices, or nodes located therebetween (in layer 1012, not illustrated in detail). The network communications within the edge cloud 910 and among the various layers may occur via any number of wired or wireless mediums, including via connectivity architectures and technologies not depicted.

Examples of latency, resulting from network communication distance and processing time constraints, may range from less than a millisecond (ms) when among the endpoint layer 1000, under 5 ms at the edge devices layer 1010, to even between 10 to 40 ms when communicating with nodes at the network access layer 1020. Beyond the edge cloud 910 are core network 1030 and cloud data center 1040 layers, each with increasing latency (e.g., between 50-60 ms at the core network layer 1030, to 1000 or more ms at the cloud data center layer 1040). As a result, operations at a core network data center 1035 or a cloud data center 1045, with latencies of at least 50 to 100 ms or more, will not be able to accomplish many time-critical functions of the computational use cases 1005. Each of these latency values are provided for purposes of illustration and contrast; it will be understood that the use of other access network mediums and technologies may further reduce the latencies. In some examples, respective portions of the network may be categorized as "close edge", "local edge", "near edge", "middle edge", or "far edge" layers, relative to a network source and destination. For instance, from the perspective of the core network data center 1035 or the cloud data center 1045, a central office or content data network may be considered as being located within a "near edge" layer ("near" to the cloud, having high latency values when communicating with the devices and endpoints of the computational use cases 1005), whereas an access point, base station, on-premise server, or network gateway may be considered as located within a "far edge" layer ("far" from the cloud, having low latency values when communicating with the devices and endpoints of the computational use cases 1005). It will be understood that other categorizations of a particular network layer as constituting a "close", "local", "near", "middle", or "far" edge may be based on latency, distance, number of network hops, or other measurable characteristics, as measured from a source in any of the network layers 1000-1040.

The various computational use cases 1005 may access resources under usage pressure from incoming streams, due to multiple services utilizing the edge cloud 910. To achieve results with low latency, the services executed within the edge cloud 910 balance varying requirements in terms of: (a) Priority (throughput or latency) and QoS (e.g., traffic for an autonomous car or a video feed from a video camera may have higher priority than a temperature sensor in terms of response time requirement; or, a performance sensitivity/bottleneck may exist at a compute/accelerator, memory, storage, or network resource, depending on the application); (b) Reliability and Resiliency (e.g., some input streams need to be acted upon and the traffic routed with mission-critical reliability, where as some other input streams may be tolerate an occasional failure, depending on the application); and (c) Physical constraints (e.g., power, cooling and form-factor, etc.).

The end-to-end service view for these computational use cases 1005 involves the concept of a service-flow and is associated with a transaction. The transaction details the overall service requirement for the entity consuming the service, as well as the associated services for the resources, workloads, workflows, and business functional and business level requirements. The services executed with the "terms" described may be managed at each layer in a way to assure real time, and runtime contractual compliance for the transaction during the lifecycle of the service. When a component in the transaction is missing its agreed to service level agreement (SLA), the system as a whole (components in the transaction) may provide the ability to (1) understand the impact of the SLA violation, and (2) augment other components in the system to resume overall transaction SLA, and (3) implement steps to remediate.

Thus, with these variations and service features in mind, edge computing within the edge cloud 910 may provide the ability to serve and respond to multiple applications of the computational use cases 1005 (e.g., object tracking, video surveillance, connected cars, sensor measurement analysis, monitoring and/or control of a process control environment, etc.) in real-time or near real-time, and meet ultra-low latency requirements for these multiple applications. These advantages enable a whole new class of applications (e.g., virtual network functions (VNFs), Function as a Service (FaaS), Edge as a Service (EaaS), standard processes, etc.), which cannot leverage conventional cloud computing due to latency or other limitations.

However, with the advantages of edge computing comes the following caveats. The devices located at the edge are often resource constrained and therefore there is pressure on usage of edge resources. Typically, this is addressed through the pooling of memory and storage resources for use by multiple users (tenants) and devices. The edge may be power and cooling constrained and therefore the power usage needs to be accounted for by the applications that are consuming the most power. There may be inherent power-performance tradeoffs in these pooled memory resources, as many of them are likely to use emerging memory technologies, where more power requires greater memory bandwidth. Likewise, improved security of hardware and root of trust trusted functions are also required, because edge locations may be unmanned and may even need permissioned access (e.g., when housed in a third-party location). Such issues are magnified in the edge cloud 910 in a multi-tenant, multi-owner, or multi-access setting, where services and applications are requested by many users, especially as network usage dynamically fluctuates and the composition of the multiple stakeholders, use cases, and services changes.

At a more generic level, an edge computing system may be described to encompass any number of deployments at the previously discussed layers operating in the edge cloud 910 (network layers 1010-1030), which provide coordination from client and distributed computing devices. One or more edge gateway nodes, one or more edge aggregation nodes, and one or more core data centers may be distributed across layers of the network to provide an implementation of the edge computing system by or on behalf of a telecommunication service provider ("telco", or "TSP"), internet-of-things service provider, cloud service provider (CSP), enterprise entity, or any other number of entities. Various implementations and configurations of the edge computing system may be provided dynamically, such as when orchestrated to meet service objectives.

Consistent with the examples provided herein, a client compute node may be embodied as any type of endpoint component, device, appliance, or other thing capable of communicating as a producer or consumer of data. Further, the label "node" or "device" as used in the edge computing system does not necessarily mean that such node or device operates in a client or agent/minion/follower role; rather, any of the nodes or devices in the edge computing system refer to individual entities, nodes, or subsystems, which include discrete or connected hardware or software configurations to facilitate or use the edge cloud 910.

As such, the edge cloud 910 is formed from network components and functional features operated by and within edge gateway nodes, edge aggregation nodes, or other edge compute nodes among network layers 1010-1030. The edge cloud 910 thus may be embodied as any type of network that provides edge computing and/or storage resources which are proximately located to radio access network (RAN) capable endpoint devices (e.g., mobile computing devices, IoT devices, smart devices, etc.), which are discussed herein. In other words, the edge cloud 910 may be envisioned as an "edge" that connects the endpoint devices and traditional network access points that serve as an ingress point into service provider core networks, including mobile carrier networks (e.g., Global System for Mobile Communications (GSM) networks, Long-Term Evolution (LTE) networks, 5G/6G networks, etc.), while also providing storage and/or compute capabilities. Other types and forms of network access (e.g., wireless fidelity (Wi-Fi), long-range wireless, wired networks including optical networks, etc.) may also be utilized in place of or in combination with such Second Generation Partnership Project (2GPP) and/or Third Generation Partnership Project (3GPP) carrier networks.

The network components of the edge cloud 910 may be servers, multi-tenant servers, appliance computing devices, and/or any other type of computing devices. For example, the edge cloud 910 may include an appliance computing device that is a self-contained electronic device including a housing, a chassis, a case, or a shell. In some circumstances, the housing may be dimensioned for portability such that it can be carried by a human and/or shipped. Example housings may include materials that form one or more exterior surfaces that partially or fully protect contents of the appliance, in which protection may include weather protection, hazardous environment protection (e.g., electromagnetic interference (EMI), vibration, extreme temperatures, etc.), and/or enable submergibility. Example housings may include power circuitry to provide power for stationary and/or portable implementations, such as alternating current (AC) power inputs, direct current (DC) power inputs, AC/DC or DC/AC converter(s), power regulators, transformers, charging circuitry, batteries, wired inputs and/or wireless power inputs, etc. Example housings and/or surfaces thereof may include or connect to mounting hardware to enable attachment to structures such as buildings, telecommunication structures (e.g., poles, antenna structures, etc.) and/or racks (e.g., server racks, blade mounts, etc.). Example housings and/or surfaces thereof may support one or more sensors (e.g., temperature sensors, vibration sensors, light sensors, acoustic sensors, capacitive sensors, proximity sensors, etc.). One or more such sensors may be contained in, carried by, or otherwise embedded in the surface and/or mounted to the surface of the appliance. Example housings and/or surfaces thereof may support mechanical connectivity, such as propulsion hardware (e.g., wheels, propellers, etc.) and/or articulating hardware (e.g., robot arms, pivotable appendages, etc.). In some circumstances, the sensors may include any type of input devices such as user interface hardware (e.g., buttons, switches, dials, sliders, etc.). In some circumstances, example housings include output devices contained in, carried by, embedded therein and/or attached thereto. Output devices may include displays, touchscreens, lights, light emitting diodes (LEDs), speakers, I/O ports (e.g., universal serial bus (USB) ports or inputs), etc. In some circumstances, edge devices are devices presented in the network for a specific purpose (e.g., a traffic light), but may have processing and/or other capacities that may be utilized for other purposes. Such edge devices may be independent from other networked devices and may be provided with a housing having a form factor suitable for its primary purpose; yet be available for other compute tasks that do not interfere with its primary task. Edge devices include IoT devices. The appliance computing device may include hardware and software components to manage local issues such as device temperature, vibration, resource utilization, updates, power issues, physical and network security, etc. The example processor systems of at least FIGS. 14, 15, 16, and/or 17 illustrate example hardware for implementing an appliance computing device. The edge cloud 910 may also include one or more servers and/or one or more multi-tenant servers. Such a server may include an operating system and a virtual computing environment. A virtual computing environment may include a hypervisor managing (e.g., spawning, deploying, destroying, etc.) one or more virtual machines (VMs), one or more containers, etc. Such virtual computing environments provide an execution environment in which one or more applications and/or other software, code or scripts may execute while being isolated from one or more other applications, software, code, or scripts.

Figure 11:
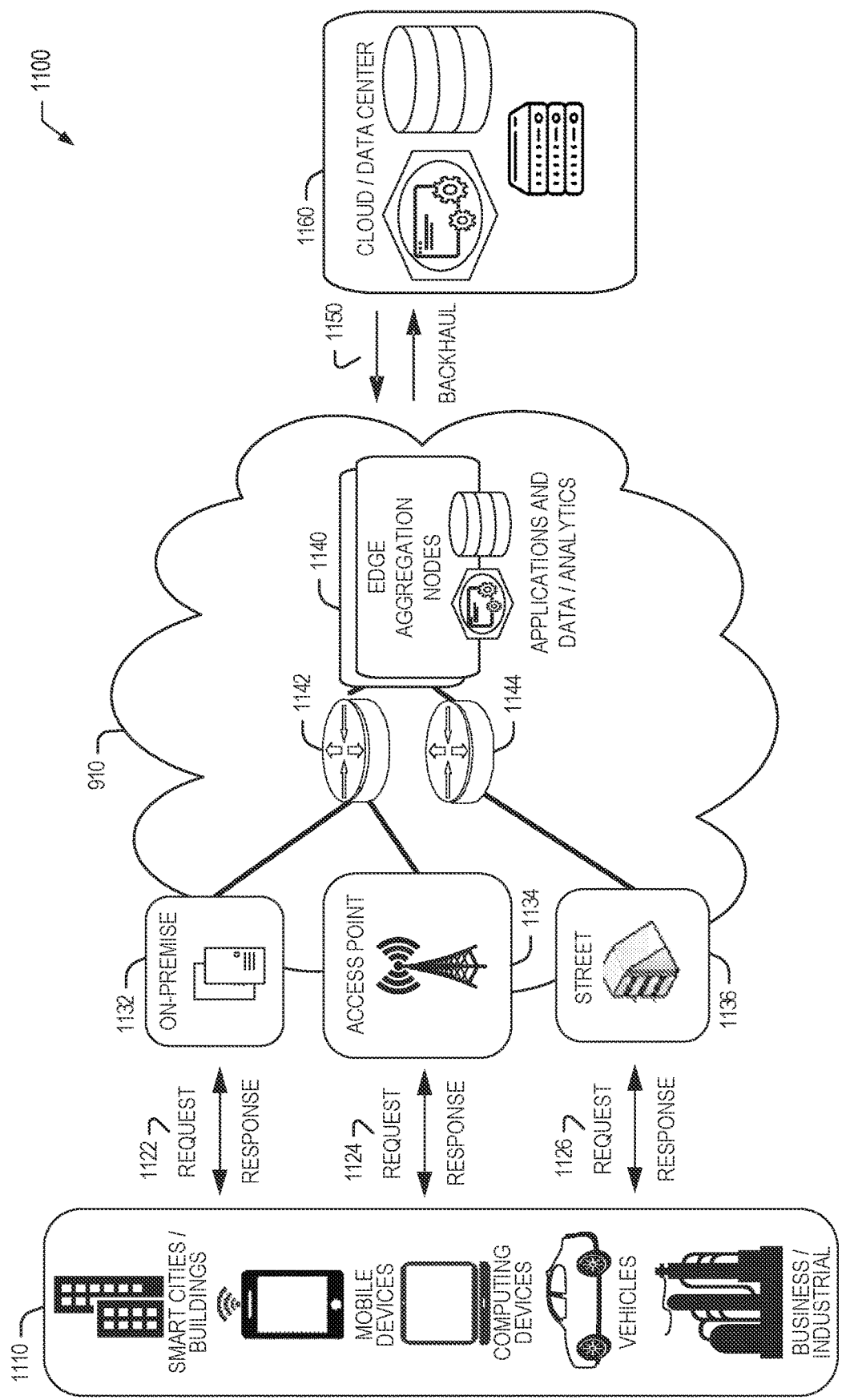
FIG. 11 illustrates an example approach for networking and services in an edge computing system that may implement the examples disclosed herein.

In FIG. 11, an example edge computing system 1100 includes various client endpoints 1110 (in the form of mobile devices (e.g., mobile computing devices), computing devices (e.g., computers), vehicles (e.g., autonomous vehicles), business computing equipment, industrial processing computing equipment) exchange requests and responses 1122, 1124, 1126 that are specific to the type of endpoint network aggregation. For instance, the client endpoints 1110 may obtain network access via a wired broadband network, by exchanging first example requests and responses 1122 through an example on-premise network system 1132. Some of the client endpoints 1110, such as mobile devices, may obtain network access via a wireless broadband network, by exchanging second example requests and responses 1124 through an example access point (e.g., cellular network tower) 1134. Some of the client endpoints 1110, such as autonomous vehicles may obtain network access for third example requests and responses 1126 via a wireless vehicular network through an example street-located network system 1136. However, regardless of the type of network access, the TSP may deploy example aggregation points 1142, 1144 within the edge cloud 910 of FIGS. 9 and/or 10 to aggregate traffic and requests. Thus, within the edge cloud 910, the TSP may deploy various compute and storage resources, such as at example edge aggregation nodes 1140, to provide requested content. The edge aggregation nodes 1140 and other systems of the edge cloud 910 are connected to an example cloud or data center 1160, which uses an example backhaul network 1150 to fulfill higher-latency requests from the cloud/data center 1160 for websites, applications, database servers, etc. Additional or consolidated instances of the edge aggregation nodes 1140 and the aggregation points 1142, 1144, including those deployed on a single server framework, may also be present within the edge cloud 910 or other areas of the TSP infrastructure.

Figure 13:
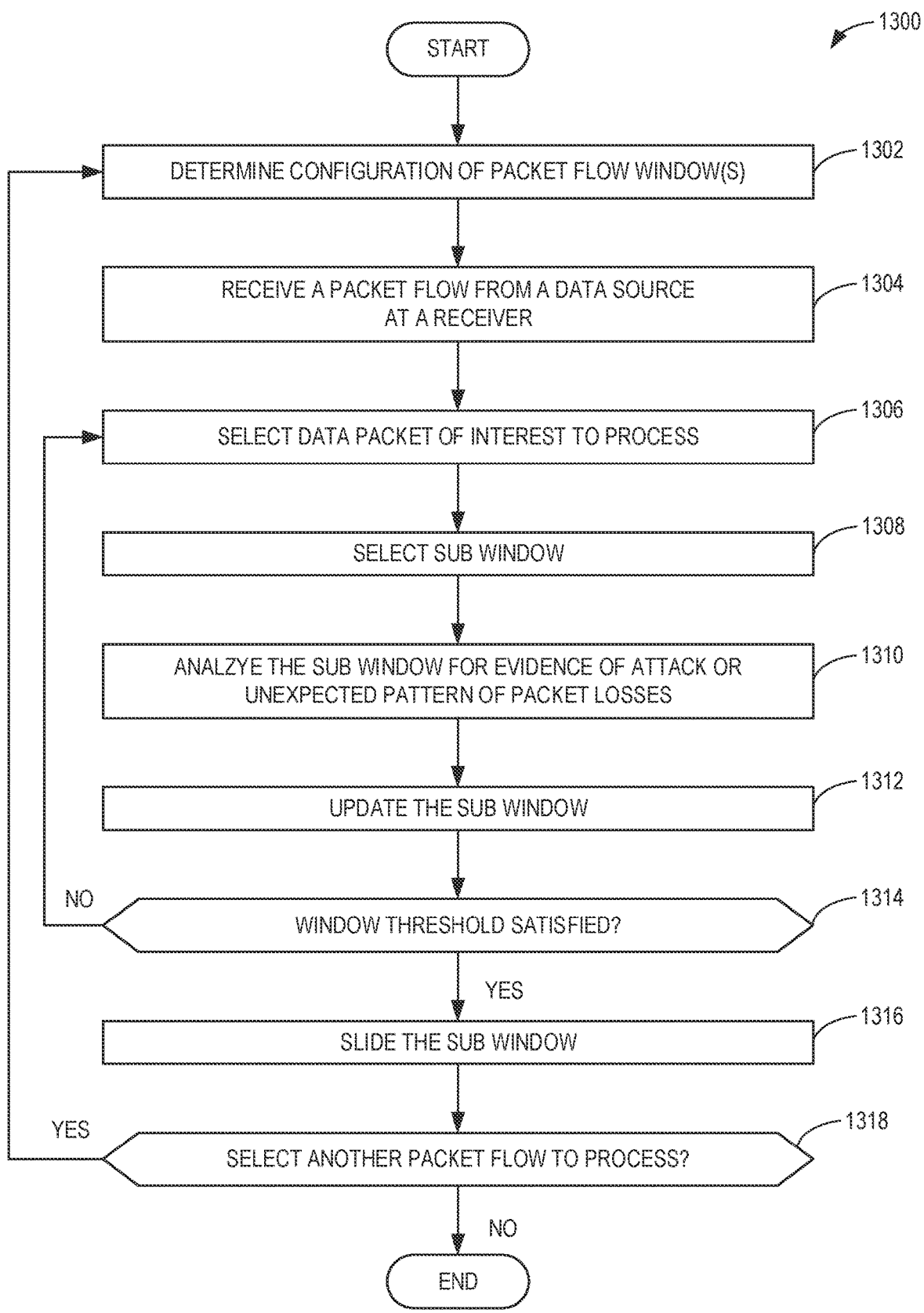
FIG. 13 is a flowchart representative of example machine readable instructions and/or operations that may be executed and/or instantiated to implement the example NIC circuitry of FIGS. 1, 2, and/or 8 and/or the IPUs of FIGS. 6 and/or 7 to effectuate sliding window management on example parallel windows.

Flowcharts representative of example hardware logic, machine readable instructions, hardware implemented state machines, and/or any combination thereof for implementing the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8 is shown in FIGS. 12-13. The machine readable instructions may be one or more executable programs or portion(s) of an executable program for execution by a computer processor and/or processor circuitry, such as the processor circuitry 1412 shown in the example processor platform 1400 discussed below in connection with FIG. 14, the processor circuitry 1500 of FIG. 15, the FPGA circuitry 1600 of FIG. 16, and/or the processor circuitry 1412 shown in the example system 1700 discussed below in connection with FIG. 17. The program may be embodied in software stored on a non-transitory computer readable storage medium such as a CD-ROM, a floppy disk, a hard drive, a DVD, a Blu-ray disk, or a memory associated with the processor circuitry 1412 of FIG. 14, the processor circuitry 1500 of FIG. 15, the FPGA circuitry 1600 of FIG. 16, and/or the processor circuitry 1412 shown in the system 1700 of FIG. 17, but the entire program and/or parts thereof could alternatively be executed by a device other than the processor circuitry 1412 of FIG. 14, the processor circuitry 1500 of FIG. 15, the FPGA circuitry 1600 of FIG. 16, and/or the processor circuitry 1412 shown in the system 1700 of FIG. 17 and/or embodied in firmware or dedicated hardware. Further, although the example program is described with reference to the flowcharts illustrated in FIGS. 12-13, many other methods of implementing the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 12-13 may be implemented using executable instructions (e.g., computer and/or machine readable instructions) stored on a non-transitory computer and/or machine readable medium such as an HDD, a flash memory, a read-only memory, a CD, a DVD, a cache, a random-access memory, and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 12 is a flowchart representative of example machine readable instructions 1200 and/or example operations 1200 that may be executed and/or instantiated by processor circuitry to invoke transmission of sub flows to a destination logic entity. For example, the machine readable instructions 1200 and/or operations 1200 may be executed and/or instantiated by the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8 to invoke transmission of sub flows to a destination logic entity.

The example machine readable instructions 1200 and/or the example operations 1200 of the example of FIG. 12 begin at block 1202, at which the NIC circuitry 104A-B determines a packet flow distribution configuration. For example, the first configuration determination circuitry 206 (FIG. 2) can determine to partition the packet flow 302 of FIG. 3A into three sub flows, such as the sub flows 304, 306, 308 of FIG. 3A.

At block 1204, the NIC circuitry 104A-B selects a packet flow from a data source to process. For example, the flow division circuitry 208 (FIG. 2) can select the packet flow 302 of FIG. 3A to process.

At block 1206, the NIC circuitry 104A-B partitions the packet flow into sub flows based on the packet flow distribution configuration. For example, the flow division circuitry 208 can partition the packet flow 302 into the sub flows 304, 306, 308 based on a round-robin distribution. In some examples, the flow division circuitry 208 can partition the packet flow 302 based on the example of Equation (1), Equation (2), Equation (3), and/or Equation (4) above.

At block 1208, the NIC circuitry 104A-B schedules sub flows for transmission by providing sub flows to a buffer. For example, the flow schedule circuitry 210 (FIG. 2) can store the sub flows 304, 306, 308 into a buffer.

At block 1210, the NIC circuitry 104A-B dequeues sub flows from the buffer to available core(s). For example, the flow schedule circuitry 210 can dequeue the sub flows 304, 306, 308 to available one(s) of the cores 312, 314, 316. In some examples, the available one(s) of the cores 312, 314, 316 can dequeue one(s) of the sub flows 304, 306, 308 from the buffer.

At block 1212, the NIC circuitry 104A-B invokes transmission of the sub flows to a destination device. For example, the transmitter 214 (FIG. 2) can transmit the sub flows 304, 306, 308 to a destination device, such as the external computing system(s) 126 of FIG. 1 by the network 124 of FIG. 1.

At block 1214, the NIC circuitry 104A-B determines whether to select another packet flow to process. For example, the flow division circuitry 208 can select another packet flow to process. If, at block 1214, the NIC circuitry 104A-B determines to select another packet flow to process, control returns to block 1202 to determine a packet flow distribution configuration, otherwise the example machine readable instructions 1200 and/or the example operations 1200 of FIG. 12 conclude.

FIG. 13 is a flowchart representative of example machine readable instructions 1300 and/or example operations 1300 that may be executed and/or instantiated by processor circuitry to effectuate sliding window management on example parallel windows. For example, the machine readable instructions 1300 and/or the operations 1300 may be executed and/or instantiated by the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8 to effectuate sliding window management on example parallel windows.

The example machine readable instructions 1300 and/or example operations 1300 of the example of FIG. 13 begin at block 1302, at which the NIC circuitry 104A-B determines a configuration of packet flow window(s). For example, the second configuration determination circuitry 218 (FIG. 2) can determine a number of the parallel windows 502, 504, 506 of FIGS. 5A and/or 5B, a data size for respective one(s) of the parallel windows 502, 504, 506, etc.

At block 1304, the NIC circuitry 104A-B receives a packet flow from a data source at a receiver. For example, the receiver 216 (FIG. 2) can receive an incoming packet flow from the external computing system(s) 126 of FIG. 1 by the network 124 of FIG. 1, where the incoming data flow corresponds to data included in the first primary window 508 of FIG. 5A and/or the second primary window 512 of FIG. 5B.

At block 1306, the NIC circuitry 104A-B selects a data packet of interest to process. For example, the window determination circuitry 220 (FIG. 2) can select a first data packet corresponding to a first window of the first primary window 508 of FIG. 5A and/or the second primary window 512 of FIG. 5B to process.

At block 1308, the NIC circuitry 104A-B selects a sub window. For example, the window determination circuitry 220 can select the first parallel window 502 of FIGS. 5A and/or 5B to process.

At block 1310, the NIC circuitry 104A-B analyzes the sub window for evidence of an attack or an unexpected pattern of packet losses. For example, the security handling circuitry 224 (FIG. 2) can analyze the first parallel window 502 to determine whether the computing system 102 is experiencing an attack (e.g., a replay attack) or other network issues. In some such examples, the security handling circuitry 224 can validate and/or otherwise check that the first parallel window 502 is within a valid range against the first primary window 508 of FIG. 5A and/or the second primary window 512 of FIG. 5B.

At block 1312, the NIC circuitry 104A-B updates the sub window. For example, the window determination circuitry 220 can update the first parallel window 502 with the first data packet from the first primary window 508 of FIG. 5A and/or the second primary window 512 of FIG. 5B.

At block 1314, the NIC circuitry 104A-B determines whether a window threshold has been satisfied. For example, the slide management circuitry 222 (FIG. 2) can determine that a time duration corresponding to the twelve windows of the first primary window 508 of FIG. 5A and/or the second primary window 512 of FIG. 5B has elapsed. In some such examples, the slide management circuitry 222 can determine that all available data packets that have been received have been processed.

If, at block 1314 the NIC circuitry 104A-B determines that the window threshold has not been satisfied, control returns to block 1306 to select another data packet of interest to process. If, at block 1314, the NIC circuitry 104A-B determines that the window threshold has been satisfied, then, at block 1316, the NIC circuitry 104A-B slides the sub window. For example, the slide management circuitry 222 can slide the first parallel window 502 from left-to-right.

At block 1318, the NIC circuitry 104A-B determines whether to select another packet flow to process. For example, the receiver 216 can receive another packet flow from a data source. If, at block 1318, the NIC circuitry 104A-B determines to select another packet flow to process, control returns to block 1302 to determine a configuration of the packet flow window(s), otherwise the example machine readable instructions 1300 and/or the example operations 1300 of FIG. 13 conclude.

FIG. 14 is a block diagram of an example processor platform 1400 structured to execute and/or instantiate the example machine readable instructions and/or example operations of FIGS. 12 and/or 13 to implement the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 412 implements the NIC circuitry 104A-B of FIGS. 1 and/or 2 and/or the processor circuitry 310 of FIGS. 3A-3C. For example, the processor circuitry 1412 can implement at least one of the example storage 203, and/or the first example configuration determination circuitry 206, the example flow division circuitry 208, the example flow schedule circuitry 210, the example packet distributor packet processing circuitry 212, the example transmitter 214, and/or, more generally, the example packet distributor circuitry 202, the example receiver 216, the second example configuration determination circuitry 218, the example window determination circuitry 220, the example slide management circuitry 222, the example security handling circuitry 224, the example packet receiver packet processing circuitry 226, and/or, more generally, the example packet receiver circuitry 204, of FIG. 2.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by SDRAM, DRAM, RDRAM®, and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface. In this example, the interface circuit 1420 implements the NIC circuitry 104A-B of FIGS. 1 and/or 2. For example, the interface circuitry 1420 can implement the example storage 203, and/or the first example configuration determination circuitry 206, the example flow division circuitry 208, the example flow schedule circuitry 210, the example packet distributor packet processing circuitry 212, the example transmitter 214, and/or, more generally, the example packet distributor circuitry 202, the example receiver 216, the second example configuration determination circuitry 218, the example window determination circuitry 220, the example slide management circuitry 222, the example security handling circuitry 224, the example packet receiver packet processing circuitry 226, and/or, more generally, the example packet receiver circuitry 204 of FIG. 2.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIGS. 12 and/or 13 may be stored in the mass storage device 1428, in the volatile memory 1414, in the non-volatile memory 1416, and/or on a removable non-transitory computer readable storage medium such as a CD or DVD.

FIG. 15 is a block diagram of an example implementation of the processor circuitry 1412 of FIG. 14. In this example, the processor circuitry 1412 of FIG. 14 is implemented by a microprocessor 1500. For example, the microprocessor 1500 may implement multi-core hardware circuitry such as a CPU, a DSP, a GPU, an XPU, an IPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowcharts of FIGS. 12 and/or 13

The cores 1502 may communicate by a first example bus 1504. In some examples, the first bus 1504 may implement a communication bus to effectuate communication associated with one(s) of the cores 1502. For example, the first bus 1504 may implement at least one of an Inter-Integrated Circuit (I2C) bus, a Serial Peripheral Interface (SPI) bus, a PCI bus, or a PCIe bus. Additionally or alternatively, the first bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1518, the L1 cache 1520, and a second example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register (s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The second bus 1522 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions and/or operations represented by the flowcharts of FIGS. 12 and/or 13 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions and/or operations represented by the flowcharts of FIGS. 12 and/or 13. In particular, the FPGA circuitry 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowcharts of FIGS. 12 and/or 13. As such, the FPGA circuitry 1600 may be structured to effectively instantiate some or all of the machine readable instructions and/or operations of the flowcharts of FIGS. 12 and/or 13 as dedicated logic circuits to perform the operations corresponding to those software instructions in a dedicated manner analogous to an ASIC. Therefore, the FPGA circuitry 1600 may perform the operations corresponding to the some or all of the machine readable instructions and/or operations of FIGS. 12 and/or 13 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions and/or operations from a user, a machine (e.g., hardware circuitry (e.g., programmed or dedicated circuitry) that may implement an Artificial Intelligence/Machine Learning (AI/ML) model to generate the machine readable instructions and/or operations), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIGS. 12 and/or 13 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, an IPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions and/or operations represented by the flowcharts of FIGS. 12 and/or 13 may be executed by one or more of the cores 1502 of FIG. 15 and a second portion of the machine readable instructions and/or operations represented by the flowcharts of FIGS. 12 and/or 13 may be executed by the FPGA circuitry 1600 of FIG. 16.

In some examples, the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU, an IPU, etc., may be implemented by the processor circuitry 1412 of FIG. 14, which may be in one or more packages. For example, the XPU, the IPU, etc., may include a CPU in one package, a DSP in another package, a GPU in yet another package, and an FPGA in still yet another package.

Figure 17:
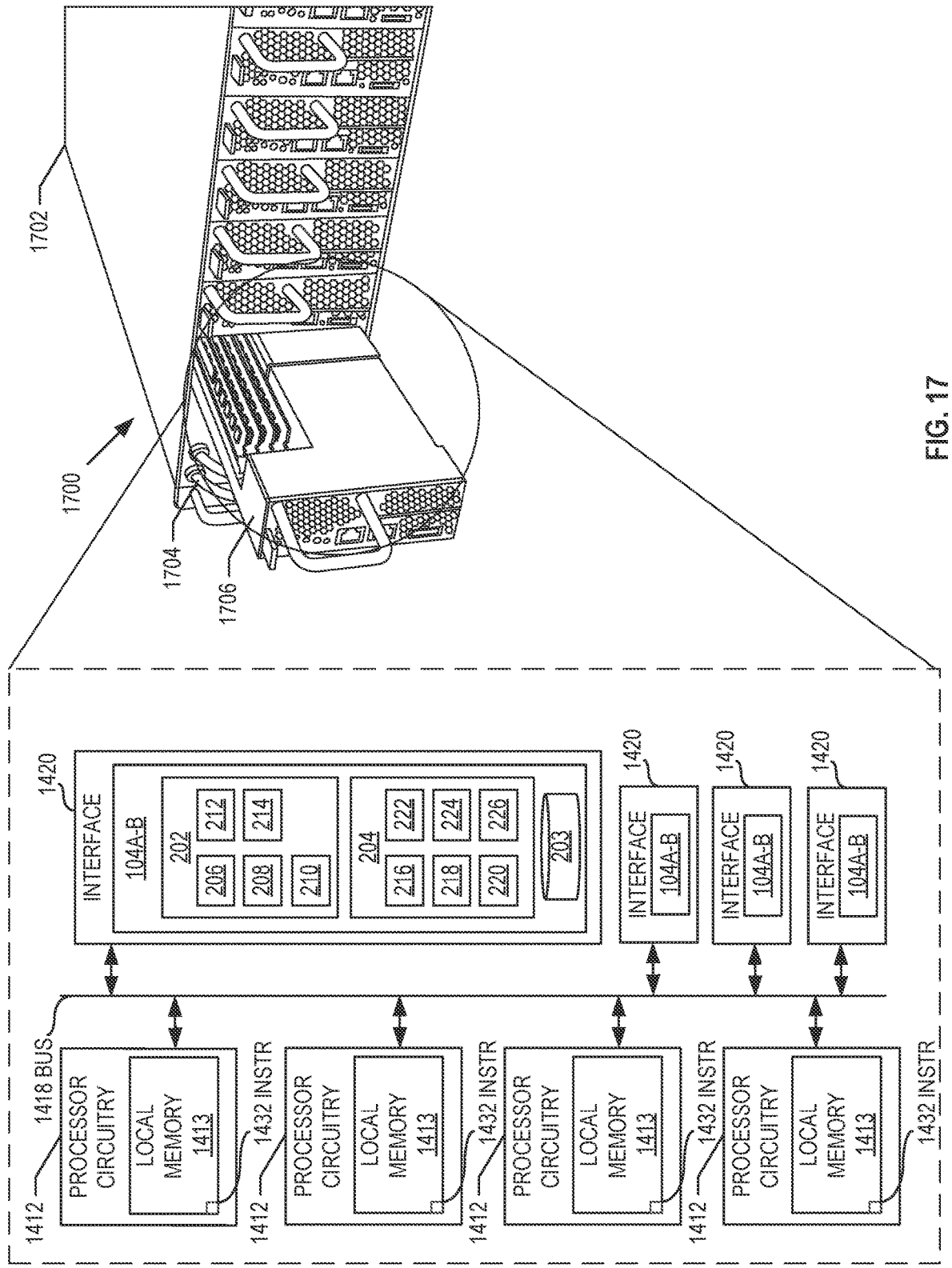
FIG. 17 is a block diagram of a second example processor platform structured to execute the example machine readable instructions of FIGS. 12 and/or 13 to implement the example NIC circuitry of FIGS. 1, 2, and/or 8 and/or the IPUs of FIGS. 6 and/or 7.

FIG. 17 is an example system 1700 capable of executing the example machine readable instructions and/or example operations of FIGS. 12 and/or 13 to implement the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8. In the illustrated example of FIG. 17, the system 1700 is a rack-mount server. Alternatively, the system 1700 can be any other type of computing device or system such as an edge server (e.g., an edge gateway server), an edge switch (e.g., an edge gateway switch), etc. The system 1700 of the illustrated example includes a chassis 1702, which includes removably attached power supplies 1704 and removably attached servers 1706. In the illustrated example, the servers 1706 include a plurality of the processor circuitry 1412, a plurality of the local memories 1413, and a plurality of the interface circuitry 1420 of FIG. 14. In the example of FIG. 17, one(s) of the interface circuits 1720 include the NIC circuitry 104A-B of FIGS. 1 and/or 2. Alternatively, fewer or more than the plurality of the processor circuitry 1412, the plurality of the local memories 1413, and/or the plurality of the interface circuitry 1420 than depicted in FIG. 17 may be used.

Figure 18:
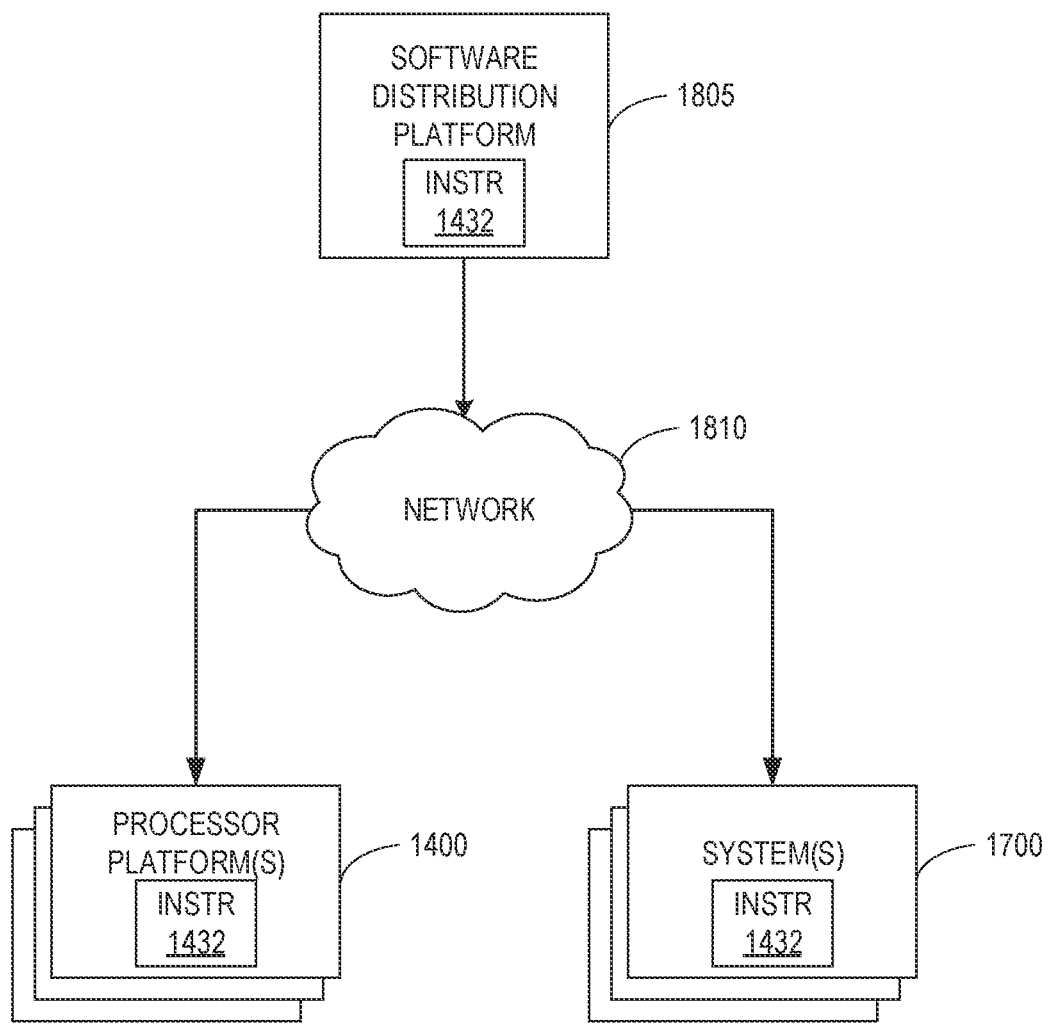
FIG. 18 is a block diagram of an example software distribution platform to distribute software to example client devices, example retailers, and/or example original equipment manufacturers (OEMs).

A block diagram illustrating an example software distribution platform 1805 to distribute software such as the example machine readable instructions 1432 of FIG. 14 to third parties is illustrated in FIG. 18. The example software distribution platform 1805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1805 includes one or more servers and one or more storage devices. The storage devices store the machine readable instructions 1432, which may correspond to the example machine readable instructions and/or the example operations 1200, 1300 of FIGS. 12 and/or 13, as described above. The one or more servers of the example software distribution platform 1805 are in communication with a network 1810, which may correspond to any one or more of the Internet and/or any of the example networks 124, 1426 described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the machine readable instructions 1432 from the software distribution platform 1805. For example, the software, which may correspond to the example machine readable instructions 1432 of FIG. 14, may be downloaded to one(s) of the example processor platform 1400 of FIG. 14 and/or one(s) of the example system 170 of FIG. 17, which is/are to execute the machine readable instructions 1432 to implement the NIC circuitry 104A-B of FIGS. 1 and/or 2, the NIC circuitry 604 of FIG. 6, and/or, more generally, the IPU 600 of FIG. 6, the NIC circuitry 708 of FIG. 7, and/or, more generally, the IPU 704 of FIG. 7, and/or the NIC circuitry 800 of FIG. 8. In some examples, one or more servers of the software distribution platform 1805 periodically offer, transmit, and/or force updates to the software (e.g., the example machine readable instructions 1432 of FIG. 14) to ensure improvements, patches, updates, etc. are distributed and applied to the software at the end user devices.

From the foregoing, it will be appreciated that example methods, apparatus, and articles of manufacture have been disclosed for performance scaling with parallel processing of sliding window management on multi-core architecture. The disclosed methods, apparatus, and articles of manufacture effectuate efficient parallelization during a transmission of a data flow or a receipt of the data flow.

The disclosed methods, apparatus, and articles of manufacture improve the efficiency of using a computing device by effectuating N-way parallelization of sequence number generation for use by a sliding window protocol for multi-core scaling. The disclosed methods, apparatus, and articles of manufacture improve the efficiency of using a computing device by enabling a processing of elephant flows to scale on par with multi-flow throughputs in a processor platform, without introducing additional latency from synchronization primitives or isolating section(s) to independent data pipeline stage(s). The disclosed methods, apparatus, and articles of manufacture leverages generational improvements of multi-core hardware without re-architecting an elephant flow data pipeline. The disclosed methods, apparatus, and articles of manufacture are accordingly directed to one or more improvement(s) in the functioning of a computer.

Example methods, apparatus, systems, and articles of manufacture for performance scaling with parallel processing of sliding window management on multi-core architecture are disclosed herein. Further examples and combinations thereof include the following:

Example 1 includes an apparatus for sliding window management of network packets, the apparatus comprising at least one memory, instructions in the apparatus, and processor circuitry to at least one of execute or instantiate the instructions to partition a packet flow into two or more sub flows based on a packet flow distribution configuration, the two or more sub flows associated respectively with two or more sliding windows that are able to slide in parallel, provide the two or more sub flows to a buffer to schedule distribution of the two or more sub flows, dequeue the two or more sub flows from the buffer to one or more hardware cores, and transmit the two or more sub flows to a destination device.

In Example 2, the subject matter of Example 1 can optionally include that the processor circuitry is to update the two or more sliding windows with data included in the two or more sub flows, and slide the two or more sliding windows in response to a window threshold being satisfied.

In Example 3, the subject matter of Examples 1-2 can optionally include that the two or more sliding windows include a first sliding window and a second sliding window, and the processor circuitry is to determine a first slide rate associated with the first sliding window, determine a second slide rate associated with the second sliding window, and identify a network attack in response to a determination that the first slide rate is greater than the second slide rate.

In Example 4, the subject matter of Examples 1-3 can optionally include that the processor circuitry is to determine that the packet flow distribution configuration is indicative of a round robin distribution or a random distribution, and partition the packet flow based on the round robin distribution or the random distribution.

In Example 5, the subject matter of Examples 1-4 can optionally include that the one or more hardware cores include a first hardware core and a second hardware core, and the processor circuitry is to identify the first hardware core as available based on a first utilization of the first hardware core, identify the second hardware core as unavailable based on a second utilization of the second hardware core, the second utilization greater than the first utilization, and dequeue the two or more sub flows from the buffer to the first hardware core in response to the identification of the first hardware core as available.

In Example 6, the subject matter of Examples 1-5 can optionally include that the processor circuitry is to dequeue the two or more sub flows from the buffer to an assigned sequence number space of the first hardware core, and cause the first hardware core to provide the two or more sub flows to a transmit sequence number space of a transmitter, the transmitter to transmit the two or more sub flows from the transmit sequence number space to the destination device.

In Example 7, the subject matter of Examples 1-6 can optionally include that the packet flow is a second packet flow to be processed after a first packet flow, and the processor circuitry is to determine a quantity of the two or more sub flows, determine a first flow identifier of the first packet flow, determine a second flow identifier of the second packet flow, determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value, and partition the second packet flow based on the third flow identifier.

In Example 8, the subject matter of Examples 1-7 can optionally include that the processor circuitry is to partition a primary window into the two or more sliding windows based on a modulo of a sequence number of the packet flow and a quantity of the two more sliding windows.

In Example 9, the subject matter of Examples 1-8 can optionally include that at least one of the processor circuitry is included in a first accelerated networking device, the one or more hardware cores are included in a second accelerated networking device, or the destination device is a third accelerated networking device.

Example 10 includes an apparatus for sliding window management of network packets, the apparatus comprising means for partitioning a packet flow into two or more sub flows based on a packet flow distribution configuration, means for providing to provide the two or more sub flows to a buffer to schedule distribution of the two or more sub flows, the two or more sub flows associated respectively with two or more sliding windows that are able to slide in parallel, and dequeue the two or more sub flows from the buffer to one or more hardware cores, and means for transmitting the two or more sub flows to a destination device.

In Example 11, the subject matter of Example 10 can optionally include means for updating the two or more sliding windows with data included in the two or more sub flows, and means for sliding the two or more sliding windows in response to a window threshold being satisfied.

In Example 12, the subject matter of Examples 10-11 can optionally include that the two or more sliding windows include a first sliding window and a second sliding window, and further including the means for providing to determine a first slide rate associated with the first sliding window, and determine a second slide rate associated with the second sliding window, and means for identifying a network attack in response to a determination that the first slide rate is greater than the second slide rate.

In Example 13, the subject matter of Examples 10-12 can optionally include means for determining that the packet flow distribution configuration is indicative of a round robin distribution or a random distribution, and the means for partitioning to partition the packet flow based on the round robin distribution or the random distribution.

In Example 14, the subject matter of Examples 10-13 can optionally include that the one or more hardware cores include a first hardware core and a second hardware core, and the means for providing is to identify the first hardware core as available based on a first utilization of the first hardware core, and identify the second hardware core as unavailable based on a second utilization of the second hardware core, the second utilization greater than the first utilization, and dequeue the two or more sub flows from the buffer to the first hardware core in response to the identification of the first hardware core as available.

In Example 15, the subject matter of Examples 10-14 can optionally include that the means for providing is to dequeue the two or more sub flows from the buffer to an assigned sequence number space of the first hardware core, and cause the first hardware core to provide the two or more sub flows to a transmit sequence number space of the means for transmitting, the means for transmitting to transmit the two or more sub flows from the transmit sequence number space to the destination device.

In Example 16, the subject matter of Examples 10-15 can optionally include that the packet flow is a second packet flow to be processed after a first packet flow, and the means for partitioning is to determine a quantity of the two or more sub flows, determine a first flow identifier of the first packet flow, determine a second flow identifier of the second packet flow, determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value, and partition the second packet flow based on the third flow identifier.

In Example 17, the subject matter of Examples 10-16 can optionally include means for updating, the means for updating to partition a primary window into the two or more sliding windows based on a modulo of a sequence number of the packet flow and a quantity of the two more sliding windows.

In Example 18, the subject matter of Examples 10-17 can optionally include that at least one of the means for partitioning, the means for providing, the means for transmitting, or the destination device is included in an accelerated networking device.

Example 19 includes at least one computer readable medium comprising instructions that, when executed, cause processor circuitry to at least partition a packet flow into two or more sub flows based on a packet flow distribution configuration, provide the two or more sub flows to a buffer to schedule distribution of the two or more sub flows, the two or more sub flows associated respectively with two or more sliding windows that are able to slide in parallel, dequeue the two or more sub flows from the buffer to one or more hardware cores, and transmit the two or more sub flows to a destination device.

In Example 20, the subject matter of Example 19 can optionally include that the instructions, when executed, cause the processor circuitry to update the two or more sliding windows with data included in the two or more sub flows, and slide the two or more sliding windows in response to a window threshold being satisfied.

In Example 21, the subject matter of Examples 19-20 can optionally include that the two or more sliding windows include a first sliding window and a second sliding window, and the instructions, when executed, cause the processor circuitry to determine a first slide rate associated with the first sliding window, determine a second slide rate associated with the second sliding window, and identify a network attack in response to a determination that the first slide rate is greater than the second slide rate.

In Example 22, the subject matter of Examples 19-21 can optionally include that the instructions, when executed, cause the processor circuitry to determine that the packet flow distribution configuration is indicative of a round robin distribution or a random distribution, and partition the packet flow based on the round robin distribution or the random distribution.

In Example 23, the subject matter of Examples 19-22 can optionally include that the one or more hardware cores include a first hardware core and a second hardware core, and the instructions, when executed, cause the processor circuitry to identify the first hardware core as available based on a first utilization of the first hardware core, identify the second hardware core as unavailable based on a second utilization of the second hardware core, the second utilization greater than the first utilization, and dequeue the two or more sub flows from the buffer to the first hardware core in response to the identification of the first hardware core as available.

In Example 24, the subject matter of Examples 19-23 can optionally include that the instructions, when executed, cause the processor circuitry to dequeue the two or more sub flows from the buffer to an assigned sequence number space of the first hardware core, and cause the first hardware core to provide the two or more sub flows to a transmit sequence number space of a transmitter, the transmitter to transmit the two or more sub flows from the transmit sequence number space to the destination device.

In Example 25, the subject matter of Examples 19-24 can optionally include that the packet flow is a second packet flow to be processed after a first packet flow, and the instructions, when executed, cause the processor circuitry to determine a quantity of the two or more sub flows, determine a first flow identifier of the first packet flow, determine a second flow identifier of the second packet flow, determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value, and partition the second packet flow based on the third flow identifier.

In Example 26, the subject matter of Examples 19-25 can optionally include that the instructions, when executed, cause the processor circuitry to partition a primary window into the two or more sliding windows based on a modulo of a sequence number of the packet flow and a quantity of the two more sliding windows.

In Example 27, the subject matter of Examples 19-26 can optionally include that at least one of the processor circuitry is included in a first accelerated networking device, the one or more hardware cores are included in a second accelerated networking device, or the destination device is a third accelerated networking device.

Example 28 includes an apparatus for sliding window management of network packets, the apparatus comprising processor circuitry including one or more of at least one of a central processor unit, a graphic processor unit, or a digital signal processor, the at least one of the central processor unit, the graphic processor unit or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate flow division circuitry to partition a packet flow into two or more sub flows based on a packet flow distribution configuration, flow schedule circuitry to provide the two or more sub flows to a buffer to schedule distribution of the two or more sub flows, the two or more sub flows associated respectively with two or more sliding windows that are able to slide in parallel, and dequeue the two or more sub flows from the buffer to one or more hardware cores, and a transmitter to transmit the two or more sub flows to a destination device.

In Example 29, the subject matter of Example 28 can optionally include that the processor circuitry is to perform at least one of the first operations, the second operations, or the third operations to instantiate window determination circuitry to update the two or more sliding windows with data included in the two or more sub flows, and slide management circuitry to slide the two or more sliding windows in response to a window threshold being satisfied.

In Example 30, the subject matter of Examples 28-29 can optionally include that the two or more sliding windows include a first sliding window and a second sliding window, and the processor circuitry is to perform at least one of the first operations, the second operations, or the third operations to instantiate the flow schedule circuitry to determine a first slide rate associated with the first sliding window, determine a second slide rate associated with the second sliding window, and instantiate security handing circuitry to identify a network attack in response to a determination that the first slide rate is greater than the second slide rate.

In Example 31, the subject matter of Examples 28-30 can optionally include that the processor circuitry is to perform at least one of the first operations, the second operations, or the third operations to instantiate configuration determination circuitry to determine that the packet flow distribution configuration is indicative of a round robin distribution or a random distribution, and the flow division circuitry to partition the packet flow based on the round robin distribution or the random distribution.

In Example 32, the subject matter of Examples 28-31 can optionally include that the one or more hardware cores include a first hardware core and a second hardware core, and the processor circuitry is to perform at least one of the first operations, the second operations, or the third operations to instantiate the flow schedule circuitry to identify the first hardware core as available based on a first utilization of the first hardware core, identify the second hardware core as unavailable based on a second utilization of the second hardware core, the second utilization greater than the first utilization, and dequeue the two or more sub flows from the buffer to the first hardware core in response to the identification of the first hardware core as available.

In Example 33, the subject matter of Examples 28-32 can optionally include that the processor circuitry is to perform at least one of the first operations, the second operations, or the third operations to instantiate the flow schedule circuitry to dequeue the two or more sub flows from the buffer to an assigned sequence number space of the first hardware core, and cause the first hardware core to provide the two or more sub flows to a transmit sequence number space of the transmitter, the transmitter to transmit the two or more sub flows from the transmit sequence number space to the destination device.

In Example 34, the subject matter of Examples 28-33 can optionally include that the packet flow is a second packet flow to be processed after a first packet flow, and the processor circuitry is to perform at least one of the first operations, the second operations, or the third operations to instantiate the flow division circuitry to determine a quantity of the two or more sub flows, determine a first flow identifier of the first packet flow, determine a second flow identifier of the second packet flow, determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value, and partition the packet flow based on the third flow identifier.

In Example 35, the subject matter of Examples 28-34 can optionally include that the processor circuitry is to perform at least one of the first operations, the second operations, or the third operations to instantiate the flow division circuitry to partition a primary window into the two or more sliding windows based on a modulo of a sequence number of the packet flow and a quantity of the two more sliding windows.

In Example 36, the subject matter of Examples 28-35 can optionally include that at least one of the processor circuitry is included in a first accelerated networking device, the one or more hardware cores are included in a second accelerated networking device, or the destination device is a third accelerated networking device.

Example 37 includes a method for sliding window management of network packets, the method comprising partitioning a packet flow into two or more sub flows based on a packet flow distribution configuration, providing the two or more sub flows to a buffer to schedule distribution of the two or more sub flows, the two or more sub flows associated respectively with two or more sliding windows that are able to slide in parallel, dequeuing the two or more sub flows from the buffer to one or more hardware cores, and transmitting the two or more sub flows to a destination device.

In Example 38, the subject matter of Example 37 can optionally include updating the two or more sliding windows with data included in the two or more sub flows, and sliding the two or more sliding windows in response to a window threshold being satisfied.

In Example 39, the subject matter of Examples 37-38 can optionally include that the two or more sliding windows include a first sliding window and a second sliding window, and further including determining a first slide rate associated with the first sliding window, determining a second slide rate associated with the second sliding window, and identifying a network attack in response to a determination that the first slide rate is greater than the second slide rate.

In Example 40, the subject matter of Examples 37-39 can optionally include determining that the packet flow distribution configuration is indicative of a round robin distribution or a random distribution, and partitioning the packet flow based on the round robin distribution or the random distribution.

In Example 41, the subject matter of Examples 37-40 can optionally include that the one or more hardware cores include a first hardware core and a second hardware core, and further including identifying the first hardware core as available based on a first utilization of the first hardware core, identifying the second hardware core as unavailable based on a second utilization of the second hardware core, the second utilization greater than the first utilization, and dequeuing the two or more sub flows from the buffer to the first hardware core in response to the identification of the first hardware core as available.

In Example 42, the subject matter of Examples 37-41 can optionally include dequeuing the two or more sub flows from the buffer to an assigned sequence number space of the first hardware core, and causing the first hardware core to provide the two or more sub flows to a transmit sequence number space of a transmitter, the transmitter to transmit the two or more sub flows from the transmit sequence number space to the destination device.

In Example 43, the subject matter of Examples 37-42 can optionally include that the packet flow is a second packet flow to be processed after a first packet flow, and further including determining a quantity of the two or more sub flows, determining a first flow identifier of the first packet flow, determining a second flow identifier of the second packet flow, determining a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value, and partitioning the second packet flow based on the third flow identifier.

In Example 44, the subject matter of Examples 37-43 can optionally include partitioning a primary window into the two or more sliding windows based on a modulo of a sequence number of the packet flow and a quantity of the two more sliding windows.

In Example 45, the subject matter of Examples 37-44 can optionally include that at least one of the one or more hardware cores are included in a first accelerated networking device or the destination device is a second accelerated networking device.

Example 46 is at least one computer readable medium comprising instructions to perform the method of any of Examples 37-45.

Example 47 is edge server processor circuitry to perform the method of any of Examples 37-45.

Example 48 is edge cloud processor circuitry to perform the method of any of Examples 37-45.

Example 49 is edge node processor circuitry to perform the method of any of Examples 37-45.

Example 50 is an apparatus comprising processor circuitry to perform the method of any of Examples 37-45.

Example 51 is an apparatus comprising network interface control circuitry to perform the method of any of Examples 37-45.

Example 52 is an apparatus comprising one or more edge gateways to perform the method of any of Examples 37-45.

Example 53 is an apparatus comprising one or more edge switches to perform the method of any of Examples 37-45.

Example 54 is an apparatus comprising at least one of one or more edge gateways or one or more edge switches to perform the method of any of Examples 37-45.

Example 55 is an apparatus comprising an Infrastructure Processing Unit to perform the method of any of Examples 37-45.

Example 56 is an apparatus comprising acceleration circuitry to perform the method of any of Examples 37-45.

Example 57 is an apparatus comprising one or more graphics processor units to perform the method of any of Examples 37-45.

Example 58 is an apparatus comprising one or more Artificial Intelligence processors to perform the method of any of Examples 37-45.

Example 59 is an apparatus comprising one or more machine learning processors to perform the method of any of Examples 37-45.

Example 60 is an apparatus comprising one or more neural network processors to perform the method of any of Examples 37-45.

Example 61 is an apparatus comprising one or more digital signal processors to perform the method of any of Examples 37-45.

Example 62 is an apparatus comprising one or more general purpose processors to perform the method of any of Examples 37-45.

Example 63 is an apparatus comprising an accelerated network device to perform the method of any of Examples 37-45.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   instructions in the apparatus; and
   processor circuitry to be programmed based on the instructions to:
   partition a packet flow into two or more sub flows based on a packet flow distribution configuration, the two or more sub flows associated respectively with two or more sliding windows that are able to slide in parallel;
   update the two or more sliding windows with data included in the two or more sub flows;
   slide the two or more sliding windows based on a window threshold being satisfied;
   provide the two or more sub flows to a buffer to schedule distribution of the two or more sub flows;
   dequeue the two or more sub flows from the buffer to one or more hardware cores; and
   cause transmission of the two or more sub flows to a destination device.

2. The apparatus of claim 1, wherein the two or more sliding windows include a first sliding window and a second sliding window, and the processor circuitry is to:
   determine a first slide rate associated with the first sliding window;
   determine a second slide rate associated with the second sliding window; and
   identify a network attack based on a determination that the first slide rate is greater than the second slide rate.

3. The apparatus of claim 1, wherein the processor circuitry is to:
   determine that the packet flow distribution configuration is indicative of a round robin distribution or a random distribution; and
   partition the packet flow based on the round robin distribution or the random distribution.

4. The apparatus of claim 1, wherein the one or more hardware cores include a first hardware core and a second hardware core, and the processor circuitry is to:
   identify the first hardware core as available based on a first utilization of the first hardware core;
   identify the second hardware core as unavailable based on a second utilization of the second hardware core, the second utilization greater than the first utilization; and
   dequeue the two or more sub flows from the buffer to the first hardware core in response to based on the identification of the first hardware core as available.

5. The apparatus of claim 4, wherein the processor circuitry is to:
   dequeue the two or more sub flows from the buffer to an assigned sequence number space of the first hardware core; and
   cause the first hardware core to provide the two or more sub flows to a transmit sequence number space of a transmitter, the transmitter to transmit the two or more sub flows from the transmit sequence number space to the destination device.

6. The apparatus of claim 1, wherein the packet flow is a second packet flow to be processed after a first packet flow, and the processor circuitry is to:
   determine a quantity of the two or more sub flows;
   determine a first flow identifier of the first packet flow;
   determine a second flow identifier of the second packet flow;
   determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value; and
   partition the second packet flow based on the third flow identifier.

7. The apparatus of claim 1, wherein the processor circuitry is to partition a primary window into the two or more sliding windows based on a modulo of a sequence number of the packet flow and a quantity of the two or more sliding windows.

8. The apparatus of claim 1, wherein at least one of (i) the processor circuitry is included in a first accelerated network device, (ii) the one or more hardware cores are included in a second accelerated network device, or (iii) the destination device is a third accelerated network device.

9. An apparatus comprising:
   means for determining that a packet flow distribution configuration is indicative of a round robin distribution or a random distribution;

means for partitioning a packet flow into two or more sub flows based on the round robin distribution or the random distribution;
means for providing the two or more sub flows to one or more hardware cores, the means for providing to:
provide the two or more sub flows to a buffer to schedule distribution of the two or more sub flows, the two or more sub flows associated respectively with two or more sliding windows that are able to slide in parallel; and
dequeue the two or more sub flows from the buffer to the one or more hardware cores; and
means for transmitting the two or more sub flows to a destination device.

10. The apparatus of claim 9, further including:
means for updating the two or more sliding windows with data included in the two or more sub flows; and
means for sliding the two or more sliding windows in response to a window threshold being satisfied.

11. The apparatus of claim 10, wherein the two or more sliding windows include a first sliding window and a second sliding window, the means for providing is to:
determine a first slide rate associated with the first sliding window; and
determine a second slide rate associated with the second sliding window; and
the apparatus includes means for identifying a network attack based on a determination that the first slide rate is greater than the second slide rate.

12. The apparatus of claim 9, wherein the one or more hardware cores include a first hardware core and a second hardware core, and the means for providing is to:
identify the first hardware core as available based on a first utilization of the first hardware core; and
identify the second hardware core as unavailable based on a second utilization of the second hardware core, the second utilization greater than the first utilization; and
dequeue the two or more sub flows from the buffer to the first hardware core based on the identification of the first hardware core as available.

13. The apparatus of claim 12, wherein the means for providing is to:
dequeue the two or more sub flows from the buffer to an assigned sequence number space of the first hardware core; and
cause the first hardware core to provide the two or more sub flows to a transmit sequence number space of the means for transmitting, the means for transmitting to transmit the two or more sub flows from the transmit sequence number space to the destination device.

14. At least one non-transitory computer readable medium comprising instructions to cause processor circuitry to at least:
partition a primary window into two or more sliding windows based on a modulo of a sequence number of a packet flow and a quantity of the two or more sliding windows;
partition the packet flow into two or more sub flows based on a packet flow distribution configuration;
provide the two or more sub flows to a buffer to schedule distribution of the two or more sub flows, the two or more sub flows associated respectively with the two or more sliding windows, the two or more sliding windows able to slide in parallel;
dequeue the two or more sub flows from the buffer to one or more hardware cores; and
cause transmission of the two or more sub flows to a destination device.

15. The at least one non-transitory computer readable medium of claim 14, wherein the packet flow is a second packet flow to be processed after a first packet flow, and the instructions are to cause the processor circuitry to:
determine a quantity of the two or more sub flows;
determine a first flow identifier of the first packet flow;
determine a second flow identifier of the second packet flow;
determine a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value; and
partition the second packet flow based on the third flow identifier.

16. The at least one non-transitory computer readable medium of claim 14, wherein at least one of (i) the processor circuitry is included in a first accelerated network device, (ii) the one or more hardware cores are included in a second accelerated network device, or (iii) the destination device is a third accelerated network device.

17. A method comprising:
partitioning a packet flow into two or more sub flows based on a packet flow distribution configuration;
providing the two or more sub flows to a buffer to schedule distribution of the two or more sub flows, the two or more sub flows associated respectively with two or more sliding windows that are able to slide in parallel;
identifying a first hardware core as available based on a first utilization of the first hardware core;
identifying a second hardware core as unavailable based on a second utilization of the second hardware core, the second utilization greater than the first utilization;
dequeuing the two or more sub flows from the buffer to the first hardware core based on the identification of the first hardware core as available; and
transmitting the two or more sub flows to a destination device.

18. The method of claim 17, including:
updating the two or more sliding windows with data included in the two or more sub flows; and
sliding the two or more sliding windows based on a window threshold being satisfied.

19. The method of claim 18, wherein the two or more sliding windows include a first sliding window and a second sliding window, and including:
determining a first slide rate associated with the first sliding window;
determining a second slide rate associated with the second sliding window; and
identifying a network attack based on a determination that the first slide rate is greater than the second slide rate.

20. The method of claim 17, further including:
dequeuing the two or more sub flows from the buffer to an assigned sequence number space of the first hardware core; and
causing the first hardware core to provide the two or more sub flows to a transmit sequence number space of a transmitter, the transmitter to transmit the two or more sub flows from the transmit sequence number space to the destination device.

21. The method of claim 17, wherein the packet flow is a second packet flow to be processed after a first packet flow, and including:
- determining a quantity of the two or more sub flows;
- determining a first flow identifier of the first packet flow;
- determining a second flow identifier of the second packet flow;
- determining a third flow identifier of a first one of the two or more sub flows based on a first sum of (1) a multiplication of the quantity of the two or more sub flows and the first flow identifier and (2) a modulo of the quantity of the two or more sub flows and a second sum of the second flow identifier and a constant value; and
- partitioning the second packet flow based on the third flow identifier.

* * * * *

UNITED STATES PATENT AND TRADEMARK OFFICE
CERTIFICATE OF CORRECTION

PATENT NO. : 12,470,489 B2  
APPLICATION NO. : 18/003267  
DATED : November 11, 2025  
INVENTOR(S) : Surekha Peri Page 1 of 1

It is certified that error appears in the above-identified patent and that said Letters Patent is hereby corrected as shown below:

In the Claims

Column 58, Line 26 (Claim 4), delete "in response to"

Column 59, Line 16 (Claim 10), delete "further"

Column 60, Line 59 (Claim 20), delete "further"

Signed and Sealed this  
Twenty-seventh Day of January, 2026

John A. Squires  
*Director of the United States Patent and Trademark Office*